US012720423B2

(12) United States Patent
Xu et al.

(10) Patent No.: US 12,720,423 B2
(45) Date of Patent: Aug. 25, 2026

(54) COMMUNICATION METHOD AND APPARATUS BASED ON DETERMINING PROXY CALL NETWORK ELEMENTS

(71) Applicant: HUAWEI TECHNOLOGIES CO., LTD., Shenzhen (CN)

(72) Inventors: Yishan Xu, Shanghai (CN); Hualin Zhu, Shanghai (CN); Shufeng Shi, Xi'an (CN); Haoren Zhu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 360 days.

(21) Appl. No.: 18/308,981

(22) Filed: Apr. 28, 2023

(65) Prior Publication Data

US 2023/0269661 A1 Aug. 24, 2023

Related U.S. Application Data

(63) Continuation of application No. PCT/CN2021/111629, filed on Aug. 9, 2021.

(30) Foreign Application Priority Data

Nov. 2, 2020 (WO) ................ PCT/CN2020/125916

(51) Int. Cl.
*H04W 48/18* (2009.01)
*H04W 76/10* (2018.01)

(52) U.S. Cl.
CPC ........... *H04W 48/18* (2013.01); *H04W 76/10* (2018.02)

(58) Field of Classification Search
CPC .............................. H04W 48/18; H04W 76/10
See application file for complete search history.

(56) References Cited

U.S. PATENT DOCUMENTS

2008/0084857 A1* 4/2008 Gorti .................. H04L 65/1016 370/342
2011/0019639 A1 1/2011 Karaoguz et al.
(Continued)

FOREIGN PATENT DOCUMENTS

CN 1832440 A 9/2006
CN 1953448 A 4/2007
(Continued)

OTHER PUBLICATIONS

3GPP TR 23.700-07 V0.5.0, "Technical Specification Group Services and System Aspects; Study on enhanced support of non-public networks (Release 17)," Sep. 2020, 215 pages.
(Continued)

*Primary Examiner* — Jeong S Park
(74) *Attorney, Agent, or Firm* — Fish & Richardson P.C.

(57) ABSTRACT

Example communication methods and apparatuses are provided. One example method includes receiving, by a session management network element, first information from user equipment, where the first information indicates a target IP multimedia subsystem (IMS) network to which the user equipment requests to connect, the target IMS network is one of a plurality of IMS networks, and the target IMS network is provided by a target service provider. The session management network element determines first call information based on the first information, where the first call information indicates a target proxy call network element, and the first call information is for establishing a connection between the user equipment and the target IMS network. The session management network element sends the first call information to the user equipment.

17 Claims, 18 Drawing Sheets

(56) References Cited

U.S. PATENT DOCUMENTS

2012/0219127 A1 8/2012 Lu et al.
2015/0264106 A1* 9/2015 Baek .................. H04L 65/1016 709/203
2016/0353344 A1* 12/2016 Deivasigamani ....... H04W 4/24
2018/0234467 A1* 8/2018 Dowlatkhah ....... H04L 41/0894
2019/0028992 A1* 1/2019 Kim .......................... H04L 9/40
2020/0120629 A1* 4/2020 Christopher .......... H04W 60/00
2020/0305211 A1* 9/2020 Foti ....................... H04W 12/08
2021/0152615 A1* 5/2021 Karampatsis ....... H04L 65/1016
2021/0250830 A1* 8/2021 Huang .................. H04W 48/18

FOREIGN PATENT DOCUMENTS

CN 101212386 A 7/2008
CN 104010290 A 8/2014
CN 105230083 A 1/2016
CN 111182543 A 5/2020
CN 111263424 A 6/2020

OTHER PUBLICATIONS

Ericsson, "Solution for providing IMS voice and emergency services for SNPN subscribers using wild card IMPUs," 3GPP TSG-SA WG2 Meeting #136AH, S2-2000170, Incheon, Korea, Jan. 13-17, 2020, 4 pages.
Ericsson, "KI #3, New Sol: eSIM based solution for Providing IMS voice and emergency services for SNPN subscribers," 3GPP TSG-SA WG2 Meeting #139E, S2-2003584, Elbonia, Jun. 1-12, 2020, 7 pages.
3GPP TS 23.501 V16.6.0, "3rd Generation Partnership Project; Technical Specification Group Services and System Aspects; System architecture for the 5G System (5GS); Stage 2 (Release 16)," Sep. 2020, 447 pages.
International Search Report and Written Opinion in International Appln. No. PCT/CN2020/125916, mailed on Jul. 22, 2021, 15 pages (with English translation).
International Search Report and Written Opinion in International Appln. No. PCT/CN2021/111629, mailed on Nov. 17, 2021, 15 pages (with English translation).
3GPP TR 23.700-07 V1.1.0, "3rd Generation Partnership Project; Technical Specification Group Services and System Aspects; Study on enhanced support of non-public networks(Release 17)," Oct. 2020, 238 pages.
Extended European Search Report in European Appln. No. 21884564.2, mailed on Feb. 23, 2024, 14 pages.

* cited by examiner

COMMUNICATION METHOD AND APPARATUS BASED ON DETERMINING PROXY CALL NETWORK ELEMENTS

CROSS-REFERENCE TO RELATED APPLICATIONS

This application is a continuation of International Application No. PCT/CN2021/111629, filed on Aug. 9, 2021, which claims priority to International Application No. PCT/CN2020/125916, filed on Nov. 2, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

An IP multimedia subsystem (IP multimedia subsystem, IMS) network is a type of data network (data network, DN). The IMS network is connected to a standalone non-public network (standalone non-public network, SNPN). The IMS network provides an IMS service for user equipment (user equipment, UE) in the non-public network.

The IMS network has a service provider attribute. For example, an IMS network provided by a service provider A can provide a service only for user equipment of the service provider A (namely, user equipment having subscription data of the service provider A), but cannot provide a service for user equipment of a service provider of another IMS network. When a non-public network is connected to an IMS network, for example, the IMS network is an IMS network A whose service provider is a service provider A, the non-public network may provide address information of a proxy call network element of the IMS network A to user equipment having subscription data of the service provider A, so that the user equipment may establish a connection to the IMS network A by using the address information of the proxy call network element. However, for another user equipment, for example, subscription data of the another user equipment is subscription data of a service provider B, and an IMS network provided by the service provider B does not include the IMS network A. Even if the another user equipment obtains the address information of the proxy call network element of the IMS network A, the another user equipment cannot establish a connection to the IMS network A.

Currently, a method for connecting user equipment to an IMS network corresponding to the user equipment via a non-public network is urgently required.

SUMMARY

An objective of this application is to provide a communication method and apparatus, to enable user equipment to connect to an IMS network of a service provider via a non-public network.

According to a first aspect, this application provides a communication method. The method may be performed by a session management network element, or may be performed by a component (for example, a chip or a circuit) in a session management network element.

In a possible implementation, the method is performed by a session management network element, and the method includes: The session management network element receives first information from user equipment, where the session management network element and the user equipment are located in a non-public network, the non-public network is connected to a plurality of IMS networks, the first information indicates a target IMS network to which the user equipment requests to connect, the target IMS network is one of the plurality of IMS networks, and the target IMS network is provided by a target service provider; the session management network element determines first call information based on the first information, where the first call information indicates a target proxy call network element, and the first call information is for establishing a connection between the user equipment and the target IMS network; and the session management network element sends the first call information to the user equipment.

In the foregoing technical solution, one non-public network is connected to a plurality of IMS networks, to provide respective IMS network services for user equipments of different service providers. Further, the user equipment sends the first information to the session management network element, and the session management network element may determine, based on the first information, the target IMS network to which the user equipment requests to connect, to establish a session connection between the user equipment and the target IMS network, without adding a home subscriber server to the non-public network. This helps reduce deployment costs.

In a possible implementation, the first information includes identification information of the target service provider and/or the first call information.

In the foregoing technical solution, the session management network element may determine, based on the identification information of the target service provider in the first information, the target IMS network provided by the target service provider, and establish a session connection between the user equipment and the target IMS network. Alternatively, the session management network element may determine, based on the first call information in the first information, the target proxy call network element indicated by the first call information and the target IMS network in which the target proxy call network element is located, and establish a session connection between the user equipment and the target IMS network.

In a possible implementation, the first information is data network name information, and the data network name information includes identification information of the target service provider.

In the foregoing technical solution, the user equipment may send enhanced data network name information to the session management network element, where the enhanced data network name information includes the identification information of the target service provider. The session management network element may obtain the identification information of the target service provider from the data network name information, and establish a session connection between the user equipment and the target IMS network based on an existing session establishment procedure.

In a possible implementation, the target proxy call network element is located in the non-public network, and the method further includes: The session management network element sends second information to the target proxy call network element or a policy control network element, where the second information includes identification information of the user equipment and the identification information of the target service provider, and the second information indicates the target proxy call network element to send an IMS message from the user equipment to a target interrogation call network element of the target IMS network. In a possible implementation, the second information further includes second call information indicating the target interrogation call network element.

In the foregoing technical solution, the session management network element sends the second information to the target proxy call network element, or the session management network element sends the second message to the target proxy call network element via the policy control network element. The target proxy call network element may determine a correspondence between the identification information of the user equipment and the target interrogation call network element based on the second information, so that the target proxy call network element may send the IMS message from the user equipment to the corresponding target interrogation call network element.

In a possible implementation, the target proxy call network element is located in the non-public network, and the method further includes: The session management network element determines second call information corresponding to the target service provider based on a correspondence between a service provider and interrogation call information; the session management network element determines a target association, where the target association includes an association between identification information of the user equipment and the second call information, or the target association includes an association between identification information of the user equipment, the second call information, and the identification information of the target service provider; and the session management network element sends the target association to the target proxy call network element or a policy control network element.

In the foregoing technical solution, the session management network element may determine the target association between the identification information of the user equipment and the second call information based on the target service provider, the interrogation call information (namely, the second call information) corresponding to the target service provider, and the identification information of the user equipment. The session management network element sends the target association to the target proxy call network element, or sends the target association to the target proxy call network element via the policy control network element. The target proxy call network element may send an IMS message from the user equipment to the corresponding target interrogation call network element based on the target association.

According to a second aspect, this application provides a communication method. The method may be performed by user equipment, or may be performed by a component (for example, a chip or a circuit) in user equipment.

In a possible implementation, the method is performed by user equipment, and the method includes: The user equipment sends first information to a session management network element, where the user equipment and the session management network element are located in a non-public network, the non-public network is connected to a plurality of IMS networks, the first information indicates a target IMS network to which the user equipment requests to connect, the target IMS network is one of the plurality of IMS networks, and the target IMS network is provided by a target service provider; and the user equipment receives first call information from the session management network element, where the first call information indicates a target proxy call network element, and the first call information is for establishing a connection between the user equipment and the target IMS network.

In a possible implementation, the first information includes identification information of the target service provider and/or the first call information.

In a possible implementation, the first information is data network name information, and the data network name information includes identification information of the target service provider.

In a possible implementation, the data network name information is obtained by the user equipment from an access and mobility management network element, the session management network element, or an access network device.

In a possible implementation, the first information includes the first call information, and before the user equipment sends the first information to the session management network element, the method further includes: The user equipment receives third information from the access network device, where the third information includes the first service provider and proxy call information corresponding to the first service provider, and the proxy call information corresponding to the first service provider is the first call information.

In the foregoing technical solution, the user equipment may determine, based on the obtained third information, whether the target IMS network that provides a service for the user equipment exists in the plurality of IMS networks connected to the non-public network. If determining that identification information of a service provider to which the user equipment belongs exists in the third information, the user equipment determines that the target IMS network exists in the plurality of IMS networks, and the user equipment may establish a session connection via the non-public network to obtain an IMS service provided by the target IMS network. If determining that identification information of a service provider to which the user equipment belongs does not exist in the third information, the user equipment determines that the target IMS network does not exist in the plurality of IMS networks, and cannot establish a session connection via the non-public network to obtain an IMS service provided by the target IMS network.

In a possible implementation, the first information includes the first call information, and before the user equipment sends the first information to the session management network element, the method further includes: The user equipment sends a query request to a domain name system server, where the query request includes identification information of the non-public network; and the user equipment receives a query response from the domain name system server, where the query response includes the first call information, and the target proxy call network element indicated by the first call information is located in the target IMS network and connected to the non-public network.

In the foregoing technical solution, the user equipment may send the query request to the domain name system server, where the query request includes the identification information of the non-public network; and if determining that proxy call information corresponding to a domain name of the target IMS network is obtained, the domain name system server feeds back a query response including the proxy call information (first call information) corresponding to the domain name of the target IMS network to the user equipment, and the user equipment may establish a session connection via the non-public network to obtain an IMS service provided by the target IMS network. If determining that the proxy call information corresponding to the domain name of the target IMS network is not obtained, the domain name system server feeds back a query failure to the user equipment, or indicates that the non-public network is not connected to the target IMS network, so that the user equipment may determine that a session connection cannot be established via the non-public network to obtain an IMS service provided by the target IMS network.

According to a third aspect, this application provides a communication method. The method may be performed by a policy control network element, or may be performed by a component (for example, a chip or a circuit) in a policy control network element.

In a possible implementation, the method is performed by a policy control network element, and the method includes: The policy control network element receives second information from a session management network element, where the second information includes identification information of the user equipment and identification information of the target service provider; the policy control network element determines a target association based on a correspondence between a service provider and interrogation call information and the second information, where the target association includes an association between the identification information of the user equipment and second call information, or the target association includes an association between the identification information of the user equipment, second call information, and the identification information of the target service provider, the second call information indicates a target interrogation call network element, the target interrogation call network element is located in a target IMS network, and the target interrogation call network element is connected to a target proxy call network element in a non-public network; and the policy control network element sends the target association to the target proxy call network element.

In the foregoing technical solution, the policy control network element may determine the target association based on the correspondence between a service provider and interrogation call information and the second information, and send the target association to the target proxy call network element. The target proxy call network element may send an IMS message from the user equipment to the corresponding target interrogation call network element based on the target association.

According to a fourth aspect, this application provides a communication method. The method may be performed by a target proxy call network element, or may be performed by a component (for example, a chip or a circuit) in a target proxy call network element.

In a possible implementation, the method is performed by a target proxy call network element, and the method includes: The target proxy call network element receives IMS information from user equipment, where the IMS information includes identification information of the user equipment, and the target proxy call network element and the user equipment are located in a non-public network; the target proxy call network element determines second call information based on a target association and the identification information of the user equipment, where the target association includes an association between the identification information of the user equipment and the second call information; and the target proxy call network element sends the IMS information to a target interrogation call network element indicated by the second call information, where the target interrogation call network element is located in a target IMS network.

In a possible implementation, before the target proxy call network element receives the IMS information from the user equipment, the method further includes: The target proxy call network element receives the target association from a policy control network element or a session management network element.

In a possible implementation, before the target proxy call network element receives the IMS information from the user equipment, the method further includes: The target proxy call network element receives the identification information of the user equipment and identification information of the target service provider from a policy control network element or a session management network element; and the target proxy call network element determines the target association based on a correspondence between a service provider and interrogation call information.

In a possible implementation, the target association further includes the identification information of the target service provider.

In the foregoing technical solution, the target proxy call network element may receive the target association from the policy control network element or the session management network element; or receive the identification information of the user equipment and the identification information of the target service provider from the policy control network element or the session management network element, and determine the target association. The target proxy call network element may send an IMS message from the user equipment to the corresponding target interrogation call network element based on the target association.

According to a fifth aspect, this application provides a communication method. The method may be performed by user equipment, or may be performed by a component (for example, a chip or a circuit) in user equipment.

In a possible implementation, the method is performed by user equipment, and the method includes: The user equipment sends network information of a first IMS network supported by the user equipment to a core network device; and the user equipment receives fourth information from the core network device, where the fourth information indicates whether establishment of a connection between the user equipment and the first IMS network is supported. Because a non-public network may provide a connection for the user equipment to obtain an IMS service, the non-public network may provide a connection between the user equipment and the IMS network. Therefore, it may be understood that the fourth information indicates whether the non-public network supports establishment of a connection between the user equipment and the first IMS network. This description is applicable to other aspects, and details are not described again. That the user equipment establishes a connection to the first IMS network may be understood as that the user equipment establishes a session to a data network to which the first IMS network belongs, may be understood as that the user equipment establishes an Internet Protocol (Internet Protocol, IP) connection to a call proxy network element of the first IMS network, or may be understood as that the user equipment establishes an IP connection to the first IMS network.

In a possible implementation, the user equipment may send the network information of the first IMS network to the core network device through another device: When the core network device is an access and mobility management network element, the user equipment may send the network information of the first IMS network to the access and mobility management network element through an access network device. When the core network device is a session management network element, the user equipment may send the network information of the first IMS network to the session management network element through an access network device and an access and mobility management network element sequentially.

In the foregoing technical solution, the user equipment sends, to the core network device, the network information of the first IMS requested by the user equipment. The core network device may determine, based on the network information of the first IMS, whether one or more IMS networks connected to the non-public network accessed by the user equipment include the first IMS network, and send the fourth information to the user equipment, so that the user equipment determines and uses an IMS service. In other words, the core network device determines whether an IMS network that can provide an IMS service for the user equipment exists in the one or more IMS networks connected to the non-public network accessed by the user equipment, and then sends the fourth information to the user equipment. Specifically, the fourth information may indicate whether establishment of a connection between the user equipment and the first IMS network is supported. The user equipment may determine, based on the fourth information, whether to request to obtain an IMS service. In this manner, when an IMS network that can provide an IMS service for the user equipment (in other words, the fourth information indicates that establishment of a connection between the user equipment and the first IMS network is supported) exists in the one or more IMS networks connected to the non-public network accessed by the user equipment, the user equipment requests to obtain an IMS service. According to the foregoing method, only after determining that an IMS network that can provide an IMS service for the user equipment exists, the user equipment initiates a request for obtaining an IMS service, thereby reducing a process in which the user equipment blindly initiates the request for obtaining an IMS service because the user equipment cannot determine whether the IMS network exists, and then receives a reject message. In this process, each of actions of initiating the request for obtaining an IMS service and receiving a reject message by the user equipment brings signaling consumption and network resource occupation, so that this manner can further reduce signaling consumption and network resource occupation.

In a possible implementation, the user equipment sends the network information of the first IMS network to the core network device in a registration procedure, where the fourth information indicates that establishment of a connection between the user equipment and the first IMS network is supported; and the method further includes: The user equipment sends session establishment request information to the core network device, where the session establishment request message is for establishing a connection between the user equipment and the first IMS network.

In the foregoing technical solution, the user equipment may send the network information of the first IMS network to the core network device in the registration procedure. Correspondingly, the core network device may send the fourth information to the user equipment in response to the network information of the first IMS network in the registration procedure, so that the user equipment may further determine, in the registration procedure, whether to send the session establishment request information to the core network device to establish a connection between the user equipment and the first IMS network. This manner can help reduce signaling overheads and network resource occupation.

In a possible implementation, the user equipment sends the network information of the first IMS network to the core network device in a session establishment procedure, where the fourth information indicates that establishment of a connection between the user equipment and the first IMS network is supported; and the method further includes: The user equipment obtains address information of a proxy call network element corresponding to the first IMS network; and the user equipment establishes a connection to the proxy call network element based on the address information.

In a possible implementation, the user equipment may obtain, from a domain name server or a session management network element, the address information of the proxy call network element corresponding to the first IMS network.

In a possible implementation, the fourth information may include address information of a proxy call network element corresponding to the first IMS network, and the address information of the proxy call network element corresponding to the first IMS network may indicate that establishment of a connection between the user equipment and the first IMS network is supported. It may be understood that if receiving, in a session establishment procedure, the address information of the proxy call network element corresponding to the first IMS network, the user equipment may establish a connection to the proxy call network element based on the address information, to obtain an IMS service of the first IMS network.

In the foregoing technical solution, the user equipment may send the network information of the first IMS network to the core network device in the session establishment procedure. Correspondingly, the core network device may send the fourth information to the user equipment in response to the network information of the first IMS network in the session establishment procedure, so that the user equipment may determine, in the session establishment procedure, whether to request to establish a connection to the first IMS network. This manner can help reduce signaling overheads and network resource occupation.

In a possible implementation, the user equipment sends the network information of the first IMS network to the core network device in a session establishment procedure, where the fourth information indicates that establishment of a connection between the user equipment and the first IMS network is not supported, and the fourth information includes session establishment reject information.

In the foregoing technical solution, the user equipment may send the network information of the first IMS network to the core network device in the session establishment procedure. Correspondingly, the core network device may send the fourth information to the user equipment in response to the network information of the first IMS network in the session establishment procedure. The fourth information may include the session establishment reject information. For example, the fourth information may be the session establishment reject information. The user equipment may determine, based on the session establishment reject information, that an IMS service cannot be obtained via an IMS network connected to the non-public network accessed by the user equipment, so that the user equipment no longer requests an IMS service from the core network device or does not establish a connection to the IMS network connected to the non-public network. This helps reduce signaling overheads and network resource occupation.

In a possible implementation, the network information includes one or more of an identifier of a service provider, a network identifier, a network domain name, a data network name, and address information of a proxy call network element. In a possible implementation, the user equipment may send, to the core network device, one or more of an identifier of a service provider of the first IMS network supported by the user equipment, a network identifier, a network domain name, a data network name, and address information of a proxy call network element, so that the core network device may send the fourth information to the user equipment based on information from the user equipment.

In a possible implementation, the fourth information includes one or more of session establishment accept information, session establishment reject information, an identifier of a service provider, a network identifier, a network domain name, the address information of the proxy call network element, and data network name information. In a possible implementation, the session establishment accept information may include message type information of a session establishment accept message and/or parameter information of the session establishment accept message. The session establishment reject information may include message type information of a session establishment reject message and/or parameter information of the session establishment reject message.

In a possible implementation, the fourth information may be network information of a second IMS network, and the second IMS network may be an IMS network selected by the core network device from one or more IMS networks connected to the non-public network accessed by the user equipment. In a possible implementation, the fourth information may include one or more of an identifier of a service provider of the second IMS network, a network identifier, a network domain name, address information of a proxy call network element, and a data network name. The second IMS network may be the same as or different from the first IMS network. When the second IMS network is the same as the first IMS network, the network information of the second IMS network may implicitly indicate that establishment of a connection between the user equipment and the first IMS network is supported. When the second IMS network is different from the first IMS network, the network information of the second IMS network may implicitly indicate that establishment of a connection between the user equipment and the first IMS network is not supported.

In a possible implementation, the fourth information may be indication information, and the indication information may indicate that establishment of a connection between the user equipment and the first IMS network is supported or not supported.

For example, the indication information may be a single bit, a plurality of bits, or a character string. When the indication information is a single bit, when a value of the bit is 1, it indicates that establishment of a connection between the user equipment and the first IMS network is supported; or when a value of the bit is 0, it indicates that establishment of a connection between the user equipment and the first IMS network is not supported. Alternatively, when the indication information is a single bit, when a value of the bit is 0, it indicates that establishment of a connection between the user equipment and the first IMS network is supported; or when a value of the bit is 1, it indicates that establishment of a connection between the user equipment and the first IMS network is not supported. When the indication information is multi-bit, one type of multi-bit may indicate that establishment of a connection between the user equipment and the first IMS network is supported, and another type of multi-bit may indicate that establishment of a connection between the user equipment and the first IMS network is not supported. When the indication information is a character string, one type of character string may indicate that establishment of a connection between the user equipment and the first IMS network is supported, and another type of character string may indicate that establishment of a connection between the user equipment and the first IMS network is not supported.

When the fourth information indicates that establishment of a connection between the user equipment and the first IMS network is supported, the user equipment may obtain, from a domain name system server or a session management network element, address information of a proxy call network element corresponding to the first IMS network, and then establish a connection to the proxy call network element based on the address information, to obtain an IMS service of the first IMS network.

According to a sixth aspect, this application provides a communication method. The method may be performed by a core network device, or may be performed by a component (for example, a chip or a circuit) in a core network device.

In a possible implementation, the method is performed by a core network device, and the method includes: The core network device obtains network information of a first IMS network, where the first IMS network is an IMS network supported by user equipment; and the core network device sends fourth information to the user equipment, where the fourth information indicates whether establishment of a connection between the user equipment and the first IMS network is supported. That the user equipment establishes a connection to the first IMS network may be understood as that the user equipment establishes a session to a data network to which the first IMS network belongs, may be understood as that the user equipment establishes an IP connection to a call proxy network element of the first IMS network, or may be understood as that the user equipment establishes an IP connection to the first IMS network.

In a possible implementation, that the core network device obtains the network information of the first IMS network includes: The core network device receives the network information of the first IMS network from the user equipment in a registration procedure, where the fourth information indicates that establishment of a connection between the user equipment and the first IMS network is supported; and the method further includes: The core network device receives a session establishment request message from the user equipment, where the session establishment request message is for establishing a connection between the user equipment and the first IMS network.

In a possible implementation, that the core network device obtains the network information of the first IMS network includes: The core network device receives the network information of the first IMS network from the user equipment in a session establishment procedure, where the fourth information indicates that establishment of a connection between the user equipment and the first IMS network is supported, and the fourth information includes session establishment accept information and/or address information of a proxy call network element corresponding to the first IMS network.

In a possible implementation, that the core network device obtains the network information of the first IMS network includes: The core network device receives the network information of the first IMS network from the user equipment in a session establishment procedure, where the fourth information indicates that establishment of a connection between the user equipment and the first IMS network is not supported, and the fourth information includes session establishment reject information.

In a possible implementation, the network information includes one or more of an identifier of a service provider, a network identifier, a network domain name, the address information of the proxy call network element, and a data network name.

In a possible implementation, the fourth information includes one or more of session establishment accept information, session establishment reject information, an identifier of a service provider, a network identifier, a network domain name, the address information of the proxy call network element, and a data network name. In a possible implementation, the session establishment accept information may include message type information of a session establishment accept message and/or parameter information of the session establishment accept message. The session establishment reject information may include message type information of a session establishment reject message and/or parameter information of the session establishment reject message.

In a possible implementation, the fourth information may be network information of a second IMS network, and the second IMS network may be an IMS network selected by the core network device from one or more IMS networks connected to the non-public network accessed by the user equipment. In a possible implementation, the fourth information includes one or more of an identifier of a service provider of the second IMS network, a network identifier, a network domain name, address information of a proxy call network element, and a data network name. The second IMS network may be the same as or different from the first IMS network. When the second IMS network is the same as the first IMS network, the network information of the second IMS network may implicitly indicate that establishment of a connection between the user equipment and the first IMS network is supported. When the second IMS network is different from the first IMS network, the network information of the second IMS network may implicitly indicate that establishment of a connection between the user equipment and the first IMS network is not supported.

In a possible implementation, the fourth information may be indication information, and the indication information may indicate that establishment of a connection between the user equipment and the first IMS network is supported or not supported.

For example, the indication information may be a single bit, a plurality of bits, or a character string. When the indication information is a single bit, when a value of the bit is 1, it indicates that establishment of a connection between the user equipment and the first IMS network is supported; or when a value of the bit is 0, it indicates that establishment of a connection between the user equipment and the first IMS network is not supported. Alternatively, when the indication information is a single bit, when a value of the bit is 0, it indicates that establishment of a connection between the user equipment and the first IMS network is supported; or when a value of the bit is 1, it indicates that establishment of a connection between the user equipment and the first IMS network is not supported. When the indication information is multi-bit, one type of multi-bit may indicate that establishment of a connection between the user equipment and the first IMS network is supported, and another type of multi-bit may indicate that establishment of a connection between the user equipment and the first IMS network is not supported. When the indication information is a character string, one type of character string may indicate that establishment of a connection between the user equipment and the first IMS network is supported, and another type of character string may indicate that establishment of a connection between the user equipment and the first IMS network is not supported.

When the fourth information indicates that establishment of a connection between the user equipment and the first IMS network is supported, the user equipment may obtain, from a domain name system server or a session management network element, address information of a proxy call network element corresponding to the first IMS network, and then establish a connection to the proxy call network element based on the address information, to obtain an IMS service of the first IMS network.

For technical effects that can be achieved in the sixth aspect, refer to descriptions of advantageous effects in the fifth aspect. Details are not described herein again.

According to a seventh aspect, this application provides a communication method. The method may be performed by user equipment, or may be performed by a component (for example, a chip or a circuit) in user equipment.

In a possible implementation, the method is performed by user equipment, and the method includes: The user equipment obtains network information of one or more IMS networks, where the one or more IMS networks are connected to a non-public network accessed by the user equipment; the user equipment determines that the one or more IMS networks include a first IMS network to which the user equipment requests to connect; and the user equipment establishes a connection to the first IMS network based on network information of the first IMS network. That the user equipment establishes a connection to the first IMS network may be understood as that the user equipment establishes a session to a data network to which the first IMS network belongs, may be understood as that the user equipment establishes an IP connection to a call proxy network element of the first IMS network, or may be understood as that the user equipment establishes an IP connection to the first IMS network.

In the foregoing technical solution, the user equipment obtains, from a core network device, the network information of the one or more IMS networks connected to the non-public network accessed by the user equipment, and the user equipment determines, based on the network information of the one or more IMS networks, whether the one or more IMS networks include the first IMS network, which is equivalent to that the user equipment determines whether an IMS network that can provide an IMS service for the user equipment exists in the one or more IMS networks connected to the non-public network accessed by the user equipment. If the user equipment determines that an IMS network that can provide an IMS service for the user equipment exists in the one or more IMS networks connected to the non-public network accessed by the user equipment, the user equipment may request to obtain an IMS service.

In this manner, when an IMS network that can provide an IMS service for the user equipment exists in the one or more IMS networks connected to the non-public network accessed by the user equipment, the user equipment initiates a request for obtaining an IMS service, thereby reducing a process in which the user equipment blindly initiates the request for obtaining an IMS service because the user equipment cannot determine whether the requested IMS network exists, and then receives a reject message. In this process, each of actions of initiating the request for obtaining an IMS service and receiving a reject message by the user equipment brings signaling consumption and network resource occupation, so that this manner can further reduce signaling consumption and network resource occupation.

In a possible implementation, the method further includes: The user equipment sends IMS capability information to a core network device, where the IMS capability information indicates that the user equipment supports establishment of a connection to an IMS network, or the IMS capability information indicates that the user equipment supports obtaining of an IMS service.

In a possible implementation, the IMS capability information includes the network information of the first IMS network. For example, the IMS capability information is the network information of the first IMS network. The network information of the first IMS network may include one or more of an identifier of a service provider of the first IMS network, a network identifier, a network domain name, a data network name, and address information of a proxy call network element. In this implementation, the user equipment implicitly indicates, to the core network device, that the user equipment supports obtaining of an IMS service, and the user equipment requests or supports establishment of a connection to the first IMS network.

In a possible implementation, the IMS capability information may be indication information. For example, the indication information may indicate that the user equipment supports obtaining of an IMS service, or the indication information may indicate that the user equipment does not support obtaining of an IMS service. For example, the indication information may be a single bit, a plurality of bits, or a character string. When the indication information is a single bit, when a value of the bit is 1, it indicates that the user equipment supports obtaining of an IMS service; or when a value of the bit is 0, it indicates that the user equipment does not support obtaining of an IMS service. Alternatively, when the indication information is a single bit, when a value of the bit is 0, it indicates that the user equipment supports obtaining of an IMS service; or when a value of the bit is 1, it indicates that the user equipment does not support obtaining of an IMS service. When the indication information is multi-bit, one type of multi-bit may indicate that the user equipment does not support obtaining of an IMS service, and another type of multi-bit may indicate that the user equipment supports obtaining of an IMS service. When the indication information is a character string, one type of character string may indicate that the user equipment does not support obtaining of an IMS service, and another type of character string may indicate that the user equipment supports obtaining of an IMS service.

In a possible implementation, that the user equipment sends the IMS capability information to the core network device includes: The user equipment sends the IMS capability information to the core network device in a registration procedure or a session establishment procedure.

In the foregoing technical solution, the user equipment may send the IMS capability information to the core network device. Correspondingly, the core network device may send the network information of the one or more IMS networks to the user equipment in response to the IMS capability information, so that the user equipment may determine, based on the network information of the one or more IMS networks, whether the user equipment can request an IMS service.

In a possible implementation, that the user equipment obtains the network information of the one or more IMS networks includes: The user equipment obtains the network information of the one or more IMS networks from the core network device in the session establishment procedure; and that the user equipment establishes the connection to the first IMS network based on the network information of the first IMS network includes: The user equipment obtains address information of a proxy call network element corresponding to the first IMS network; and the user equipment establishes a connection to the proxy call network element based on the address information. In a possible implementation, the user equipment may obtain, from a domain name system server or a session management network element, address information of a proxy call network element corresponding to the first IMS network, and then establish a connection to the proxy call network element based on the address information, to obtain an IMS service of the first IMS network.

In the foregoing technical solution, the user equipment may obtain the network information of the one or more IMS networks from the core network device in the session establishment procedure, so that the user equipment may determine, in the session establishment procedure, whether to request, based on the network information of the first IMS network, to establish a connection to the first IMS network. This manner can help reduce signaling overheads and network resource occupation. The core network device may be a session management network element.

In a possible implementation, that the user equipment obtains the network information of the one or more IMS networks includes: The user equipment obtains the network information of the one or more IMS networks from the core network device in the registration procedure; and that the user equipment establishes the connection to the first IMS network based on the network information of the first IMS network includes: The user equipment sends session establishment request information to the core network device based on the network information of the first IMS network, where the session establishment request information is for establishing a connection between the user equipment and the first IMS network.

In the foregoing technical solution, the user equipment may obtain the network information of the one or more IMS networks from the core network device in the registration procedure, so that the user equipment may determine, in a registration procedure, whether to send the session establishment request information to the core network device based on the network information of the first IMS network. This manner can help reduce signaling overheads and network resource occupation. The core network device may be an access and mobility management network element.

In a possible implementation, the network information of the one or more IMS networks is included in a broadcast message of an access network device. In the foregoing technical solution, the access network device may include the network information of the one or more IMS networks in the broadcast message, and broadcast the broadcast message to the user equipment, so that the user equipment may determine, based on the network information of the one or more IMS networks, whether to request to establish a connection to the first IMS. The broadcast message may be periodically sent, may be sent before the registration procedure of the user equipment, may be sent in the registration procedure of the user equipment, or may be sent after the registration procedure of the user equipment.

In a possible implementation, the network information includes one or more of an identifier of a service provider, a network identifier, a network domain name, a data network name, and address information of a proxy call network element. In a possible implementation, the user equipment may obtain, from the core network device, one or more of an identifier of a service provider of an IMS network connected to the non-public network accessed by the user equipment, a network identifier, a network domain name, a data network name, and address information of a proxy call network element, so that the user equipment may determine, based on information from the core network device, whether to initiate a procedure of requesting to obtain an IMS service.

According to an eighth aspect, this application provides a communication method. The method may be performed by a core network device, or may be performed by a component (for example, a chip or a circuit) in a core network device.

In a possible implementation, the method is performed by a core network device, and the method includes: The core network device obtains network information of one or more IMS networks, where the one or more IMS networks are connected to a non-public network accessed by user equipment; and the core network device sends the network information of the one or more IMS networks to the user equipment. In a possible implementation, the core network device may be an access and mobility management network element or a session management network element.

When the core network device is an access and mobility management network element, the access and mobility management network element may obtain the network information of the one or more IMS networks from a session management network element, or the network information of the one or more IMS networks is preconfigured in the access and mobility management network element. When the core network device is a session management network element, the session management network element may obtain the network information of the one or more IMS networks from a unified data management (unified data management, UDM) network element, or the network information of the one or more IMS networks is preconfigured in the session management network element.

In a possible implementation, the method further includes: The core network device receives IMS capability information of the user equipment from the user equipment, where the IMS capability information indicates that the user equipment supports establishment of a connection to an IMS network, or the IMS capability information indicates that the user equipment supports obtaining of an IMS service.

In a possible implementation, the IMS capability information includes the network information of the first IMS network. For example, the IMS capability information is the network information of the first IMS network. The network information of the first IMS network may include one or more of an identifier of a service provider of the first IMS network, a network identifier, a network domain name, a data network name, and address information of a proxy call network element. In this implementation, the user equipment implicitly indicates, to the core network device, that the user equipment supports obtaining of an IMS service, and the user equipment requests establishment of a connection to the first IMS network.

In a possible implementation, the IMS capability information may be indication information, and the indication information may indicate that the user equipment supports obtaining of an IMS service or that the user equipment does not support obtaining of an IMS service. For example, the indication information may be a single bit, a plurality of bits, or a character string. When the indication information is a single bit, when a value of the bit is 1, it indicates that the user equipment supports obtaining of an IMS service; or when a value of the bit is 0, it indicates that the user equipment does not support obtaining of an IMS service. Alternatively, when the indication information is a single bit, when a value of the bit is 0, it indicates that the user equipment supports obtaining of an IMS service; or when a value of the bit is 1, it indicates that the user equipment does not support obtaining of an IMS service. When the indication information is multi-bit, one type of multi-bit may indicate that the user equipment does not support obtaining of an IMS service, and another type of multi-bit may indicate that the user equipment supports obtaining of an IMS service. When the indication information is a character string, one type of character string may indicate that the user equipment does not support obtaining of an IMS service, and another type of character string may indicate that the user equipment supports obtaining of an IMS service.

In a possible implementation, that the core network device receives the IMS capability information of the user equipment from the user equipment includes: The core network device receives the IMS capability information of the user equipment from the user equipment in a registration procedure or a session establishment procedure.

In a possible implementation, that the core network device sends the network information of the one or more IMS networks to the user equipment includes: The core network device sends the network information of the one or more IMS networks to the user equipment in the registration procedure; and when the one or more IMS networks include the first IMS network, the method further includes: The core network device receives a session establishment request message from the user equipment, where the session establishment request message is for establishing a connection between the user equipment and the first IMS network.

In a possible implementation, the network information includes one or more of an identifier of a service provider, a network identifier, a network domain name, a data network name, and address information of a proxy call network element.

For technical effects that can be achieved in the eighth aspect, refer to descriptions of advantageous effects in the seventh aspect. Details are not described herein again.

According to a ninth aspect, this application provides a communication method. The method may be performed by user equipment, or may be performed by a component (for example, a chip or a circuit) in user equipment. In a possible implementation, the method is performed by user equipment, and the method includes: The user equipment obtains network information of the one or more IMS networks from the core network device in a session establishment procedure, where the one or more IMS networks are connected to a non-public network accessed by the user equipment; and the user equipment determines that the one or more IMS networks do not include a first IMS network to which the user equipment requests to connect, and the user equipment sends session modification request information or session release request information to the core network device.

In the foregoing technical solution, the user equipment obtains, from a core network device, the network information of the one or more IMS networks connected to the non-public network accessed by the user equipment, and the user equipment determines, based on the network information of the one or more IMS networks, whether the one or more IMS networks include the first IMS network, which is equivalent to that the user equipment determines whether an IMS network that can provide an IMS service for the user equipment exists in the one or more IMS networks connected to the non-public network accessed by the user equipment. If not, the user equipment may send the session modification request information or the session release request information to the core network device. In a possible implementation, the session modification request information may include message type information of a session modification request message and/or parameter information of the session modification request message. The session release request information may include message type information of a session release request message and/or parameter information of the session release request message. In this manner, when an IMS network that can provide an IMS service for the user equipment exists in the one or more IMS networks connected to the non-public network accessed by the user equipment, the user equipment initiates a procedure of requesting to obtain an IMS service, to avoid a case that the user equipment cannot obtain an IMS service after the user equipment initiates the procedure of requesting an IMS service. This helps reduce signaling overheads and network resource occupation.

According to a tenth aspect, this application provides a communication method. The method may be performed by a core network device, or may be performed by a component (for example, a chip or a circuit) in a core network device. In a possible implementation, the core network device obtains network information of one or more IMS networks, where the one or more IMS networks are connected to a non-public network accessed by user equipment. The core network device sends the network information of the one or more IMS networks to the user equipment in a session establishment procedure, and when the one or more IMS networks do not include the first IMS network, the core network device receives session modification request information or session release request information from the user equipment. In a possible implementation, the session modification request information may include message type information of a session modification request message and/or parameter information of the session modification request message. The session release request information may include message type information of a session release request message and/or parameter information of the session release request message.

For technical effects that can be achieved in the tenth aspect, refer to descriptions of advantageous effects in the ninth aspect. Details are not described herein again.

According to an eleventh aspect, an embodiment of this application provides a communication apparatus. The apparatus may have a function of implementing the session management network element in the first aspect or any possible implementation of the first aspect. The apparatus may be a session management network element, or may be a chip included in a session management network element.

Alternatively, the apparatus may have a function of implementing the user equipment in the second aspect or any possible implementation of the second aspect. The apparatus may be user equipment, or may be a chip included in user equipment.

Alternatively, the apparatus may have a function of implementing the policy control network element in the third aspect or any possible implementation of the third aspect. The apparatus may be a policy control network element, or may be a chip included in a policy control network element.

Alternatively, the apparatus may have a function of implementing the target proxy call network element in the fourth aspect or any possible implementation of the fourth aspect. The apparatus may be a target proxy call network element, or may be a chip included in a target proxy call network element.

Alternatively, the apparatus may have a function of implementing the user equipment in the fifth aspect or any possible implementation of the fifth aspect. The apparatus may be user equipment, or may be a chip included in user equipment.

Alternatively, the apparatus may have a function of implementing the core network device in the sixth aspect or any possible implementation of the sixth aspect. The apparatus may be a core network device, or may be a chip included in a core network device.

Alternatively, the apparatus may have a function of implementing the user equipment in the seventh aspect or any possible implementation of the seventh aspect. The apparatus may be user equipment, or may be a chip included in user equipment.

Alternatively, the apparatus may have a function of implementing the core network device in the eighth aspect or any possible implementation of the eighth aspect. The apparatus may be a core network device, or may be a chip included in a core network device.

The functions of the communication apparatus may be implemented by hardware, or may be implemented by hardware executing corresponding software. The hardware or the software includes one or more modules, units, or means (means) corresponding to the functions.

In a possible implementation, a structure of the apparatus includes a processing module and a transceiver module. The processing module is configured to support the apparatus in performing a corresponding function of the session management network element in the first aspect or any possible implementation of the first aspect, a corresponding function of the user equipment in the second aspect or any possible implementation of the second aspect, a corresponding function of the policy control network element in the third aspect or any possible implementation of the third aspect, or a corresponding function of the target proxy call network element in the fourth aspect or any possible implementation of the fourth aspect. The transceiver module is configured to support communication between the apparatus and another communication device. The communication apparatus may further include a storage module. The storage module is coupled to the processing module, and stores program instructions and data that are necessary for the apparatus.

In an example, the processing module may be a processor, a communication module may be a transceiver, and the storage module may be a memory. The memory may be integrated with the processor, or may be disposed separately from the processor.

In another possible implementation, a structure of the apparatus includes a processor, and may further include a memory. The processor is coupled to the memory, and may be configured to execute computer program instructions stored in the memory, to enable the apparatus to perform the method in the first aspect or any possible implementation of the first aspect, the method in the second aspect or any possible implementation of the second aspect, the method in the third aspect or any possible implementation of the third aspect, the method in the fourth aspect or any possible implementation of the fourth aspect, the method in the fifth aspect or any possible implementation of the fifth aspect, the method in the sixth aspect or any possible implementation of the sixth aspect, the method in the seventh aspect or any possible implementation of the seventh aspect, and the method in the eighth aspect or any possible implementation of the eighth aspect.

Optionally, the apparatus further includes a communication interface, and the processor is coupled to the communication interface. When the apparatus is a session management network element, user equipment, a policy control network element, or a target proxy call network element, the communication interface may be a transceiver or an input/output interface. When the apparatus is a chip included in a session management network element, user equipment, a policy control network element, or a target proxy call network element, the communication interface may be an input/output interface of the chip. Optionally, the transceiver may be a transceiver circuit, and the input/output interface may be an input/output circuit.

According to a twelfth aspect, an embodiment of this application provides a chip system, including: a processor, where the processor is coupled to a memory, the memory is configured to store a program or instructions, and when the program or the instructions are executed by the processor, the chip system is enabled to implement the method in the first aspect or any possible implementation of the first aspect, the method in the second aspect or any possible implementation of the second aspect, the method in the third aspect or any possible implementation of the third aspect, the method in the fourth aspect or any possible implementation of the fourth aspect, the method in the fifth aspect or any possible implementation of the fifth aspect, the method in the sixth aspect or any possible implementation of the sixth aspect, the method in the seventh aspect or any possible implementation of the seventh aspect, and the method in the eighth aspect or any possible implementation of the eighth aspect.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by hardware, the processor may be a logic circuit, an integrated circuit, or the like. When the processor is implemented by software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory ROM. The memory and the processor may be integrated on a same chip, or may be separately disposed on different chips.

According to a thirteenth aspect, an embodiment of this application provides a computer-readable storage medium. The computer-readable storage medium stores a computer program or instructions. When the computer program or the instructions are executed, a computer is enabled to perform the method in the first aspect or any possible implementation of the first aspect, the method in the second aspect or any possible implementation of the second aspect, the method in the third aspect or any possible implementation of the third aspect, the method in the fourth aspect or any possible implementation of the fourth aspect, the method in the fifth aspect or any possible implementation of the fifth aspect, the method in the sixth aspect or any possible implementation of the sixth aspect, the method in the seventh aspect or any possible implementation of the seventh aspect, and the method in the eighth aspect or any possible implementation of the eighth aspect.

According to a fourteenth aspect, an embodiment of this application provides a computer program product. When a computer reads and executes the computer program product, the computer is enabled to perform the method in the first aspect or any possible implementation of the first aspect, the method in the second aspect or any possible implementation of the second aspect, the method in the third aspect or any possible implementation of the third aspect, the method in the fourth aspect or any possible implementation of the fourth aspect, the method in the fifth aspect or any possible implementation of the fifth aspect, the method in the sixth aspect or any possible implementation of the sixth aspect, the method in the seventh aspect or any possible implementation of the seventh aspect, and the method in the eighth aspect or any possible implementation of the eighth aspect.

According to a fifteenth aspect, an embodiment of this application provides a communication system. The communication system includes a session management network element configured to perform the first aspect or any possible implementation of the first aspect, and user equipment configured to perform the second aspect or any possible implementation of the second aspect. Optionally, the communication system includes a policy control network element configured to perform the third aspect or any possible implementation of the third aspect;

or the communication system includes a session management network element configured to perform the first aspect or any possible implementation of the first aspect, user equipment configured to perform the second aspect or any possible implementation of the second aspect, a policy control network element configured to perform the third aspect or any possible implementation of the third aspect, and a target proxy call network element configured to perform the fourth aspect or any possible implementation of the fourth aspect.

Alternatively, the communication system includes user equipment configured to perform the fifth aspect or any possible implementation of the fifth aspect, and a core network device configured to perform the sixth aspect or any possible implementation of the sixth aspect;

or the communication system includes user equipment configured to perform the seventh aspect or any possible implementation of the seventh aspect, and a core network device configured to perform the eighth aspect or any possible implementation of the eighth aspect.

For technical effects that can be achieved in any one of the eleventh aspect to the fifteenth aspect, refer to descriptions of technical effects that can be achieved in any one of the first aspect to the ninth aspect. Details are not described herein again.

DESCRIPTION OF EMBODIMENTS

Figure 1:
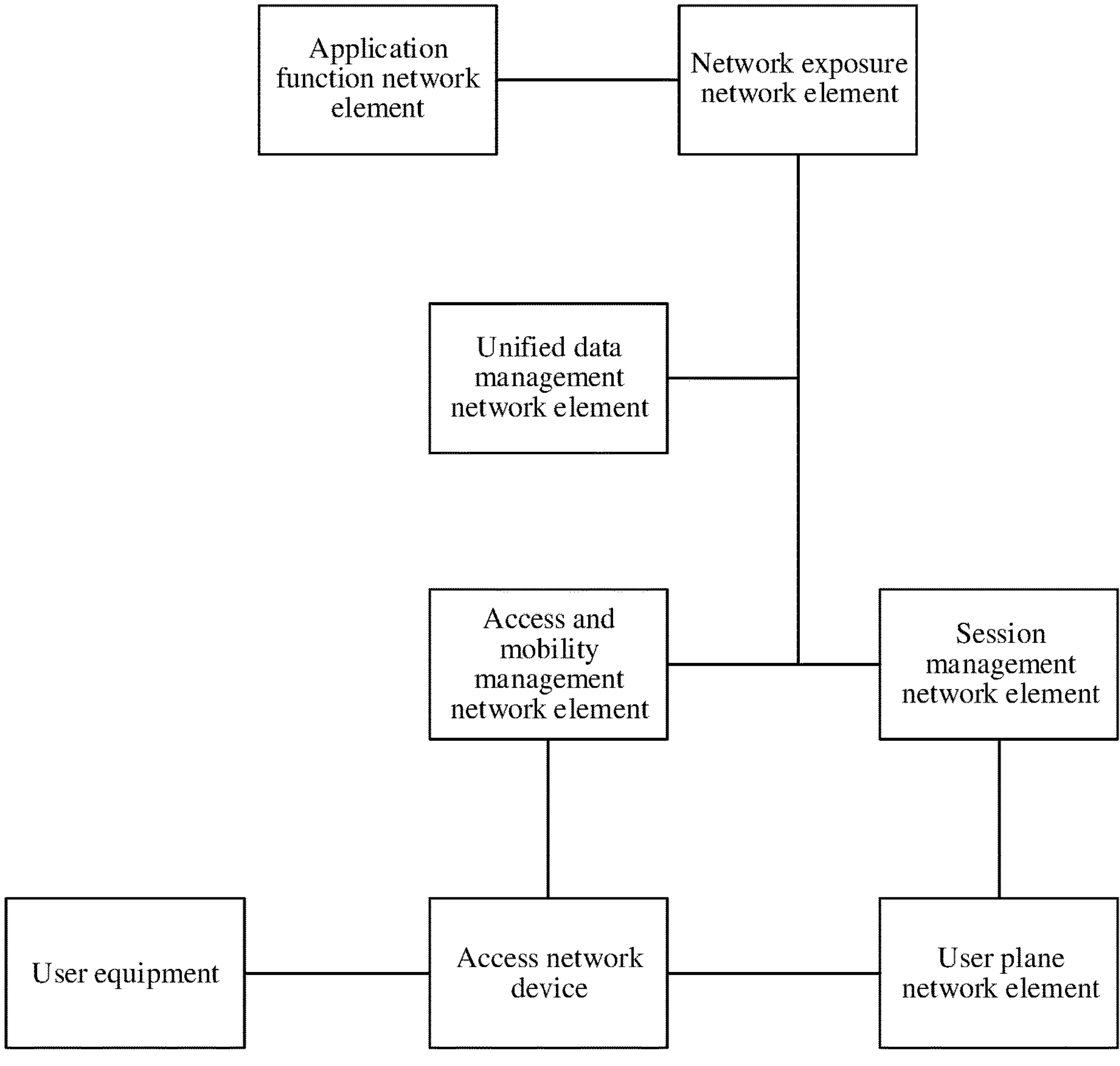
FIG. 1 shows a system architecture of a non-public network according to an example of this application.

For ease of description, the following first explains related technologies and/or terms in this application.

1. An IMS network mainly involves the following functional entities:

A home subscriber server (home subscriber server, HSS) serves as a database that stores subscriber information in the IMS, mainly stores subscriber authentication information, specific subscriber information, dynamic subscriber information, network policy rules, and equipment identity register information, and is used for mobility management and subscriber service data management. The HSS is a logical entity and can include a plurality of physical databases physically.

A call session control function (call session control function, CSCF) network element is a core part of the IMS, and is mainly configured to control the Session Initiation Protocol (session initiation protocol, SIP) based on packet switching. In the IMS, the call session control function network element is responsible for processing a user multimedia session, and may be regarded as a SIP server in an IETF architecture. According to respective different main functions, call session control function network elements are classified into a proxy-call session control function (proxy-call session control function, P-CSCF) network element, an interrogation-call session control function (interrogation-call session control function, I-CSCF) network element, and a serving-call session control function (serving-call session control function, S-CSCF) network element. The three functions may be physically separated or independent. In this application, the proxy-call session control function network element may also be referred to as a proxy call network element, the interrogation-call session control function network element may also be referred to as an interrogation call network element, and the serving-call session control function network element may also be referred to as a serving call network element.

A multimedia resource function (multimedia resource function, MRF) network element mainly implements multi-party call and multimedia conference functions. The multimedia resource function network element includes a multimedia resource function controller (multimedia resource function controller, MRFC) and a multimedia resource function processor (multimedia resource function processor, MRFP) that respectively implement functions of controlling and bearing media streams. The multimedia resource function controller parses Session Initiation Protocol signaling received from the serving-call session control function network element, and uses a media gateway control protocol instruction to control the multimedia resource function processor to implement corresponding media stream encoding/decoding, conversion, mixing, and playing functions.

Gateway functions include an IMS breakout gateway control function (breakout gateway control function, BGCF), a media gateway control function (media gateway control function, MGCF), an IMS media gateway (IMS media gateway, IMS MGW), and a signaling gateway (signaling gateway, SGW).

2. Standalone non-public network (or independent private network or non-public network). To be specific, the network does not depend on a public land mobile network (public land mobile network, PLMN) and is operated by an operator exclusive to the non-public network. All network element devices in a non-public network serve user equipment in the non-public network, and control plane signaling and user plane data in the non-public network are usually not transmitted to an external network, thereby achieving a specific security and privacy effect.

For example, FIG. 1 shows a system architecture of a non-public network according to this application. The system architecture includes the following devices or network elements:

User equipment may also be referred to as a terminal device, a mobile station (mobile station, MS), a mobile terminal (mobile terminal, MT), or the like, and is a device that provides voice and/or data connectivity for a user. For example, the user equipment may include a handheld device or a vehicle-mounted device that has a wireless connection function. Currently, the user equipment may be a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. In FIG. 1, the user equipment shown as UE is used merely as an example, and the user equipment is not limited.

An access network (access network, AN) device may also be referred to as an access network element, and is configured to provide a wireless access service for the user equipment. The access network device is a device, in the communication system, that enables the user equipment to access a wireless network. The access network device is a node in the radio access network, and may also be referred to as a base station, or may also be referred to as a radio access network (radio access network, RAN) node (or device). Currently, for example, the access network device is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home Node B, HNB), a baseband unit (baseband unit, BBU), or a wireless fidelity (wireless fidelity, Wi-Fi) access point (access point, AP).

A main function of an application function network element is interaction with a 3rd Generation Partnership Project (the 3rd generation partnership project, 3GPP) core network to provide a service, to affect service flow routing, access network capability exposure, policy control, and the like. For example, in 5G, the application function network element may be an application function (application function, AF) network element. In future communication, for example, 6G, the application function network element may still be an AF network element or have another name. This is not limited in this application. When the application function network element is an AF network element, the AF network element may provide a Naf service.

A network exposure network element may be configured to enable the 3GPP to securely provide a network service capability for an AF (for example, a service capability server (service capability server, SCS) or an application server (application server, AS)) of a third party. For example, in 5G, the network exposure network element may be a network exposure function (network exposure function, NEF) network element. In a future communication system, for example, 6G, the network exposure network element may still be an NEF network element or have another name. This is not limited in this application. When the network exposure network element is an NEF, the NEF may provide an Nnef service for another network function network element.

A unified data management network element may be configured to manage subscription data of the user equipment, registration information related to the user equipment, and the like. For example, in 5G, the unified data management network element may be a unified data management (unified data management, UDM) network element. In a future communication system, for example, in 6G, the unified data management function network element may still be a UDM network element or have another name. This is not limited in this application. When the unified data management network element is a UDM network element, the UDM network element may provide an Nudm service.

An access and mobility management network element may be configured to manage access control and mobility of the user equipment. In actual application, the access and mobility management network element includes an access and mobility management function of a mobility management entity (mobility management entity, MME) in a network framework in Long Term Evolution (long term evolution, LTE), and includes an access management function. Specifically, the access and mobility management network element may be responsible for registration of the user equipment, mobility management, a tracking area update procedure, reachability detection, selection of a session management network element, mobility state transition management, and the like. For example, in 5G, the access and mobility management network element may be an access and mobility management function (access and mobility management function, AMF) network element. In future communication, for example, in 6G, the access and mobility management network element may still be an AMF network element or have another name. This is not limited in this application. When the access and mobility management network element is an AMF network element, the AMF may provide an Namf service.

A session management network element may be responsible for session management (including session establishment, modification, and release) of the user equipment, selection and reselection of a user plane function network element, Internet Protocol (Internet Protocol, IP) address assignment of the user equipment, quality of service (quality of service, QoS) control, and the like. For example, in 5G, the session management network element may be a session management function (session management function, SMF) network element. In a future communication system, for example, in 6G, the session management network element may still be an SMF network element or have another name. This is not limited in this application. When the session management network element is an SMF network element, the SMF may provide an Nsmf service.

A user plane function (user plane function, UPF) network element may be responsible for forwarding and receiving user data in the user equipment. The user plane function network element may receive user data from a data network, and transmit the user data to the user equipment through the access network device; or the user plane function network element may receive user data from the user equipment through the access network device, and forward the user data to a data network. A transmission resource and a scheduling function that are used by the user plane function network element to provide a service for the user equipment are managed and controlled by the session management function network element.

In actual deployment, network elements in a non-public network can be co-deployed. For example, the access and mobility management network element may be co-deployed with the session management network element, and the session management network element may be co-deployed with the user plane network element. When two network elements are co-deployed, interaction between the two network elements provided in embodiments of this application becomes an internal operation of the co-deployed network elements or may be omitted.

Solutions provided in embodiments of this application are not only applicable to a non-public network, but also applicable to another network such as a neutral network or a non-3GPP access network. This is not limited in embodiments of this application.

Figure 2A:
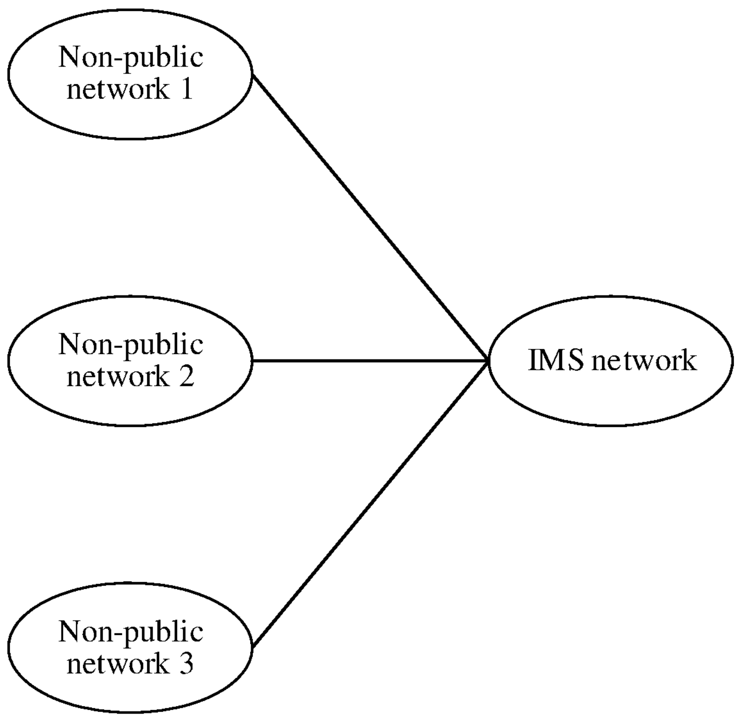
FIG. 2*a* is a schematic diagram of a connection relationship between a non-public network and an IMS network according to this application.

In the conventional technology, for a connection relationship between a non-public network and an IMS network, refer to FIG. 2*a*. One non-public network is connected only to one IMS network, and one IMS network may be connected to one or more non-public networks. For example, an IP multimedia private identity (IP multimedia private identity, IMPI) and an IP multimedia public identity (IP multimedia public identity, IMPU) of user equipment in a non-public network are based on a subscription permanent identifier (subscription permanent identifier, SUPI) of the user equipment in the non-public network. When an IMS network receives IMS messages of the user equipment from different non-public networks, the IMS network may determine, based on the IP multimedia private identity and the IP multimedia public identity, a non-public network from which the user equipment comes.

Figure 2B:
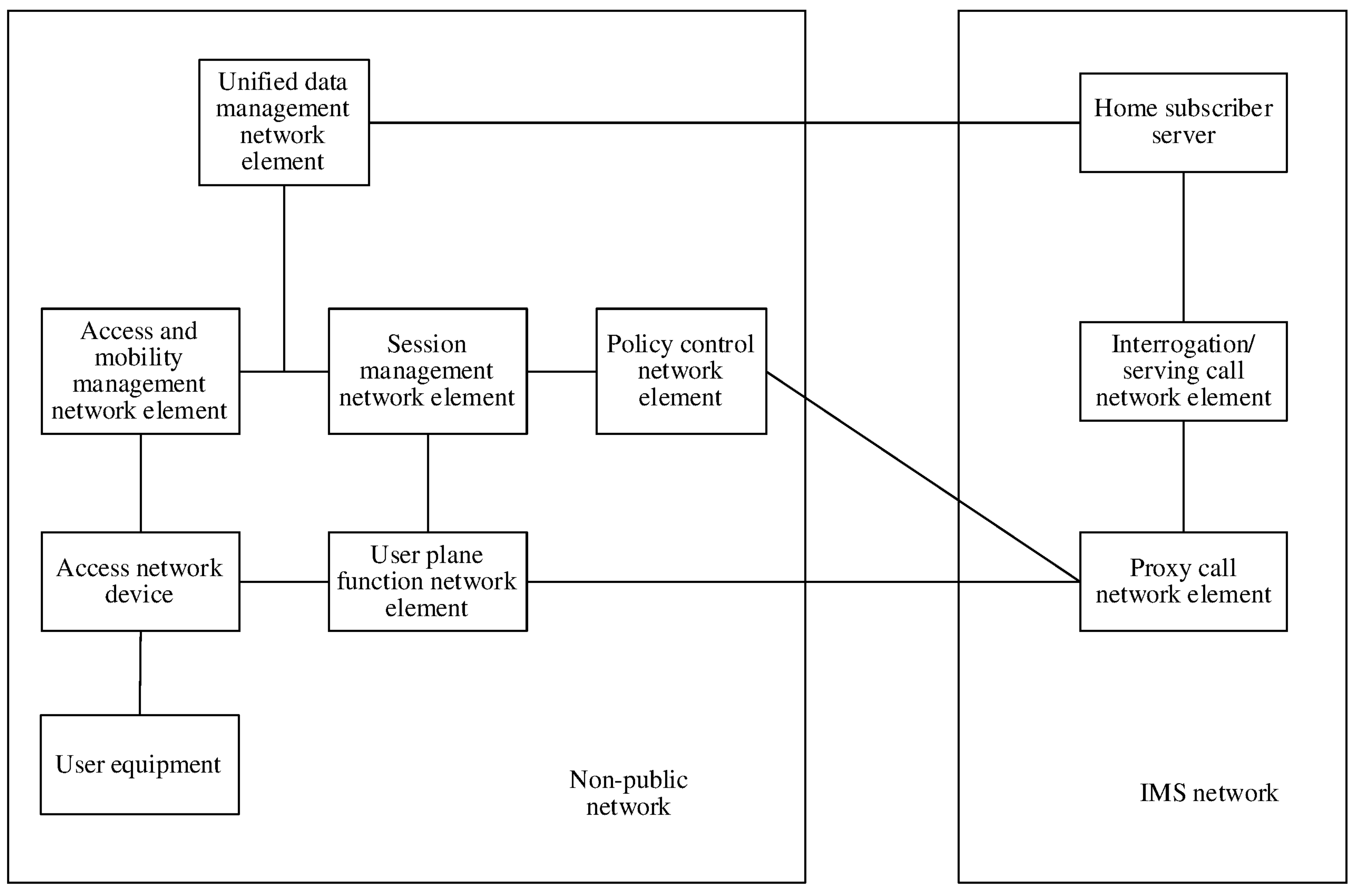
FIG. 2*b* is a schematic diagram of another connection relationship between a non-public network and an IMS network according to this application.

Further, FIG. 2*b* is an example of a schematic diagram of a structure of a connection between an IMS network and a non-public network. The non-public network includes user equipment, an access network device, an access and mobility management network element, a user plane function network element, a session management network element, a policy control network element, and a unified data management network element. The IMS network includes a home subscriber server, a proxy call network element, and an interrogation/serving call network element. One non-public network can be connected to only one IMS network.

Figure 3:
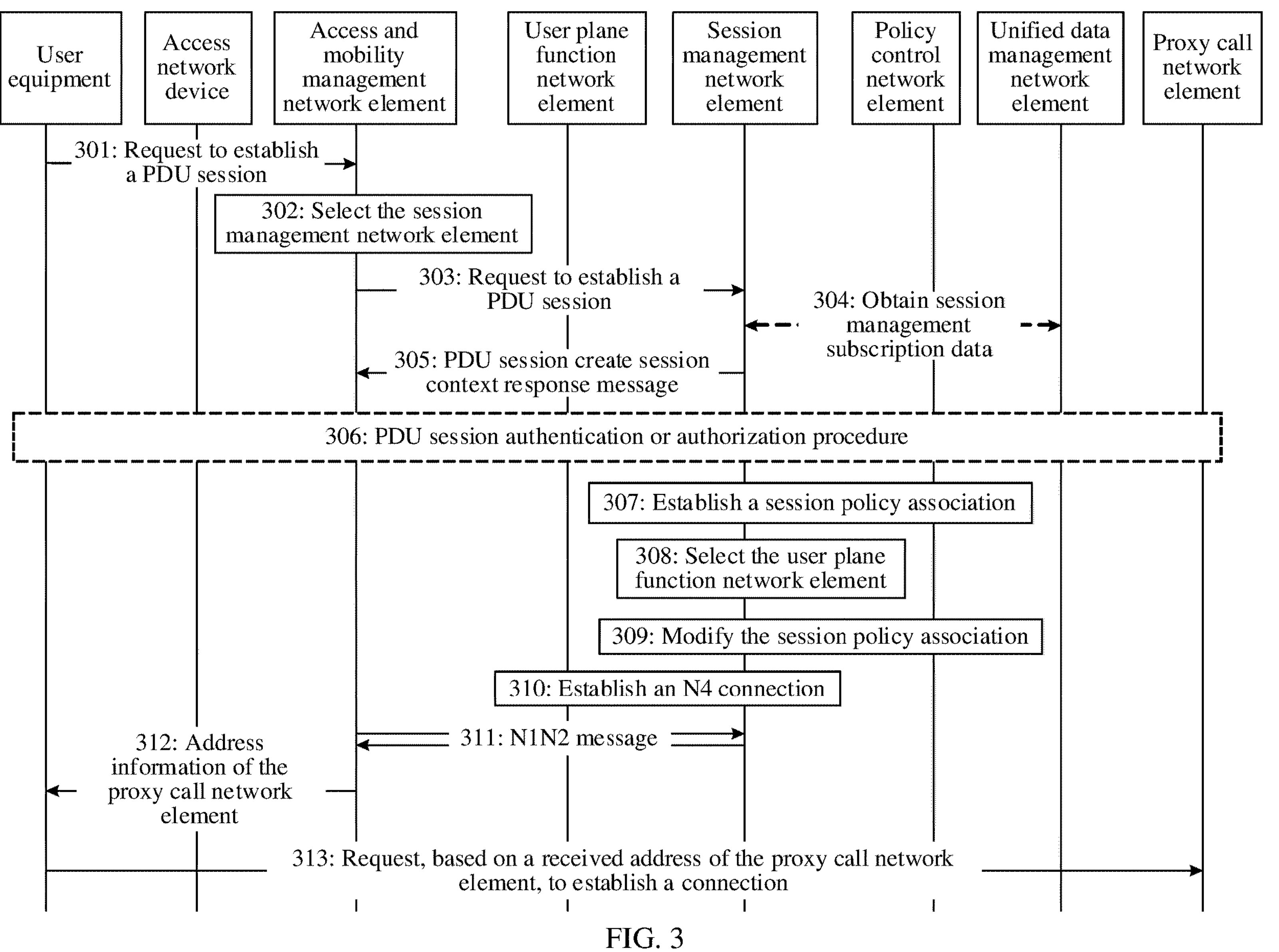
FIG. 3 is a schematic flowchart of establishing a session between user equipment and an IMS network according to this application.

With reference to the architectural diagram in FIG. 2*b*, FIG. 3 is a schematic flowchart of establishing a session between user equipment and an IMS network according to this application.

Step 301: User equipment requests an access and mobility management network element to establish a protocol data unit (protocol data unit, PDU) session.

For example, the user equipment sends a non-access stratum (non-access stratum, NAS) message to the access and mobility management network element. The NAS message carries parameters such as a session identifier (PDU Session ID), a data network name requested by the user equipment (UE Requested data network name, UE Requested DNN), and single network slice selection assistance information (single network slice selection assistance information, S-NSSAI). The UE requested DNN may be determined by the user equipment based on a service provider to which the user equipment belongs. For example, if the user equipment corresponds to a service provider A, the UE requested DNN is a name of an IMS network provided by the service provider A.

Step 302: The access and mobility management network element selects a session management network element.

Step 303: The access and mobility management network element requests the session management network element to establish a PDU session.

For example, the access and mobility management network element sends a PDU session create session context request message to the session management network element. The PDU session create session context request message carries parameters such as an SUPI, a UE requested DNN, and a PDU session ID.

Optionally, step 304: The session management network element obtains session management subscription data from a unified data management network element.

Step 305: The session management network element sends a PDU session create session context response message to the access and mobility management network element.

Optionally, step 306: Perform a PDU session authentication or authorization procedure.

Step 307: The session management network element establishes a session policy association with a policy control network element. Specifically, if a dynamic policy control and charging (policy control and charging, PCC) rule is required, the session management network element selects a policy control network element, and establishes a session policy association with the policy control network element.

Step 308: The session management network element selects a user plane function network element. Step 308 is optional.

Step 309: The session management network element performs a session policy association modification to the policy control network element. In this step, the session management network element sends, to the policy control network element, an IP address allocated to the user equipment.

Step 309 is performed when step 307 is performed.

Step 310: The session management network element establishes an N4 connection to the user plane function network element.

Step 311: The session management network element sends an N1N2 message (Namf_Communication_N1N2Message transfer) to the access and mobility management network element. The N1N2 message carries information such as a tunnel endpoint identifier of the user plane function network element, and the information is sent to an access network device, to notify the access network device of a destination peer end of uplink data. If the PDU session is used for an IMS, the session management network element further includes address information of a proxy call network element in the N1N2 message.

Step 312: The access and mobility management network element sends the address information of the proxy call network element to the user equipment.

For example, the access and mobility management network element sends a NAS message to the user equipment. The NAS message carries the address information of the proxy call network element.

Step 313: The user equipment requests, based on a received address of the proxy call network element, to establish a connection to the proxy call network element.

For example, the user equipment sends SIP signaling (which may also be referred to as IMS signaling or an IMS message) to the proxy call network element. The SIP signaling is for requesting to establish a connection to an IMS network. A destination address of the SIP signaling is the address of the proxy call network element received by the user equipment.

Figure 4:
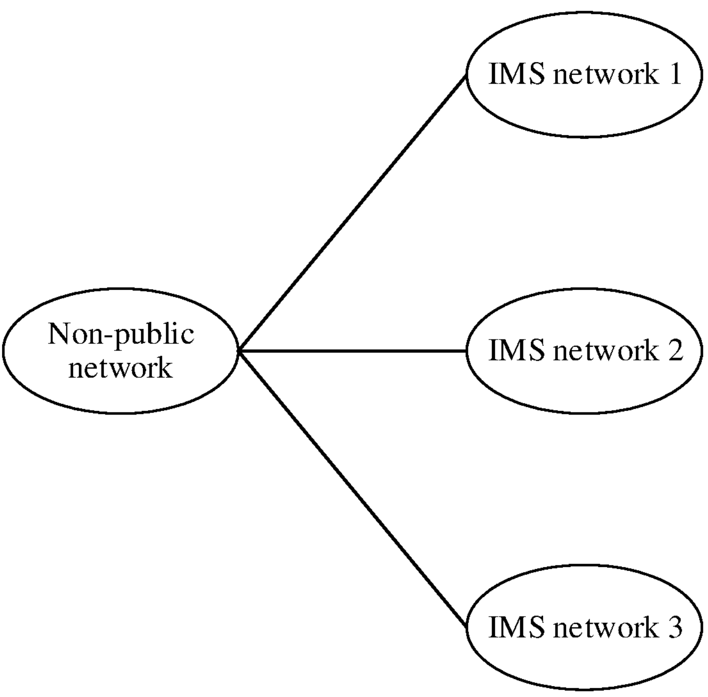
FIG. 4 is a schematic diagram of still another connection relationship between a non-public network and an IMS network according to this application.

To enable a non-public network to establish session connections between user equipments of different service providers and IMS networks provided by the corresponding service providers, FIG. 4 shows another system architecture provided in an example of this application. In the system architecture, one non-public network may be connected to a plurality of IMS networks.

For example, as shown in FIG. 4, the non-public network is connected to each of an IMS network 1, an IMS network 2, and an IMS network 3. The IMS network 1 is provided by a service provider 1, the IMS network 2 is provided by a service provider 2, and the IMS network 3 is provided by a service provider 3. Specifically, the service provider 1, the service provider 2, and the service provider 3 respectively correspond to identification information: a service provider identifier 1 (SP ID1), a service provider identifier 2 (SP ID2), and a service provider identifier 3 (SP ID3). The IMS network 1, the IMS network 2, and the IMS network 3 respectively correspond to identification information: an IMS network identifier 1 (IMS ID1), an IMS network identifier 2 (IMS ID2), and an IMS network identifier 3 (IMS ID3). An example of each embodiment of this application may be described with reference to FIG. 4.

It should be further noted that one IMS network may still continue to connect to one or more non-public networks.

When user equipment in a non-public network requests to connect to an IMS network, the non-public network needs to determine an IMS network to which the user equipment requests to connect (the IMS network to which the user equipment requests to connect is referred to as a target IMS network below). For example, as shown in FIG. 4, if user equipment belongs to the service provider 1, when the user equipment requests to connect to an IMS network, the non-public network determines that the target IMS network is the IMS network 1, and then the non-public network establishes a session connection between the user equipment and the IMS network 1.

Figure 5A:
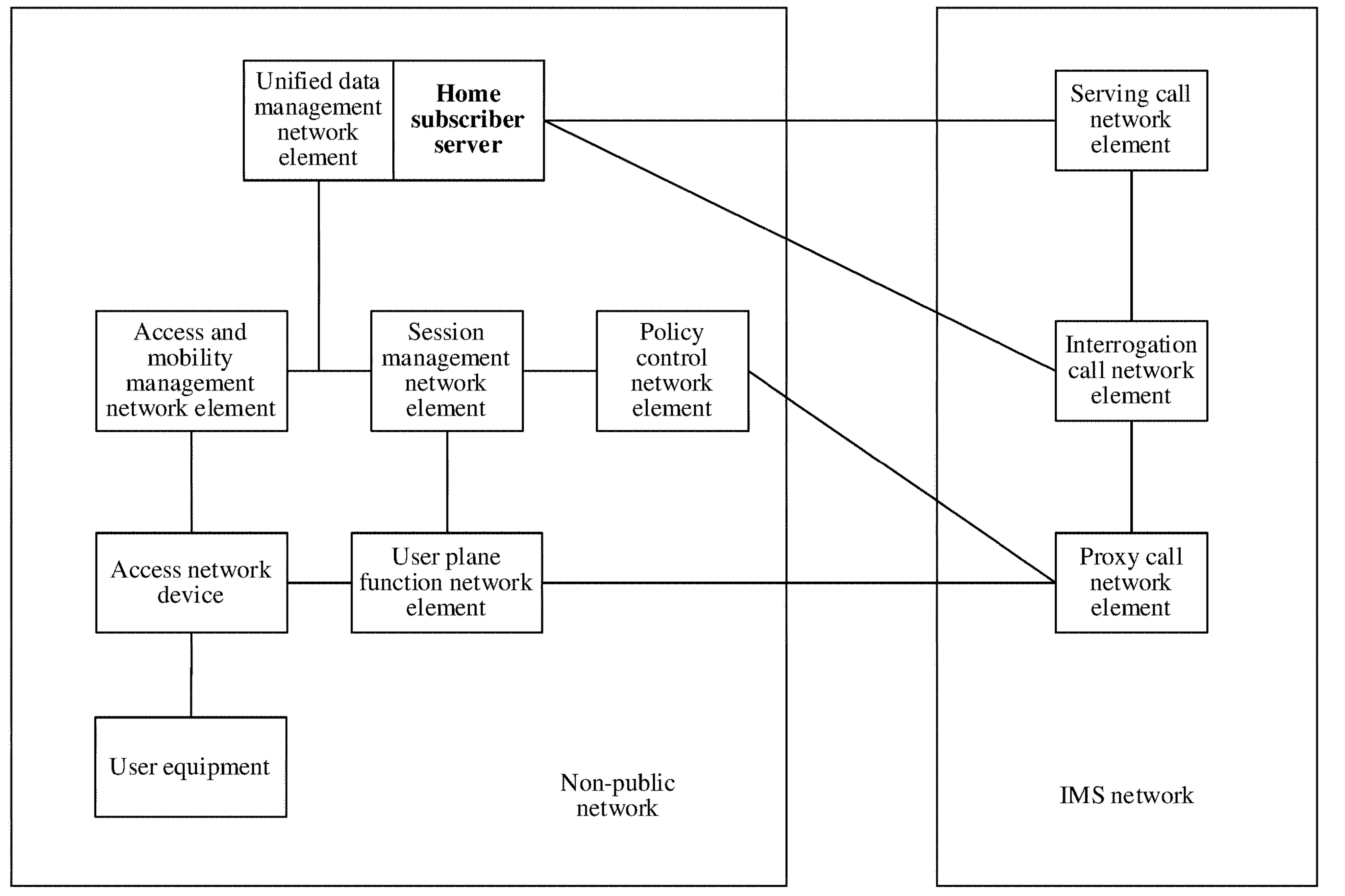
FIG. 5*a* is a schematic diagram of a non-public network in which a home subscriber server is deployed according to this application.

In an optional manner, as shown in FIG. 5*a*, an IMS network home subscriber server (IMS HSS) may be deployed in a non-public network, and the home subscriber server stores subscription data of user equipment in the IMS network. When the user equipment initiates a PDU session establishment request message, the non-public network determines, through a unified data management network element and the home subscriber server, service provider information of a target IMS network to which the user equipment intends to connect, to determine the target IMS network and a proxy call network element in the target IMS network. The non-public network establishes a connection between a user plane function network element and the proxy call network element, to complete PDU session establishment.

Figure 5B:
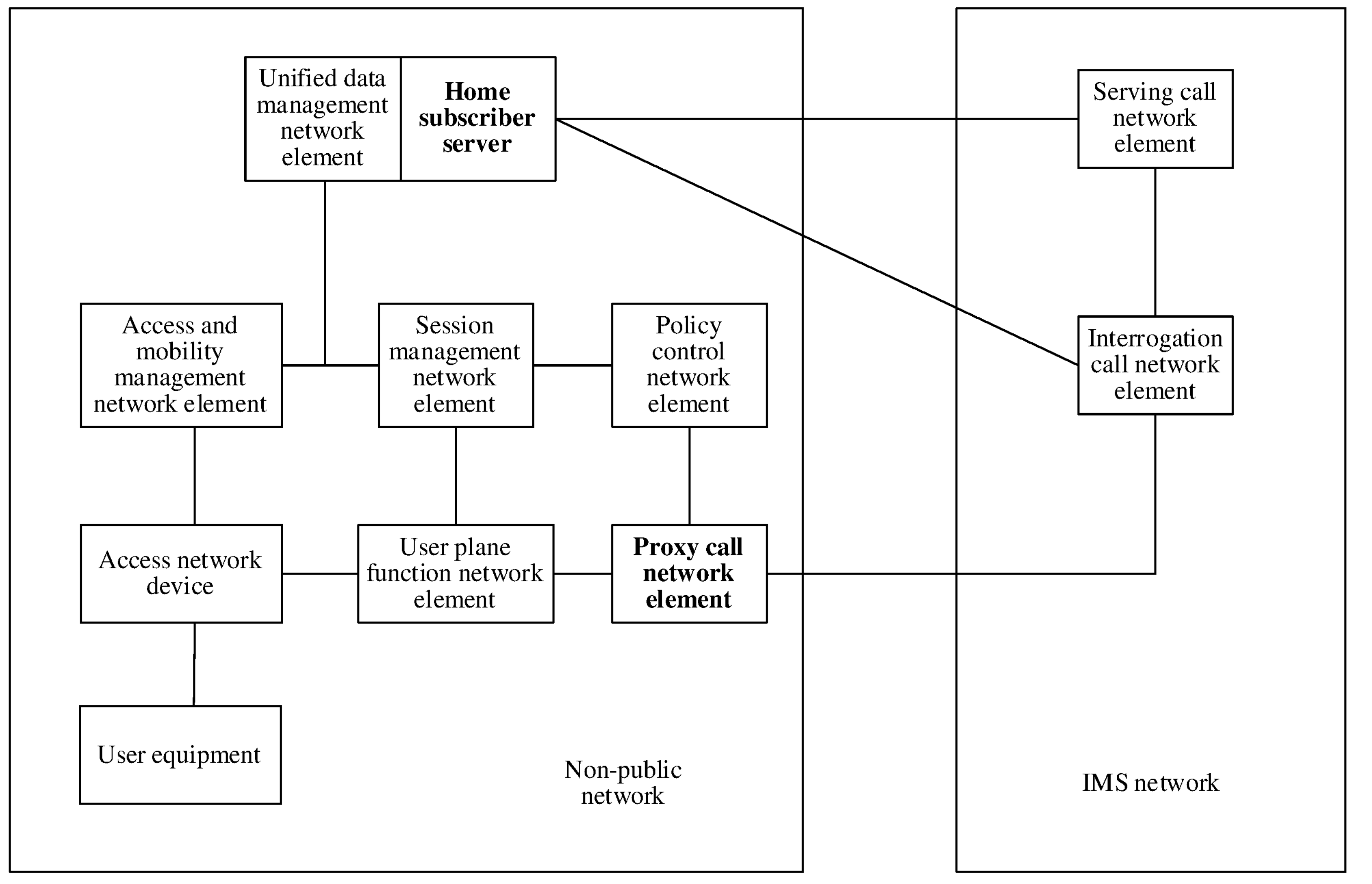
FIG. 5*b* is a schematic diagram of a non-public network in which a home subscriber server a proxy call network element without a service provider attribute are deployed according to this application.

In another optional manner, as shown in FIG. 5*b*, a home subscriber server and a proxy call network element without a service provider attribute may be deployed in a non-public network, where the home subscriber server stores subscription data of user equipment in an IMS network, and a user-plane function network element is connected to the proxy call network element through an N6 interface. When the user equipment initiates a PDU session establishment request message, the proxy call network element may learn of service provider information of the user equipment by querying the home subscriber server, to determine a target IMS network and an interrogation call network element in the target IMS network based on the service provider information of the user equipment. When receiving an IMS message from the user equipment, the proxy call network element may send the IMS message to the interrogation call network element in the target IMS network.

As shown in each of FIG. 5*a* and FIG. 5*b*, a new functional network element needs to be added to the non-public network, and consequently deployment costs are increased.

Based on this, this application provides a communication method, to determine a target IMS network from a plurality of IMS networks connected to a non-public network and establish a session connection between user equipment and the target IMS network.

In addition, based on the method provided in this application, deployment costs are reduced. When a proxy call network element corresponding to each IMS network is deployed in the IMS network, no home subscriber server needs to be added to a non-public network. Refer to FIG. 5*a*. A target IMS network may be determined from a plurality of IMS networks when no home subscriber server is deployed in the non-public network.

Alternatively, when a proxy call network element without a service provider attribute is deployed in a non-public network, no home subscriber server needs to be added to the non-public network. Refer to FIG. 5*b*. A target IMS network may be determined from a plurality of IMS networks when no home subscriber server is deployed in the non-public network.

It should be understood that the communication method provided in this application is applicable to two architectures:

Architecture 1: A proxy call network element corresponding to each IMS network is deployed in the IMS network. For the architecture 1, refer to FIG. 5*a*, and no home subscriber server needs to be deployed in a non-public network.

Architecture 2: A proxy call network element without a service provider attribute is deployed in a non-public network. For the architecture 2, refer to FIG. 5*b*, and no home subscriber server needs to be deployed in the non-public network.

Figure 6:
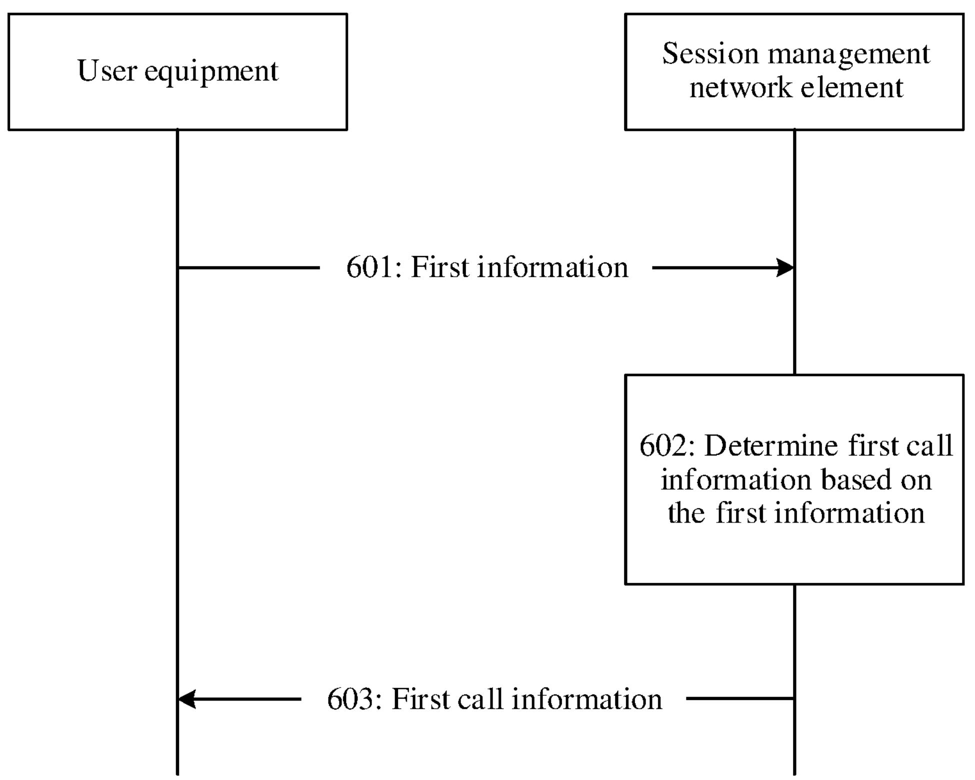
FIG. 6 is a schematic flowchart of a communication method according to this application.

Refer to a schematic flowchart shown in FIG. 6. Descriptions are as follows: The flowchart relates to a non-public network and a plurality of IMS networks connected to the non-public network. The non-public network determines a target IMS network from the plurality of IMS networks, where the target IMS network is provided by a service provider (which may be referred to as a target service provider) of user equipment.

Further, the non-public network includes a session management network element, an access and mobility management network element, a policy control network element, the user equipment, an access network device, and the like, and an IMS network includes an interrogation call network element. Based on the foregoing architecture 1 and architecture 2, a proxy call network element may be located in the non-public network, or may be located in an IMS network.

Step 601: The user equipment sends first information to the session management network element.

The first information indicates the target IMS network to which the user equipment requests to connect.

The first information may be directly sent by the user equipment to the session management network element, or sent by the user equipment to the session management network element through the access and mobility management network element.

The first information may be sent by the user equipment when requesting to establish a session connection, or may be sent by the user equipment before requesting to establish a session connection. For example, the user equipment sends a PDU session establishment request message (NAS message) to the access and mobility management network element, where the PDU session establishment request message includes the first information. The access and mobility management network element selects the session management network element, and then sends the first information to the session management network element. In a feasible implementation, the access and mobility management network element sends a PDU session create session context request message to the session management network element, where the PDU session create session context request message includes the first information.

The first information may include identification information of the target service provider and/or first call information. The identification information of the target service provider may be specifically any information that may represent a service provider that provides a target IMS network service, such as a target service provider identifier, a target operator identifier, or a target operator network identifier. The first call information indicates a target proxy call network element in the target IMS network. Specifically, the first call information may be address information of the target proxy call network element in the target IMS network.

In a first optional implementation, the user equipment may send the identification information of the target service provider as the first information to the session management network element.

For example, the user equipment may first obtain a first set, where the first set includes identification information of a service provider to which each IMS network in the plurality of IMS networks connected to the non-public network belongs. The user equipment determines, from the first set, identification information of a service provider requested by the user equipment (namely, the identification information of the target service provider), and sends the identification information of the target service provider to the session management network element.

With reference to the example of FIG. 4, the first set includes the SP ID1, the SP ID2, and the SP ID3. If the user equipment corresponds to the service provider 1, the user equipment determines the SP ID1 from the first set, and sends the SP ID1 to the session management network element.

In this optional implementation, the first set may be obtained by the user equipment from the access network device, the access and mobility management network element, or the session management network element.

In a first example, the first set may be sent by the access network device to the user equipment, and the access network device may send the first set based on a request of the user equipment, or may broadcast the first set to the user equipment. The first set may be carried in a radio resource control (radio resource control, RRC) message sent by the access network device to the user equipment, a Media Access Control control element (Media Access Control control element, MAC CE), or downlink control information (downlink control information, DCI).

In a second example, the user equipment may send first request information to the access and mobility management network element, where the first request information is for requesting the first set from the access and mobility management network element. The access and mobility management network element receives the first request information, and sends first response information including the first set to the user equipment. Optionally, the access and mobility management network element may obtain the first set from the session management network element.

Optionally, the first request information may be carried in a NAS message sent by the user equipment to the access and mobility management network element. The first request information may be used as an independent NAS message, or may be carried in an existing NAS message. The first response information may be carried in a NAS message sent by the access and mobility management network element to the user equipment. The first response information may be used as an independent NAS message, or may be carried in an existing NAS message.

It should be noted that, an objective of obtaining the first set by the user equipment is to determine whether a target IMS network providing a service for the user equipment exists in the plurality of IMS networks connected to the non-public network. Therefore, if determining that identification information of a service provider to which the user equipment belongs exists in the first set, the user equipment determines that a target IMS network exists in the plurality of IMS networks, and the user equipment may establish a session connection via the non-public network to obtain an IMS service provided by the target IMS network. If determining that a target IMS network does not exist in the plurality of IMS networks, the user equipment may determine that no session connection can be established via the non-public network to obtain an IMS service provided by the target IMS network.

In addition, the user equipment may alternatively directly use the identification information of the service provider of the user equipment as the first information, and the non-public network determines whether a target IMS network exists in the plurality of IMS networks, that is, determines whether a session connection between the user equipment and the target IMS network can be established. With reference to the foregoing example, the user equipment may send the SP ID1 to the session management network element, where the SP ID1 indicates the IMS network 1 provided by the service provider 1. If the non-public network determines, based on the SP ID1, that the IMS network 1 exists in the plurality of IMS networks, a session connection between the user equipment and the IMS network 1 is established.

The first information may be data network name information. It should be noted that in the conventional technology, data network name information corresponding to an IMS network is specifically "IMS", which does not include the identification information of the target service provider. However, in this solution, the data network name information is enhanced data network name information, which includes the identification information of the service provider in comparison with the data network name information in the conventional technology. The user equipment sends the data network name information to the session management network element, and the session management network element may obtain the identification information of the target service provider based on the data network name information.

Optionally, the data network name information may be obtained by the user equipment from the access network device, the access and mobility management network element, or the session management network element.

For example, the access network device broadcasts a second set, where the second set includes data network name information corresponding to each IMS network in the plurality of IMS networks connected to the non-public network, and the data network name information corresponding to each IMS network includes identification information of a service provider to which the IMS network belongs. The user equipment determines the data network name information from the second set based on the service provider to which the user equipment belongs.

With reference to the example of FIG. 4, data network name information corresponding to the IMS network 1, the IMS network 2, and the IMS network 3 is DNN1 (including the SP ID1), DNN2 (including the SP ID2), and DNN3 (including the SP ID3) respectively, and the second set broadcast by the access network device includes DNN1, DNN2, and DNN3. If the user equipment corresponds to the service provider 1, the user equipment determines the DNN1 from the second set, and sends the DNN1 to the session management network element.

In addition, the second set may further include a service provider corresponding to a DNN. For example, the second set includes (SP ID1 and DNN1), (SP ID2 and DNN2), and (SP ID3 and DNN3). The user equipment receives the second set, determines, based on the service provider 1 corresponding to the user equipment, the DNN1 corresponding to the SP ID1 from the second set, and sends the DNN1 to the session management network element.

In another example, the user equipment sends second request information to the access and mobility management network element, where the second request information is for requesting, from the access and mobility management network element, data network name information of an IMS network provided by the target service provider, and the second request information includes the identification information of the target service provider.

Further, the second request information may further include the identification information of the target service provider and first indication information, where the first indication information indicates that the second request information is a request message for requesting the data network name information of the IMS network provided by the target service provider.

The access and mobility management network element determines, based on the identification information of the target service provider in the second request information, whether the access and mobility management network element has data network name information corresponding to the identification information of the target service provider. If yes, the access and mobility management network element sends second response information including the data network name information to the user equipment; or if not, after obtaining the data network name information from the session management network element, sends second response information including the data network name information to the user equipment.

In a specific implementation, the access and mobility management network element sends the identification information of the target service provider to the session management network element, and the session management network element sends the data network name information to the access and mobility management network element based on the identification information of the target service provider. Optionally, the access and mobility management network element may further send second indication information to the session management network element, where the second indication information indicates the session management network element to send the data network name information to the access and mobility management network element.

With reference to the example of FIG. 4, the user equipment sends second request information to the access and mobility management network element, where the second request information includes SP ID1. If the access and mobility management network element determines, based on the SP ID1 in the second request information, that the access and mobility management network element does not have DNN1 corresponding to the SP ID1, the access and mobility management network element obtains the DNN1 from the session management network element, and sends the DNN1 to the user equipment.

In a second optional implementation, the user equipment may send the first call information as the first information to the session management network element.

In the architecture 1, a proxy call network element corresponding to each IMS network is deployed in the IMS network, and the non-public network determines, based on the first information, a target proxy call network element and a target IMS network to which the target proxy call network element belongs.

For example, in the system architecture in FIG. 4, proxy call information corresponding to the IMS network 1, the IMS network 2, and the IMS network 3 is proxy call information 1, proxy call information 2, and proxy call information 3 respectively. If the user equipment sends the proxy call information 1 to the session management network element, the session management network element determines, based on the proxy call information 1, that the target IMS network is the IMS network 1, and selects a user plane function network element that can establish a connection to the IMS network 1.

For example, the user equipment may determine the first call information in the following manner 1 and manner 2.

Manner 1: The user equipment obtains the first call information from the access network device.

The access network device may broadcast a third set (which may also be referred to as third information) to the user equipment, where the third set includes identification information of a service provider to which each IMS network in the plurality of IMS networks connected to the non-public network belongs and corresponding proxy call information. The user equipment determines corresponding proxy call information based on identification information of a service provider to which the user equipment belongs, where the proxy call information is the first call information.

With reference to the example of FIG. 4, the third set includes the SP ID1 and the proxy call information 1 corresponding to the IMS network 1, the SP ID2 and the proxy call information 2 corresponding to the IMS network 2, and the SP ID3 and the proxy call information 3 corresponding to the IMS network 3. If the service provider to which the user equipment belongs corresponds to the SP ID1, the user equipment determines, from the third set, that the proxy call information 1 is the first information.

It should be noted that an objective of obtaining the third set by the user equipment is to determine whether a target IMS network providing a service for the user equipment exists in the plurality of IMS networks connected to the non-public network. Therefore, if determining that identification information of a service provider to which the user equipment belongs exists in the third set, the user equipment determines that the target IMS network exists in the plurality of IMS networks, and the user equipment may establish a session connection via the non-public network to obtain an IMS service provided by the target IMS network. If determining that a target IMS network does not exist in the plurality of IMS networks, the user equipment may determine that no session connection can be established via the non-public network to obtain an IMS service provided by the target IMS network.

Manner 2: The user equipment obtains the first call information from a domain name system server (domain name system server, DNS server).

The user equipment may request the first call information from the domain name system server.

For example, domain name information of an IMS network (namely, domain name information of a target IMS network) provided by a service provider to which the user equipment belongs is preconfigured in the user equipment. For example, the domain name information of the target IMS network may be an ims.mnc99.mcc999.3gppnetwork.org, where mnc represents a mobile network code (mobile network code), which is a code of an operator network in a country; and mcc represents a mobile country code (mobile country code), which is a three-digit code that uniquely specifies a country. The domain name information indicates an IMS network provided by an operator whose mobile network code is 99 in a country whose mobile country code is 999.

The user equipment sends third request information to the domain name system server, where the third request information includes the domain name information of the target IMS network and the identification information of the non-public network, where the identification information of the non-public network may be a network identifier of the non-public network (for example, a public land mobile network identifier (public land mobile network identifier, PLMN ID)+a network identifier (network identifier, NID)). The domain name system server receives the third request information, and determines, based on the domain name information of the target IMS network and the identification information of the non-public network in the third request information, proxy call information (namely, first call information) corresponding to a domain name of the target IMS network, where a proxy call network element indicated by the first call information is connected to the non-public network, and the domain name system server sends third response information including the first call information to the user equipment.

In addition, if the domain name system server determines that no proxy call information corresponding to the domain name of the target IMS network exists, the third response information fed back to the user equipment indicates that the query fails or indicates that the non-public network is not connected to the target IMS network.

The domain name system server may be deployed in the session management network element. In other words, the session management network element has a function of the domain name system server. In this manner, that the user equipment obtains the first call information from the domain name system server is equivalent to that the user equipment obtains the first call information from the session management network element. The user equipment may obtain the first call information from the session management network element through a control plane message or a user plane message.

In the second optional implementation, for example, the session management network element pre-obtains a first correspondence, where the first correspondence includes identification information of a service provider corresponding to each IMS network in the plurality of IMS networks connected to the non-public network and proxy call information (for example, address information of a proxy call network element). The user equipment sends the first call information to the session management network element, and the first call information may implicitly indicate the target service provider to which the user equipment belongs or implicitly indicate identification information of the target service provider to which the user equipment belongs.

With reference to the example of FIG. 4, Table 1 shows a first correspondence, where the first correspondence includes identification information and proxy call information of service providers respectively corresponding to the IMS network 1 to the IMS network 3. If the first call information is proxy call address information 1 (P-CSCF IP1), it may indicate that the target service provider to which the user equipment belongs is the service provider 1 and the identification information of the target service provider to which the user equipment belongs is the SP ID1.

TABLE 1

| Identification information of service providers | Proxy call information |
|---|---|
| SP ID1 | P-CSCF IP1 |
| SP ID2 | P-CSCF IP2 |
| SP ID3 | P-CSCF IP3 |

In a third optional implementation, the user equipment sends the identification information of the target service provider and the first call information together as the first information to the session management network element, where the proxy call information corresponding to the target IMS network provided by the target service provider is the first call information. For the specific implementation, refer to the first optional implementation and the second optional implementation. Details are not described again.

Step 602: The session management network element determines first call information based on the first information.

Case 1: The first information includes the identification information of the target service provider.

In the architecture 1, a proxy call network element corresponding to each IMS network is deployed in the IMS network. The session management network element determines first call information based on the identification information of the target service provider included in the first information, where the first call information indicates the target proxy call network element (namely, the proxy call network element in the target IMS network), which is equivalent to that the session management network element determines the target IMS network from the plurality of IMS networks connected to the non-public network.

In an optional implementation, the session management network element includes the first correspondence. The session management network element determines, from the first correspondence based on the identification information of the target service provider, the proxy call information corresponding to the identification information of the target service provider, that is, the first call information. With reference to the example of the foregoing Table 1, if the identification information of the target service provider included in the first information is the SP ID1, the session management network element may determine that the first call information is the P-CSCF IP1.

In the architecture 2, a proxy call network element without a service provider attribute is deployed in the non-public network, and the session management network element may determine, based on the identification information of the service provider, proxy call information (which may also be referred to as first call information) of the proxy call network element without a service provider attribute deployed in the non-public network.

Case 2: The first information includes the first call information.

The session management network element may determine the first call information from the first information.

Certainly, the first information may further include the identification information of the target service provider and the first call information. For the specific implementation, refer to the foregoing case 1 and case 2, and details are not described again.

Step 603: The session management network element sends the first call information to the user equipment.

Correspondingly, the user equipment receives the first call information from the session management network element, and the user equipment may determine destination address information of the IMS message based on the first call information.

For example, once obtaining the address information of the target proxy call network element, the user equipment may send the IMS message to the target proxy call network element to obtain an IMS service provided by the target IMS network.

In the foregoing technical solution, one non-public network is connected to a plurality of IMS networks, to provide respective IMS network services for user equipments of different service providers. Further, the user equipment sends the first information to the session management network element, where the first information may include the identification information of the target service provider and/or the first call information, and the session management network element may determine, based on the first information, the target IMS network to which the user equipment requests to connect, to establish a session connection between the user equipment and the target IMS network, without adding a home subscriber server to the non-public network. This helps reduce deployment costs.

Further, when the first information is the data network name information, the user equipment may use an existing session establishment procedure, and the non-public network may learn of the IMS network to which the user equipment requests to connect without adding an additional information element or parameter, to complete session establishment.

In addition, it should be noted that, in the architecture 2, a proxy call network element without a service provider attribute is deployed in the non-public network. Although the user equipment sends, based on the first call information, an IMS message to a target proxy call network element without a service provider attribute in the non-public network, the target proxy call network element is connected to IMS networks respectively provided by a plurality of service providers, and before sending the IMS message to the target interrogation call network element in the target IMS network, the target proxy call network element determines the target interrogation call network element in the target IMS network.

In an optional implementation, the target proxy call network element obtains a target association, where the target association includes the identification information of the user equipment and the interrogation call information corresponding to the user equipment. The identification information of the user equipment may be an IP address of the user equipment or an identifier (Identifier, ID) of the user equipment. The interrogation call information corresponding to the user equipment may be address information of an interrogation call network element in an IMS network corresponding to a service provider to which the user equipment belongs.

For example, Table 2 shows a target association obtained by the target proxy call network element. Table 2 includes identification information of the user equipment and interrogation call information corresponding to the user equipment. One or more user equipments may correspond to the same interrogation call information.

TABLE 2

| Identification information of user equipments | Interrogation call information |
|---|---|
| UE IP1 | I-CSCF IP1 |
| UE IP2 | I-CSCF IP2 |
| UE IP3 | I-CSCF IP3 |
| UE IP4 | I-CSCF IP3 |
| UE IP5 | I-CSCF IP3 |

In addition, the target association may further include identification information of a service provider to which the user equipment belongs. For example, Table 3 shows another target association obtained by the target proxy call network element. Table 3 includes identification information of the user equipment, identification information of a service provider to which the user equipment belongs, and interrogation call information corresponding to the user equipment. One or more user equipments may correspond to the same interrogation call information, and one or more user equipments may correspond to identification information of the same service provider.

TABLE 3

| Identification information of user equipments | Identification information of service providers | Interrogation call information |
|---|---|---|
| UE IP1 | SP ID1 | I-CSCF IP1 |
| UE IP2 | SP ID2 | I-CSCF IP2 |
| UE IP3 | SP ID3 | I-CSCF IP3 |
| UE IP4 | SP ID3 | I-CSCF IP3 |
| UE IP5 | SP ID3 | I-CSCF IP3 |

If receiving the IMS message, the target proxy call network element may determine, based on the identification information of the user equipment in the IMS message, interrogation call information (namely, second call information) corresponding to the identification information of the user equipment from the target association, and send the IMS message to an interrogation call network element corresponding to the second call information.

For example, in Table 2, if the IMS message includes the UE IP1, the target proxy call network element determines that the second call information is the I-CSCF IP1, and the target proxy call network element sends the IMS message to an interrogation call network element corresponding to the I-CSCF IP1.

In this embodiment of this application, the target proxy call network element may obtain the target association from the session management network element or the policy control network element. Alternatively, the target association may be configured on the target proxy call network element.

For example, the session management network element or the policy control network element determines the target association, and sends the target association to the target proxy call network element. Different cases are explained and described as follows:

It should be noted that the target proxy call network element, the session management network element, or the policy control network element may obtain a second correspondence, where the second correspondence includes identification information of a service provider corresponding to each of the plurality of IMS networks connected to the non-public network and interrogation call information. With reference to FIG. 4, Table 4 shows a second correspondence, where the second correspondence includes identification information of service providers corresponding to the IMS network 1 to the IMS network 3 respectively and interrogation call information.

TABLE 4

| Identification information of service providers | Interrogation call information |
|---|---|
| SP ID1 | I-CSCF IP1 |
| SP ID2 | I-CSCF IP2 |
| SP ID3 | I-CSCF IP3 |

Case 1: The session management network element determines the target association.

For example, the user equipment sends the first information to the session management network element, where the first information includes the identification information of the target service provider. The session management network element determines, based on the identification information of the target service provider and the identification information of the user equipment with reference to the second correspondence, an association between the identification information of the user equipment and the interrogation call information, that is, the target association shown in Table 2; or an association between the identification information of the user equipment, the identification information of the service provider to which the user equipment belongs, and the interrogation call information, that is, the target association shown in Table 3.

The session management network element sends the target association to the target proxy call network element, or the session management network element sends the target association to the target proxy call network element via the policy control network element.

Case 2: The policy control network element determines the target association.

For example, the user equipment sends the first information to the session management network element, where the first information includes the identification information of the target service provider, and the session management network element sends, to the policy control network element, the second information including the identification information of the target service provider and the identification information of the user equipment. The policy control network element receives the second information, and determines, with reference to the second correspondence, an association between the identification information of the user equipment and the interrogation call information, that is, the target association shown in Table 2; or an association between the identification information of the user equipment, the identification information of the service provider to which the user equipment belongs, and the interrogation call information, that is, the target association shown in Table 3.

the policy control network element sends the target association to the target proxy call network element.

Case 3: The target proxy call network element determines the target association.

For example, the user equipment sends the first information to the session management network element, where the first information includes the identification information of the target service provider, and the session management network element sends the second information including the identification information of the target service provider and the identification information of the user equipment to the target proxy call network element, or sends the second information to the target proxy call network element through the policy control network element. The target proxy call network element receives the second information, and determines, with reference to the second correspondence, an association between the identification information of the user equipment and the interrogation call information, that is, the target association shown in Table 2; or an association between the identification information of the user equipment, the identification information of the service provider to which the user equipment belongs, and the interrogation call information, that is, the target association shown in Table 3.

In the foregoing technical solution, one non-public network is connected to a plurality of IMS networks, to provide respective IMS network services for user equipments of different service providers. When a proxy call network element without a service provider attribute is deployed in the non-public network, the proxy call network element may determine an interrogation call network element based on the target association, to send the IMS message from the user equipment to the interrogation call network element.

Figure 7:
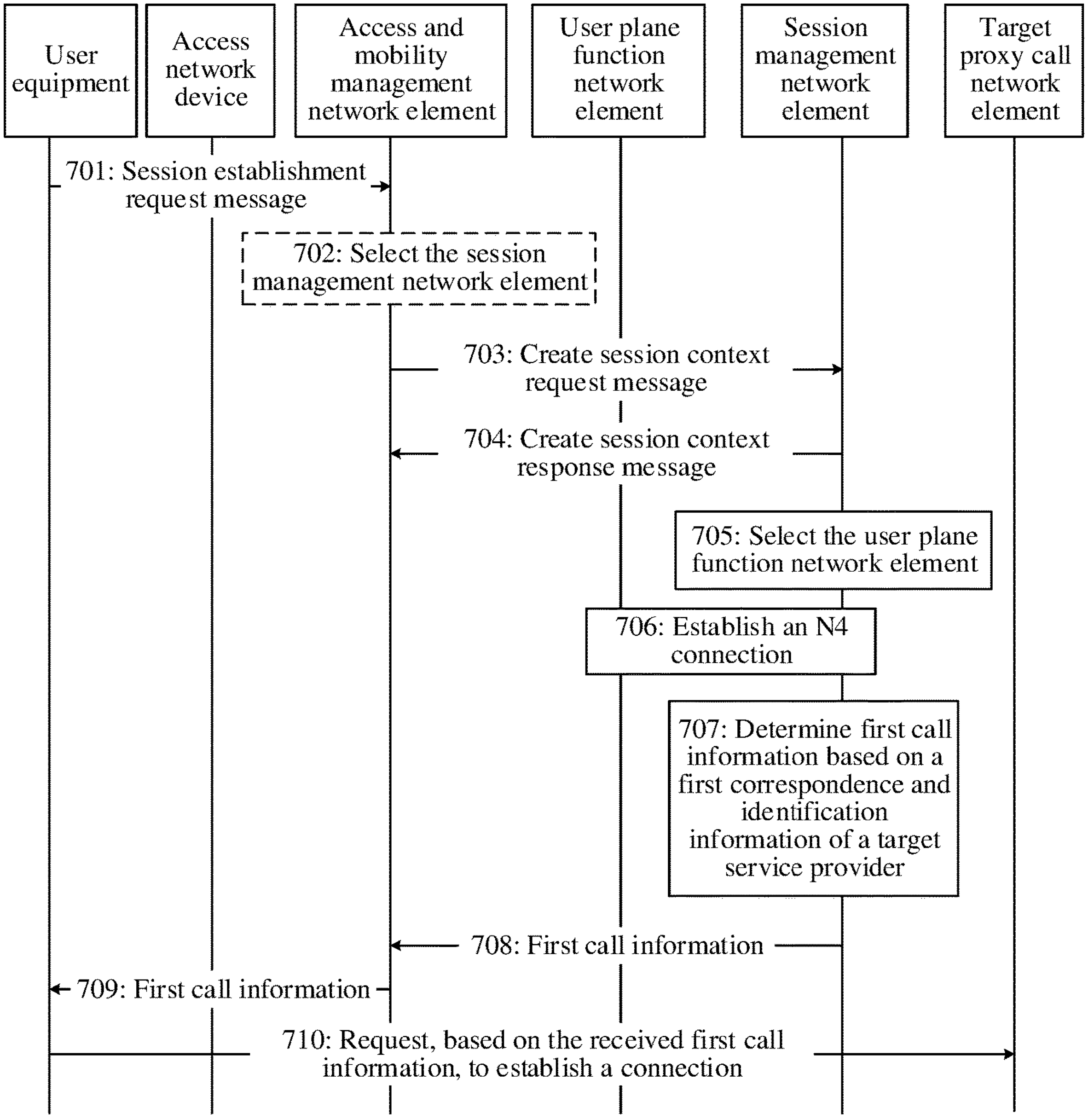
FIG. 7 is a schematic flowchart of a first session connection method according to an example of this application.

Based on the same inventive concept, FIG. 7 is a first schematic flowchart of establishing a session connection between user equipment and a target IMS network according to an example of this application. This embodiment is applicable to the case that a proxy call network element corresponding to each IMS network is deployed in the IMS network in the architecture 1.

First information includes identification information of a target service provider. A non-public network determines, based on the identification information of the target service provider, first call information indicating a target proxy call network element. The first call information is for establishing a session connection between the user equipment and the target IMS network.

Step 701: The user equipment sends a session establishment request message to an access and mobility management network element. For example, the user equipment sends a NAS message to the access and mobility management network element, where the NAS message includes parameters such as a session identifier, a data network name requested by the user equipment, and slice information, and further includes the identification information of the target service provider.

Optionally, step 702: The access and mobility management network element selects a session management network element.

Step 703: The access and mobility management network element sends a create session context request message to the session management network element. For example, the access and mobility management network element sends a PDU session create session context request message to the session management network element. The PDU session create session context request message carries parameters such as a session identifier and a data network name requested by the user equipment, and further includes the identification information of the target service provider.

Step 704: The session management network element sends a create session context response message to the access and mobility management network element. For example, the session management network element sends a PDU session create session context response message to the access and mobility management network element.

Step 705: The session management network element selects a user plane function network element. For example, the session management network element selects, from a plurality of user plane function network elements based on the identification information of the target service provider, a user plane function network element connected to the IMS network provided by the target service provider.

Step 706: The session management network element establishes an N4 connection to the user plane function network element.

Step 707: The session management network element determines first call information based on a first correspondence and the identification information of the target service provider.

Step 708: The session management network element sends the first call information to the access and mobility management network element. For example, the session management network element sends an N1N2 message (Namf_Communication_N1N2Message transfer) to the access and mobility management network element. The N1N2 message includes the first call information.

Step 709: The access and mobility management network element sends the first call information to the user equipment.

For example, the access and mobility management network element sends a NAS message to the user equipment. The NAS message carries the first call information.

Step 710: The user equipment requests, based on the received first call information, to establish a connection to a target proxy call network element.

For example, the user equipment sends SIP signaling (which may also be referred to as IMS signaling or an IMS message) to the target proxy call network element based on the received first call information. The SIP signaling is for requesting to establish a connection to an IMS network. A destination address of the SIP signaling is an address of the target proxy call network element indicated by the first call information.

For all steps that are not described in detail in this embodiment of this application, refer to descriptions in the embodiment related to FIG. 3 or FIG. 6.

Figure 8A:
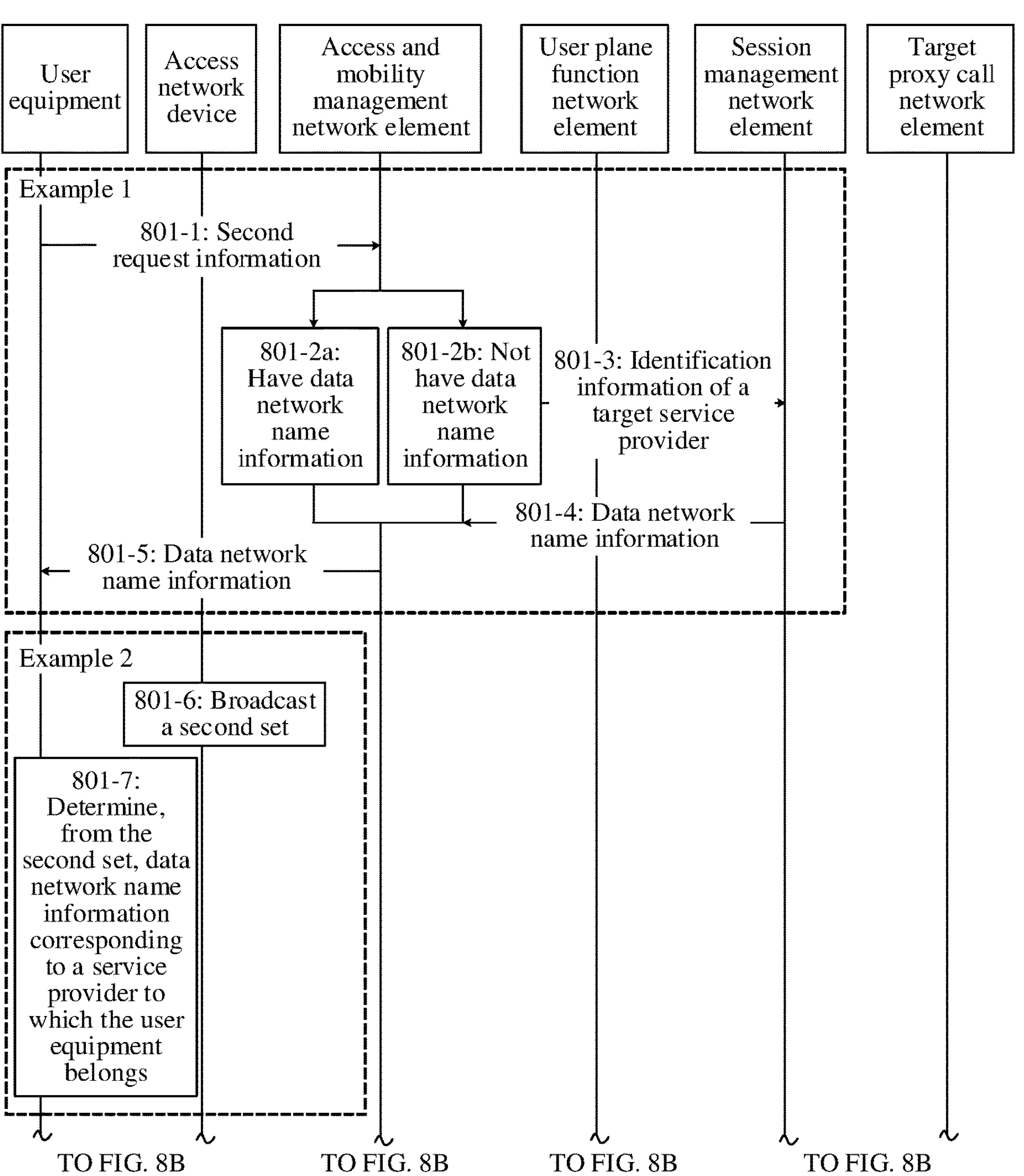
FIG. 8A and FIG. 8B are a schematic flowchart of a second session connection method according to an example of this application.
Figure 8B:
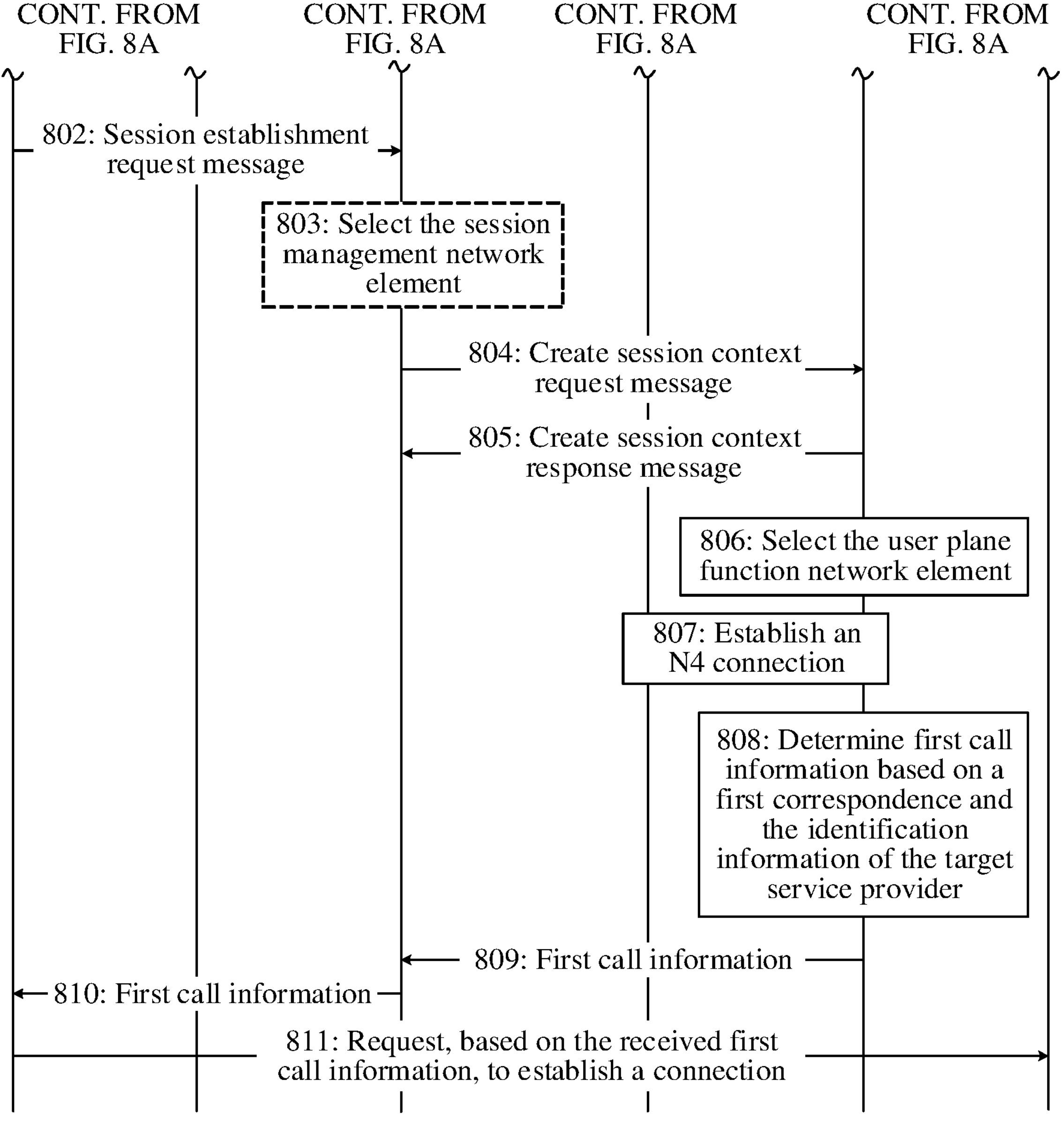

Based on the same inventive concept, FIG. 8A and FIG. 8B are a second schematic flowchart of establishing a session connection between user equipment and a target IMS network according to this application. This embodiment is applicable to the case that a proxy call network element corresponding to each IMS network is deployed in the IMS network in the architecture 1.

First information is data network name information, where the data network name information includes identification information of a target service provider. A non-public network determines, based on the identification information of the target service provider, first call information indicating a target proxy call network element, to establish a session connection between the user equipment and the target IMS network.

Step 801: The user equipment may obtain the data network name information based on a method in the following example 1 or example 2.

Example 1: The user equipment obtains the data network name information from an access and mobility management network element. Refer to the following step 801-1 to step 801-5.

Step 801-1: The user equipment sends second request information to the access and mobility management network element, where the second request information includes the identification information of the target service provider. For example, the second request information may be carried in a NAS message, and the NAS message may be specifically a registration request message sent by the user equipment to the access and mobility management network element in a registration procedure.

Step 801-2*a*: If the access and mobility management network element has the data network name information corresponding to the identification information of the target service provider, perform step 801-5.

Step 801-2*b*: If the access and mobility management network element does not have the data network name information corresponding to the identification information of the target service provider, perform step 801-3 to step 801-5.

Step 801-3: The access and mobility management network element sends the identification information of the target service provider to a session management network element.

Step 801-4: The session management network element sends the data network name information to the access and mobility management network element. Information between the access and mobility management network element and the session management network element may be carried in an Nsmf message.

Step 801-5: The access and mobility management network element sends the data network name information to the user equipment.

Example 2: The user equipment obtains the data network name information from an access network device. Refer to the following steps 801-6 and steps 801-7.

Step 801-6: The access network device broadcasts a second set, where the second set includes data network name information corresponding to each IMS network in a plurality of IMS networks connected to the non-public network.

Step 801-7: The user equipment determines, from the second set, data network name information corresponding to a service provider to which the user equipment belongs.

Step 802: The user equipment sends a session establishment request message to an access and mobility management network element. For example, the user equipment sends a NAS message to the access and mobility management network element, where the NAS message includes parameters such as a session identifier, data network name information, and slice information, and the data network name information includes the identification information of the target service provider.

Optionally, step 803: The access and mobility management network element selects a session management network element.

Step 804: The access and mobility management network element sends a create session context request message to the session management network element. For example, the access and mobility management network element sends a PDU session create session context request message to the session management network element, where the PDU session create session context request message carries parameters such as a session identifier, data network name information, and slice information, and the data network name information includes the identification information of the target service provider.

Step 805: The session management network element sends a create session context response message to the access and mobility management network element. For example, the session management network element sends a PDU session create session context response message to the access and mobility management network element.

Step 806: The session management network element selects a user plane function network element. For example, the session management network element selects, from a plurality of user plane function network elements based on the identification information of the target service provider in the data network name information, a user plane function network element connected to the target IMS network provided by the target service provider.

Step 807: The session management network element establishes an N4 connection to the user plane function network element.

Step 808: The session management network element determines first call information based on a first correspondence and the identification information of the target service provider.

Step 809: The session management network element sends the first call information to the access and mobility management network element. For example, the session management network element sends an N1N2 message (Namf_Communication_N1N2Message transfer) to the access and mobility management network element. The N1N2 message includes the first call information.

Step 810: The access and mobility management network element sends the first call information to the user equipment.

Step 811: The user equipment requests, based on the received first call information, to establish a connection to a target proxy call network element.

For example, the user equipment sends SIP signaling (which may also be referred to as IMS signaling or an IMS message) to the target proxy call network element based on the received first call information. The SIP signaling is for requesting to establish a connection to an IMS network. A destination address of the SIP signaling is an address of the target proxy call network element indicated by the first call information.

For all steps that are not described in detail in this embodiment of this application, refer to descriptions in the embodiment related to FIG. 3 or FIG. 6.

Figure 9:
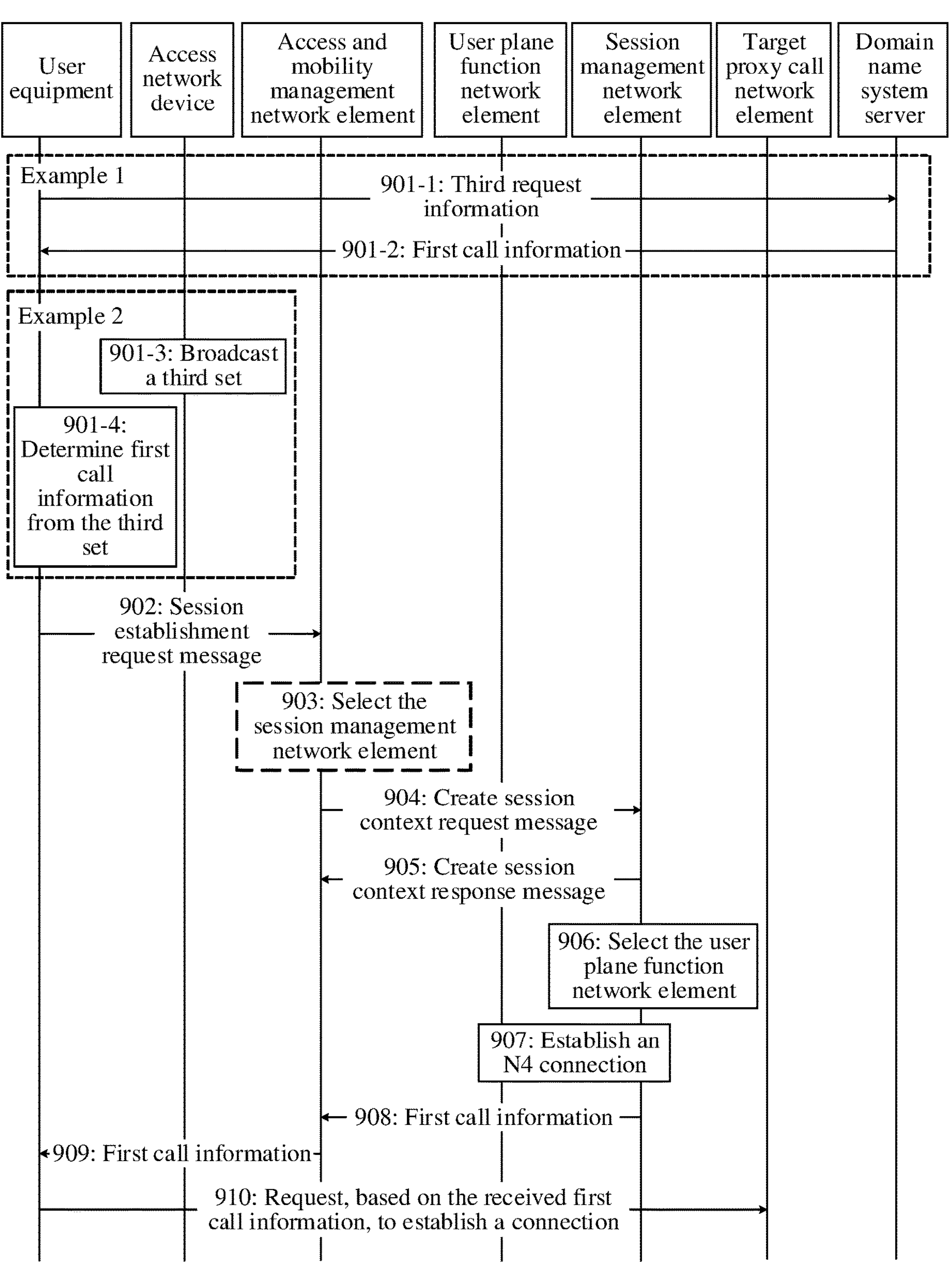
FIG. 9 is a schematic flowchart of a third session connection method according to an example of this application.

Based on the same inventive concept, FIG. 9 is a third schematic flowchart of establishing a session connection between user equipment and a target IMS network according to this application. This embodiment is applicable to the case that a proxy call network element corresponding to each IMS network is deployed in the IMS network in the architecture 1.

First information includes first call information, the first call information indicates a target proxy call network element, and a non-public network establishes a session connection between the user equipment and the target IMS network based on the first call information.

Step 901: The user equipment may obtain the first call information based on a method in the following example 1 or example 2.

Example 1: The user equipment obtains the first call information from a domain name system server. Refer to the following steps 901-1 and steps 901-2.

Step 901-1: The user equipment sends third request information to the domain name system server, where the third request information includes domain name information of the target IMS network and identification information of the non-public network.

Step 901-2: The domain name system server determines, based on the domain name information of the target IMS network and the identification information of the non-public network, proxy call information (namely, first call information) corresponding to a domain name of the target IMS network, and the domain name system server sends the first call information to the user equipment.

Example 2: The user equipment obtains the first call information from an access network device. Refer to the following steps 901-3 and steps 901-4.

Step 901-3: The access network device broadcasts a third set, where the third set includes identification information of a service provider to which each IMS network in a plurality of IMS networks connected to the non-public network belongs and corresponding proxy call information.

Step 901-4: The user equipment determines the first call information from the third set.

Step 902: The user equipment sends a session establishment request message to an access and mobility management network element. For example, the user equipment sends a NAS message to the access and mobility management network element, where the NAS message includes parameters such as a session identifier, a data network name requested by the user equipment, and slice information, and further includes the first call information. The first call information may indicate identification information of a target service provider.

Optionally, step 903: The access and mobility management network element selects a session management network element.

Step 904: The access and mobility management network element sends a create session context request message to the session management network element. For example, the access and mobility management network element sends a PDU session create session context request message to the session management network element, where the PDU session create session context request message includes parameters such as a session identifier, a data network name requested by the user equipment, and slice information, and further includes the first call information.

Step 905: The session management network element sends a create session context response message to the access and mobility management network element. For example, the session management network element sends a PDU session create session context response message to the access and mobility management network element.

Step 906: The session management network element selects a user plane function network element. For example, the session management network element selects, from a plurality of user plane function network elements based on the identification information of the target service provider, a user plane function network element connected to the IMS network provided by the target service provider. Optionally, the session management network element may determine the identification information of the target service provider based on the first call information.

Step 907: The session management network element establishes an N4 connection to the user plane function network element.

Step 908: The session management network element sends the first call information to the access and mobility management network element. For example, the session management network element sends an N1N2 message (Namf_Communication_N1N2Message transfer) to the access and mobility management network element. The N1N2 message includes the first call information.

Step 909: The access and mobility management network element sends the first call information to the user equipment.

Step 910: The user equipment requests, based on the received first call information, to establish a connection to a target proxy call network element.

For example, the user equipment sends SIP signaling (which may also be referred to as IMS signaling or an IMS message) to the target proxy call network element based on the received first call information. The SIP signaling is for requesting to establish a connection to an IMS network. A destination address of the SIP signaling is an address of the target proxy call network element indicated by the first call information.

For all steps that are not described in detail in this embodiment of this application, refer to descriptions in the embodiment related to FIG. 3 or FIG. 6.

Figure 10:
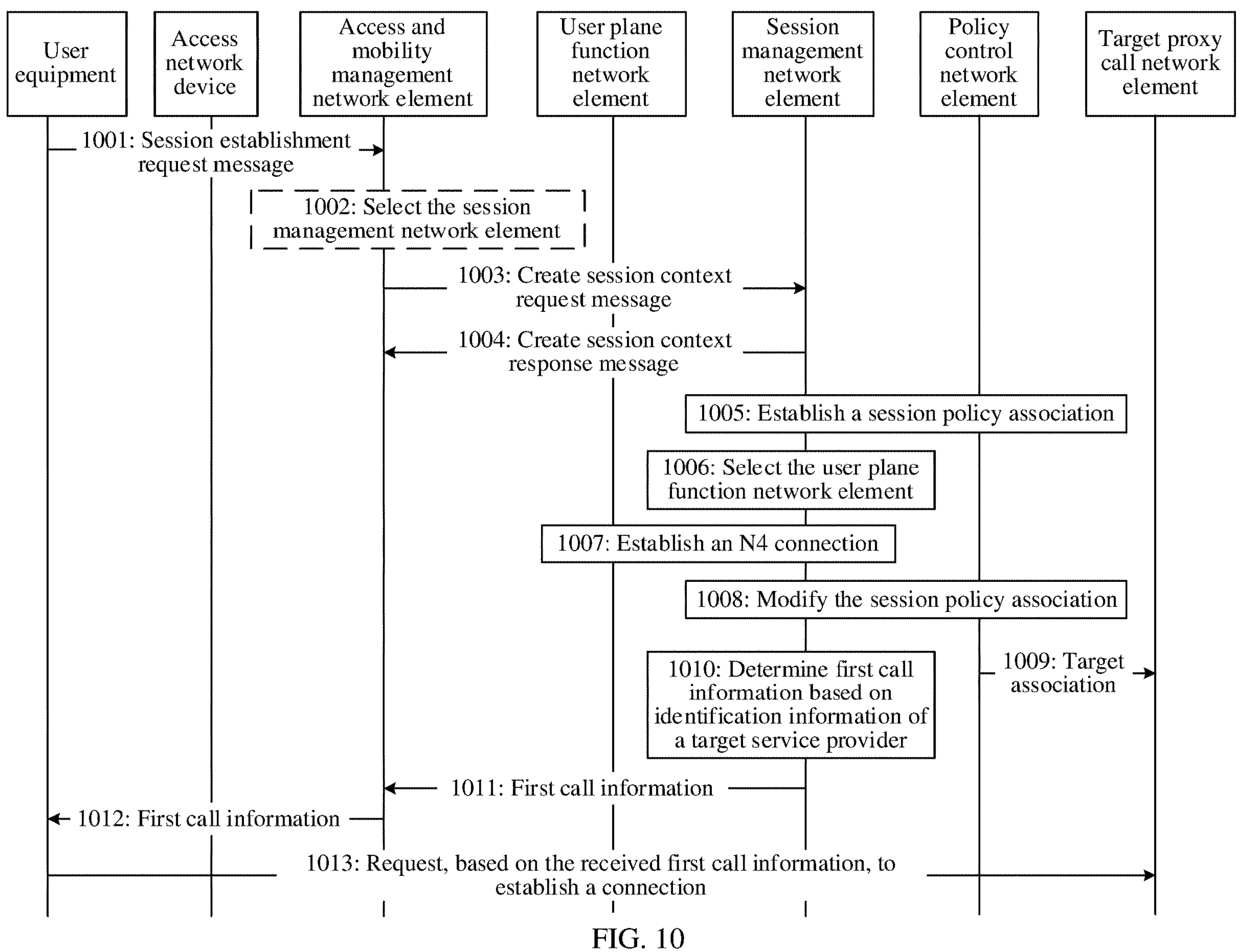
FIG. 10 is a schematic flowchart of a fourth session connection method according to an example of this application.

Based on the same inventive concept, FIG. 10 is a fourth schematic flowchart of establishing a session connection between user equipment and a target IMS network according to this application. This embodiment is applicable to the case that a proxy call network element without a service provider attribute is deployed in a non-public network in the architecture 2.

First information includes identification information of a target service provider. The non-public network determines second call information based on the identification information of the target service provider, to send an IMS message from the user equipment to the target IMS network.

Step 1001: The user equipment sends a session establishment request message to an access and mobility management network element. For example, the user equipment sends a NAS message to the access and mobility management network element, where the NAS message includes parameters such as a session identifier and a data network name that is requested by the user equipment, and further includes the identification information of the target service provider.

Optionally, step 1002: The access and mobility management network element selects a session management network element.

Step 1003: The access and mobility management network element sends a create session context request message to the session management network element. For example, the access and mobility management network element sends a PDU session create session context request message to the session management network element, where the PDU session create session context request message includes parameters such as a session identifier, a data network name requested by the user equipment, slice information, and the identification information of the target service provider.

Step 1004: The session management network element sends a create session context response message to the access and mobility management network element. For example, the session management network element sends a PDU session create session context response message to the access and mobility management network element.

Step 1005: The session management network element establishes a session policy association with a policy control network element.

Step 1006: The session management network element selects a user plane function network element. For example, the session management network element selects, from a plurality of user plane function network elements based on the identification information of the target service provider, a user plane function network element connected to the IMS network provided by the target service provider.

Step 1007: The session management network element establishes an N4 connection to the user plane function network element.

Step 1008: The session management network element performs a session policy association modification to the policy control network element.

In step 1008, the session management network element sends identification information of the user equipment and the identification information of the target service provider to the policy control network element, and the policy control network element determines a target association, where the target association includes the identification information of the user equipment and the second call information, or includes the identification information of the user equipment, the identification information of the target service provider, and the second call information.

Step 1009: The policy control network element sends the target association to the target proxy call network element.

For steps 1008 and 1009, refer to the description of the case 2 in the description of FIG. 6.

Step 1010: The session management network element determines first call information based on the identification information of the target service provider. The first call information indicates the target proxy call network element.

Step 1011: The session management network element sends the first call information to the access and mobility management network element. For example, the session management network element sends an N1N2 message (Namf_Communication_N1N2Message transfer) to the access and mobility management network element. The N1N2 message includes the first call information.

Step 1012: The access and mobility management network element sends the first call information to the user equipment.

Step 1013: The user equipment requests, based on the received first call information, to establish a connection to a target proxy call network element.

For example, the user equipment sends SIP signaling (which may also be referred to as IMS signaling or an IMS message) to the proxy call network element. The SIP signaling is for requesting to establish a connection between the user equipment and an IMS network. A destination address of the SIP signaling is an address of the target proxy call network element indicated by the first call information, and a source address of the SIP signaling is an IP address of the user equipment. The proxy call network element determines interrogation call information corresponding to the SIP signaling based on the obtained target association, and sends the SIP signaling to an interrogation call network element corresponding to the interrogation call information.

It should be noted that, in the foregoing steps 1008 and 1009, that the policy control network element determines the target association is used as an example. In this embodiment of this application, alternatively, the session management network element may determine the target association, and send the target association to the policy control network element, and then the policy control network element sends the target association to the target proxy call network element. For details, refer to the description of the case 1 in the description of FIG. 6. Alternatively, in this embodiment of this application, the target proxy call network element may determine the target association. For example, the session management network element may send the identification information of the user equipment and the identification information of the target service provider to the policy control network element; then the policy control network element sends the identification information of the user equipment and the identification information of the target service provider to the target proxy call network element; and the target proxy call network element determines the target association. For details, refer to the description of the case 3 in the description of FIG. 6.

In addition, it should be noted that a sequence of performing steps 1008 and 1009 and subsequent steps 1010 to 1013 is not limited in this embodiment of the present invention.

For all steps that are not described in detail in this embodiment of this application, refer to descriptions in the embodiment related to FIG. 3 or FIG. 6.

In addition, in this application, there may be no IMS network requested (or supported) by the user equipment in one or more IMS networks connected to the non-public network accessed by the user equipment. In this case, if a core network device selects a target IMS network from the one or more IMS networks when the user equipment requests to establish a session for obtaining an IMS service, but the user equipment does not support a connection to the target IMS network (or may be understood as that the user equipment is not a user of the target IMS network), the user equipment cannot obtain an IMS service. Therefore, the user equipment not only cannot obtain an IMS service, but also occupies network resources.

This application further provides a communication method, to enable user equipment to connect to an IMS network of a service provider via a non-public network. To be specific, when one or more IMS networks include an IMS network to which the user equipment requests to connect, a connection between the user equipment and the IMS network is enabled, or when one or more IMS networks do not include an IMS network to which the user equipment requests to connect, establishing a connection between the user equipment and an IMS network that is not supported by the user equipment is avoided. This helps reduce resource waste and signaling overheads.

For ease of description, the IMS network to which the user equipment requests to connect may be referred to as a first IMS network. An IMS network selected by a core network device for the user equipment may be referred to as a second IMS network. An IMS network connected to the non-public network accessed by the user equipment is referred to as a third IMS network. The core network device may select the second IMS network for the user equipment from one or more third IMS networks. In addition, that the user equipment establishes a connection to the first IMS network may be understood as that the user equipment establishes a session connection to a data network to which the first IMS network belongs, that the user equipment establishes an IP connection to a proxy call network element of the first IMS network, or that the user equipment establishes an IP connection to the first IMS network.

It should be further noted in advance that the core network device may obtain network information of the one or more third IMS networks in advance. In a possible implementation, the core network device may be an access and mobility management network element, a session management network element, or a unified data management network element. When the core network device is an access and mobility management network element, the access and mobility management network element may obtain the network information of the one or more third IMS networks from a session management network element or a unified data management network element, or the network information of the one or more third IMS networks is preconfigured in the access and mobility management network element. When the core network device is a session management network element, the session management network element may obtain the network information of the one or more third IMS networks from a unified data management network element, or the network information of the one or more third IMS networks is preconfigured in the session management network element.

This application may be described in different cases separately based on a registration procedure and a session establishment procedure of the user equipment.

Case 1: Registration procedure of the user equipment.

Figure 11:
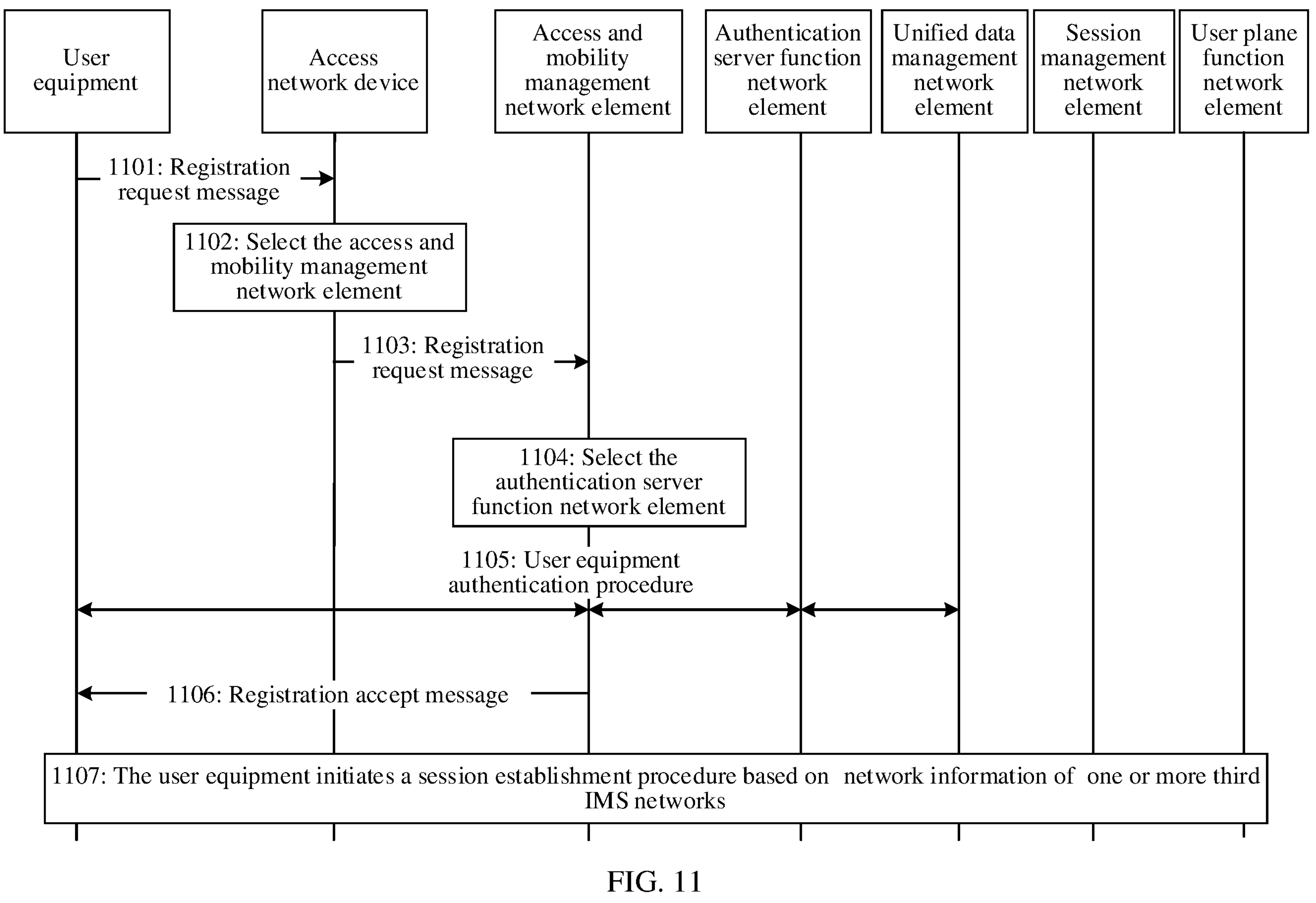
FIG. 11 is a schematic flowchart of a first method for establishing a connection to an IMS network according to an example of this application.

FIG. 11 is a schematic flowchart of a first method for establishing a connection between user equipment and an IMS network. The method may include the following steps:

Step 1101: The user equipment sends a registration request message (registration request) to an access network device. The registration request message may be a NAS message.

Step 1102: The access network device selects an access and mobility management network element.

Step 1103: The access network device sends the registration request message to the access and mobility management network element.

The registration request message may include IMS capability information, where the IMS capability information indicates that the user equipment supports obtaining of an IMS service, indicates that the user equipment supports establishment of a connection to an IMS network, indicates that the user equipment supports obtaining of network information of an IMS network, or indicates network information of a connected IMS network supported by the user equipment.

In an example, the IMS capability information may be indication information. For example, the indication information may indicate that the user equipment supports obtaining of an IMS service, or the indication information may indicate that the user equipment does not support obtaining of an IMS service. For example, the indication information may be a single bit, a plurality of bits, or a character string. When the indication information is a single bit, when a value of the bit is 1, it indicates that the user equipment supports obtaining of an IMS service; or when a value of the bit is 0, it indicates that the user equipment does not support obtaining of an IMS service. Alternatively, when the indication information is a single bit, when a value of the bit is 0, it indicates that the user equipment supports obtaining of an IMS service; or when a value of the bit is 1, it indicates that the user equipment does not support obtaining of an IMS service. When the indication information is multi-bit, one type of multi-bit may indicate that the user equipment does not support obtaining of an IMS service, and another type of multi-bit may indicate that the user equipment supports obtaining of an IMS service. When the indication information is a character string, one type of character string may indicate that the user equipment does not support obtaining of an IMS service, and another type of character string may indicate that the user equipment supports obtaining of an IMS service.

In another example, the IMS capability information may include network information of the first IMS network. Further, the IMS capability information may be network information of the first IMS network. The network information of the first IMS network may include one or more of an identifier of a service provider of the first IMS network, a network identifier, a network domain name, a data network name, and address information of a proxy call network element. It may be understood that the user equipment implicitly indicates, to the mobility management network element, that the user equipment supports obtaining of an IMS service, and the user equipment requests or supports establishment of a connection to the first IMS network.

It should be noted that alternatively the user equipment may send the IMS capability information to the access and mobility management network element through an independent message, or the user equipment may include the IMS capability information in another message in the registration procedure, and send the another message to the access and mobility management network element.

Step 1104: The access and mobility management network element selects an authentication server function network element.

Step 1105: Perform user equipment authentication procedure.

For the authentication procedure, refer to descriptions of the user equipment authentication procedure in section 6.1.2 and section 6.1.3. in TS 33.501.

Step 1106: The access and mobility management network element sends a registration accept message (registration accept) to the user equipment.

In a possible implementation, the access and mobility management network element may send the network information of the one or more third IMS networks to the user equipment based on the IMS capability information. The network information of the third IMS network may include one or more of an identifier of a service provider of the third IMS network, a network identifier, a network domain name, a data network name, and address information of a proxy call network element.

In another possible implementation, the access and mobility management network element may further select one third IMS network (namely, the second IMS network) for the user equipment from the network information of the one or more third IMS networks based on the IMS capability information, and send the network information of the second IMS network to the user equipment. The network information of the second IMS network may include one or more of an identifier of a service provider of the second IMS network, a network identifier, a network domain name, a data network name, and address information of a proxy call network element.

Optionally, after receiving the registration request message, the access and mobility management network element may include the network information of the one or more third IMS networks in the registration accept message in response to the IMS capability information in the registration request message, and send the registration accept message to the user equipment. Certainly, when the registration request message does not include the IMS capability information, the access and mobility management network element may alternatively send, to the user equipment, the registration accept message that carries the network information of the one or more third IMS networks. Compared with the latter optional manner, in the former optional manner, the access and mobility management network element may send the network information of the one or more third IMS networks to the user equipment based on the indication information sent by the user equipment, to help reduce signaling overheads.

Step 1107: The user equipment initiates a session establishment procedure based on the network information of the one or more third IMS networks. The session establishment procedure is used by the user equipment to obtain an IMS service.

When the one or more third IMS networks include the first IMS network, the user equipment may initiate the session establishment procedure; or when the one or more third IMS networks do not include the first IMS network, the user equipment may not initiate the session establishment procedure to the session management network element.

In an example, when the access and mobility management network element sends, to the user equipment, the network information of the one or more third IMS networks connected to the non-public network accessed by the user equipment, if the user equipment obtains the network information of the first IMS network from the network information of the one or more third IMS networks, the user equipment may initiate the session establishment procedure. If the user equipment does not obtain the network information of the first IMS network from the network information of the one or more third IMS networks, the user equipment does not need to initiate the session establishment procedure for obtaining an IMS service. In another example, when the access and mobility management network element selects, for the user equipment, network information of a third IMS network (namely, network information of the second IMS network) from the network information of the one or more third IMS networks, the user equipment determines whether the second IMS network is the same as the first IMS network. If the second IMS network is the same as the first IMS network, the user equipment may initiate the session establishment procedure, or if the second IMS network is different from the first IMS network, the user equipment does not need to initiate the session establishment procedure for obtaining an IMS service.

In a possible implementation, that the user equipment initiates the session establishment procedure may be understood as that the user equipment sends a session establishment request to the access and mobility management network element, and the access and mobility management network element sends the session establishment request to the session management network element. In another possible implementation, that the user equipment initiates the session establishment procedure may be understood as that the user equipment sends a session establishment request to the session management network element.

In addition, in step 1106, the registration accept message may not carry the network information of the one or more third IMS networks. Instead, the access and mobility management network element sends the network information of the one or more third IMS networks as an independent message to the user equipment. Alternatively, in another implementation, the access network device may obtain the network information of the one or more third IMS networks. For example, the access network device obtains the network information of the one or more third IMS networks from the access and mobility management network element, and then the access network device broadcasts the network information of the one or more third IMS networks, so that the user equipment may determine, based on the network information of the one or more third IMS networks, whether to initiate the session establishment procedure. The broadcast message may be periodically sent, may be sent before the registration procedure of the user equipment, may be sent in the registration procedure of the user equipment, or may be sent after the registration procedure of the user equipment.

In the registration procedure, the user equipment obtains, from a core network device, the network information of the one or more IMS networks connected to the non-public network accessed by the user equipment, and the user equipment determines, based on the network information of the one or more IMS networks, whether the one or more IMS networks include the first IMS network, which is equivalent to that the user equipment determines whether an IMS network that can provide an IMS service for the user equipment exists in the one or more IMS networks connected to the non-public network accessed by the user equipment. If the user equipment determines that an IMS network that can provide an IMS service for the user equipment exists in the one or more IMS networks connected to the non-public network accessed by the user equipment, the user equipment may initiate the session establishment procedure, to obtain an IMS service.

In this manner, when an IMS network that can provide an IMS service for the user equipment exists in the one or more IMS networks connected to the non-public network accessed by the user equipment, the user equipment initiates a request for obtaining an IMS service, thereby reducing a process in which the user equipment blindly initiates the request for obtaining an IMS service because the user equipment cannot determine whether the requested IMS network exists, and then receives a reject message. In this process, each of actions of initiating the request for obtaining an IMS service and receiving a reject message by the user equipment brings signaling consumption and network resource occupation, so that this manner can further reduce signaling consumption and network resource occupation.

Figure 12:
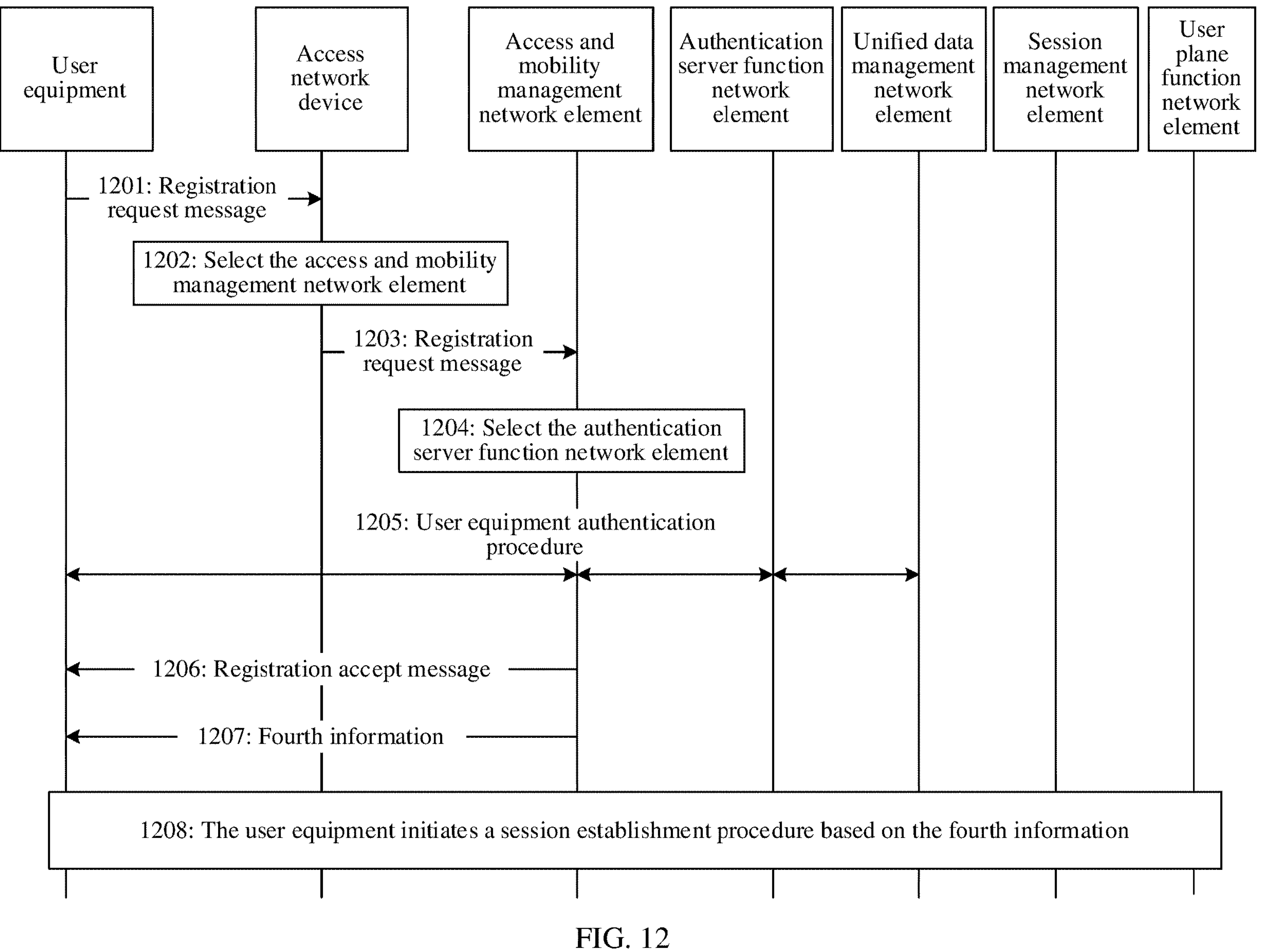
FIG. 12 is a schematic flowchart of a second method for establishing a connection to an IMS network according to an example of this application.

FIG. 12 is a schematic flowchart of a second method for establishing a connection between user equipment and an IMS network. A core network device may be an access and mobility management network element, and the method may include the following steps:

Step 1201: The user equipment sends a registration request message to an access network device.

The registration request message may be a NAS message.

Step 1202: The access network device selects an access and mobility management network element.

Step 1203: The access network device sends the registration request message to the access and mobility management network element.

The registration request message may include network information of a first IMS network requested by the user equipment. Optionally, the network information of the first IMS network may include one or more of an identifier of a service provider of the first IMS network, a network identifier, a network domain name, a data network name, and address information of a proxy call network element.

It should be noted that alternatively the user equipment may send the network information of the first IMS network to the access and mobility management network element through an independent message, or the user equipment may include the network information of the first IMS network to another message in the registration procedure, and send the another message to the access and mobility management network element.

Step 1204: The access and mobility management network element selects an authentication server function network element.

Step 1205: Perform user equipment authentication procedure.

For the authentication procedure, refer to descriptions in section 6.1.2 and section 6.1.3. in TS 33.501.

Step 1206: The access and mobility management network element sends a registration accept message to the user equipment.

Step 1207: The access and mobility management network element sends fourth information to the user equipment.

In a possible manner, the access and mobility management network element obtains network information of one or more third IMS networks, and when the access and mobility management network element obtains the network information of the first IMS network from the registration request message, the access and mobility management network element may determine whether the one or more third IMS networks include the first IMS network. Then, the access and mobility management network element sends fourth information to the user equipment, where the fourth information indicates whether the one or more third IMS networks include the first IMS network, or indicates whether establishment of a connection between the user equipment and the first IMS network is supported.

In a possible manner, the fourth information may include network information of one or more third IMS networks. For example, the fourth information may include one or more of an identifier of a service provider of the one or more third IMS networks, a network identifier, a network domain name, address information of a proxy call network element, and data network name information. The user equipment may determine, based on the network information of the one or more third IMS networks, whether the one or more third IMS networks include the first IMS network.

In another possible manner, the fourth information may include the network information of the first IMS network. For example, the fourth information may include one or more of an identifier of a service provider of the first IMS network, a network identifier, a network domain name, address information of a proxy call network element, and data network name information. The user equipment may determine, based on the network information of the first IMS network, that the one or more third IMS networks include the first IMS network.

In addition, the fourth information may be used as an independent message, or may be included in the registration accept message (in this case, step 1206 and step 1207 are one step, and the registration accept message includes the fourth information).

Step 1208: The user equipment initiates a session establishment procedure based on the fourth information. The session establishment procedure is used by the user equipment to obtain an IMS service.

When the fourth information indicates that the one or more third IMS networks include the first IMS network, the user equipment may initiate the session establishment procedure. Specifically, the user equipment may send a session establishment request message to the access and mobility management network element, and the access and mobility management network element sends the session establishment request message to a session management network element; or the user equipment sends the session establishment request message to a session management network element. The session management network element establishes a connection between the user equipment and the first IMS network based on the session establishment request message. When the fourth information indicates that the one or more third IMS networks do not include the first IMS network, the user equipment may not initiate the session establishment procedure.

In the registration procedure, the user equipment sends the network information of the first IMS requested by the user equipment to the core network device. The core network device may determine, based on the network information of the first IMS, whether the one or more IMS networks connected to the non-public network accessed by the user equipment include the first IMS network. This is equivalent to that the core network device determines whether an IMS network that can provide an IMS service for the user equipment exists in the one or more IMS networks connected to the non-public network accessed by the user equipment. If yes, the core network device may indicate that the user equipment may initiate a session establishment procedure after the registration procedure succeeds, to obtain an IMS service. In this manner, when an IMS network that can provide an IMS service for the user equipment (in other words, the fourth information indicates that establishment of a connection between the user equipment and the first IMS network is supported) exists in the one or more IMS networks connected to the non-public network accessed by the user equipment, the user equipment may request to obtain an IMS service.

According to the foregoing method, only after determining that an IMS network that can provide an IMS service for the user equipment exists, the user equipment initiates a request for obtaining an IMS service, thereby reducing a process in which the user equipment blindly initiates the request for obtaining an IMS service because the user equipment cannot determine whether the IMS network exists, and then receives a reject message. In this process, each of actions of initiating the request for obtaining an IMS service and receiving a reject message by the user equipment brings signaling consumption and network resource occupation, so that this manner can further reduce signaling consumption and network resource occupation.

Case 2: Session request process of the user equipment.

Figure 13:
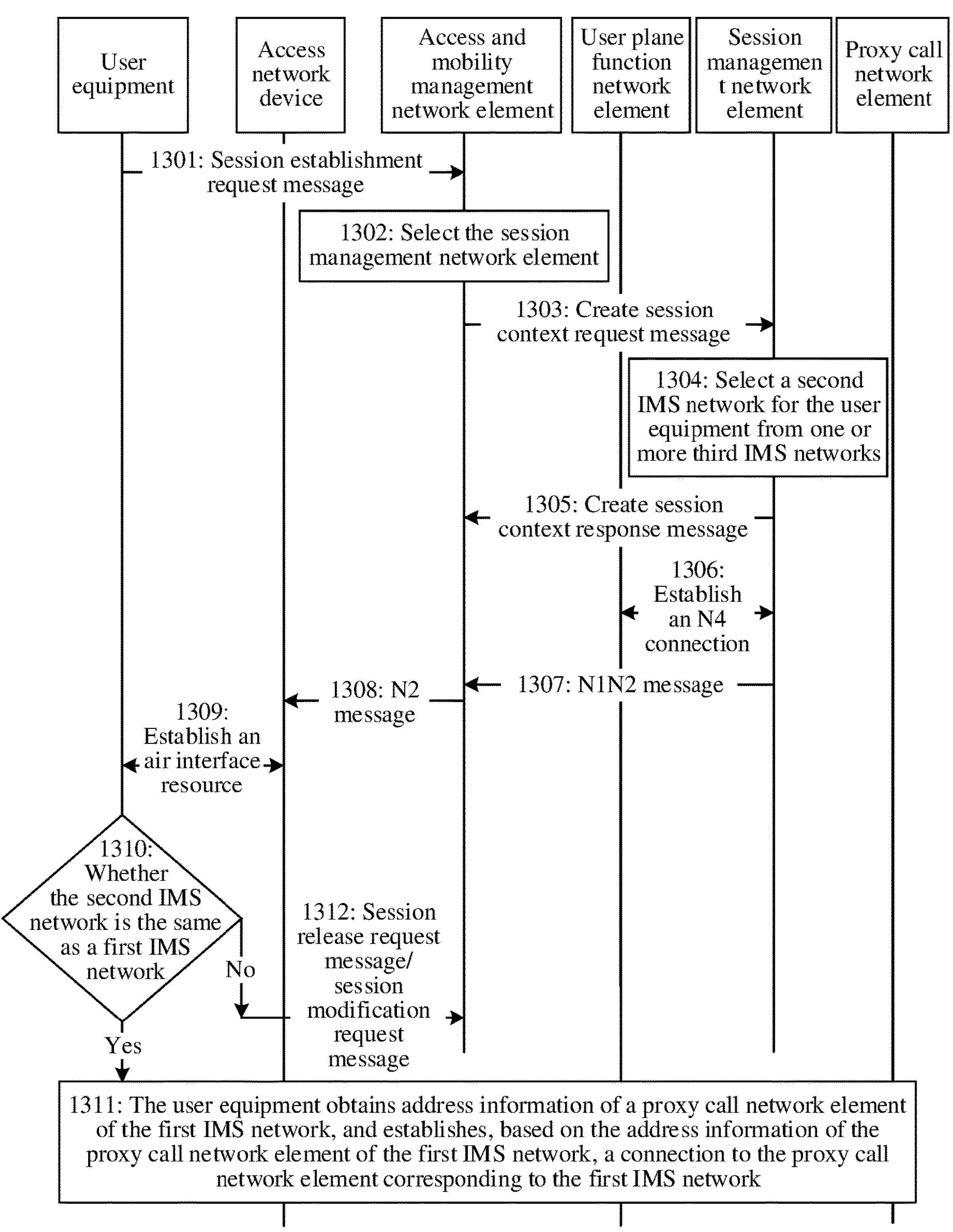
FIG. 13 is a schematic flowchart of a third method for establishing a connection to an IMS network according to an example of this application.

FIG. 13 is a schematic flowchart of a third method for establishing a connection between user equipment and an IMS network. A core network device may be a session management network element, and the method may include the following steps:

Step 1301: The user equipment sends a session establishment request message to an access and mobility management network element. The session establishment request message may include a session identifier, a data network name, slice information, and the like.

The session establishment request message may further include IMS capability information, where the IMS capability information indicates that the user equipment supports obtaining of an IMS service, indicates that the user equipment supports establishment of a connection to an IMS network, indicates network information of a connected IMS network supported by the user equipment, or indicates that the user equipment supports obtaining of network information of an IMS network.

In an example, the IMS capability information may be indication information. For example, the indication information may indicate that the user equipment supports obtaining of an IMS service, or the indication information may indicate that the user equipment does not support obtaining of an IMS service. For example, the indication information may be a single bit, a plurality of bits, or a character string. When the indication information is a single bit, when a value of the bit is 1, it indicates that the user equipment supports obtaining of an IMS service; or when a value of the bit is 0, it indicates that the user equipment does not support obtaining of an IMS service. Alternatively, when the indication information is a single bit, when a value of the bit is 0, it indicates that the user equipment supports obtaining of an IMS service; or when a value of the bit is 1, it indicates that the user equipment does not support obtaining of an IMS service. When the indication information is multi-bit, one type of multi-bit may indicate that the user equipment does not support obtaining of an IMS service, and another type of multi-bit may indicate that the user equipment supports obtaining of an IMS service. When the indication information is a character string, one type of character string may indicate that the user equipment does not support obtaining of an IMS service, and another type of character string may indicate that the user equipment supports obtaining of an IMS service.

In another example, the IMS capability information may include network information of the first IMS network. Further, the IMS capability information may be network information of the first IMS network. The network information of the first IMS network may include one or more of an identifier of a service provider of the first IMS network, a network identifier, a network domain name, a data network name, and address information of a proxy call network element. It may be understood that the user equipment implicitly indicates, to the access and mobility management network element, that the user equipment supports obtaining of an IMS service, and the user equipment requests or supports establishment of a connection to the first IMS network.

Step 1302: The access and mobility management network element selects a session management network element.

Step 1303: The access and mobility management network element sends a create session context request message to the session management network element, where the create session context request message may carry IMS capability information. In addition, the create session context request message may further carry a session identifier, a data network name, slice information, and the like.

Step 1304: The session management network element selects a second IMS network for the user equipment from one or more third IMS networks based on network information of the one or more third IMS networks. Optionally, the session management network element may select the second IMS network in response to the IMS capability information in the create session context request message.

Step 1305: The session management network element sends a create session context response message to the access and mobility management network element.

Step 1306: The session management network element establishes an N4 connection to the user plane function network element.

Step 1307: The session management network element sends an N1N2 message to the access and mobility management network element.

In a possible implementation, the N1N2 message may include the network information of the second IMS network. The network information of the second IMS network may include one or more of an identifier of a service provider of the second IMS network, a network identifier, a network domain name, a data network name, and address information of a proxy call network element.

In a possible implementation, the N1N2 message may include an N1 session container (N1 SM container) and N2 session information (N2 SM information), where the N1 SM container information is forwarded by the access and mobility management network element to the user equipment, and the N2 SM information is forwarded by the access and mobility management network element to an access network device.

The N1 SM container of the session management network element may include the session establishment accept information, and may further include the network information of the second IMS network.

Step 1308: The access and mobility management network element sends an N2 message to the access network device, where the N2 message includes information sent by the session management network element to the user equipment, that is, includes the network information of the second IMS network. For example, the N2 message includes the N2 SM information and the N1 SM container information, and the N1 SM container information is sent by the access and mobility management network element to the user equipment through a NAS message.

Step 1309: The access network device establishes an air interface resource with the user equipment.

Step 1310: The user equipment determines whether the second IMS network is the same as the first IMS network. To be specific, the user equipment determines whether the IMS network selected by the session management network element is the IMS network requested by the user equipment. If yes, step 1311 is performed; otherwise, step 1312 is performed.

Step 1311: The user equipment obtains address information of a proxy call network element of the first IMS network, and the user equipment establishes, based on the address information of the proxy call network element of the first IMS network, a connection to the proxy call network element corresponding to the first IMS network. After establishing a connection to the proxy call network element corresponding to the first IMS network, the user equipment may obtain an IMS service through the connection.

In an example, the network information of the second IMS network may include address information of a proxy call network element of the second IMS network. The user equipment receives the network information of the second IMS network, determines, based on the network information of the second IMS network, that the second IMS network is the same as the first IMS network, obtains the address information of the proxy call network element of the second IMS network (namely, the first IMS network), and establishes, based on the address information of the proxy call network element of the first IMS network, a connection to the proxy call network element corresponding to the first IMS network.

In another example, the network information of the second IMS network may not include the address information of the proxy call network element of the second IMS network. The session management network element sends the network information of the second IMS network and the address information of the proxy call network element of the second IMS network to the access and mobility management network element. Then the access and mobility management network element sends the network information of the second IMS network and the address information of the proxy call network element of the second IMS network to the user equipment. The user equipment determines, based on the network information of the second IMS network, that the second IMS network is the same as the first IMS network, and establishes, based on the address information of the proxy call network element of the second IMS network (namely, the first IMS network), a connection to the proxy call network element corresponding to the first IMS network.

In still another example, the network information of the second IMS network may not include the address information of the proxy call network element of the second IMS network. The session management network element sends the network information of the second IMS network to the access and mobility management network element. Then the access and mobility management network element sends the network information of the second IMS network to the user equipment. The user equipment determines, based on the network information of the second IMS network, that the second IMS network is the same as the first IMS network, obtains, from a domain name system server, address information of a proxy call network element corresponding to the first IMS network, and establishes a connection to the proxy call network element based on the address information, to obtain an IMS service of the first IMS network.

Optionally, the access and mobility management network element may include the network information of the second IMS network (or the network information of the second IMS network and the address information of the proxy call network element of the second IMS network) to the NAS message sent to the user equipment. For example, the NAS message may be forwarded by the access network device to the user equipment before the user equipment establishes the air interface resource with the access network device, while the user equipment is establishing the air interface resource with the access network device, or after the user equipment establishes the air interface resource with the access network device.

Step 1312: The user equipment sends a session release request message to the access and mobility management network element, to release a session, or the user equipment sends a session modification request message to the access and mobility management network element, to modify a session. This helps save network resources.

In the foregoing technical solution, the session management network element may select the second IMS network for the user equipment from the one or more third IMS networks, and send the network information of the second IMS network to the user equipment. The user equipment may determine, based on the network information of the second IMS network, whether the second IMS network is the first IMS network supported by the user equipment. When the second IMS network is the same as the first IMS network, the user equipment may request to establish a connection to the proxy call network element corresponding to the first IMS network. In this manner, when the second IMS network selected by the session management network element is the same as the first IMS network supported by the user equipment, the user equipment requests to establish a connection to the proxy call network element corresponding to the first IMS network. This helps reduce signaling overheads and network resource occupation.

It should be supplemented that, in an implementation related to FIG. 13, the session management network element may further feed back the network information of the one or more third IMS networks to the user equipment in response to the IMS capability information. In a possible implementation, the session management network element sends the network information of the one or more third IMS networks to the user equipment through the access and mobility management network element. Correspondingly, the user equipment receives the network information of the one or more third IMS networks, and determines, based on the network information of the one or more third IMS networks, whether an IMS network that can provide an IMS service for the user equipment exists in the one or more IMS networks connected to the non-public network accessed by the user equipment. If yes, the user equipment requests to establish a connection to the proxy call network element corresponding to the first IMS network. In this manner, when an IMS network that can provide an IMS service for the user equipment exists in the one or more IMS networks connected to the non-public network accessed by the user equipment, the user equipment requests to establish a connection to the proxy call network element corresponding to the IMS network. This helps reduce signaling overheads and network resource occupation.

Figure 14:
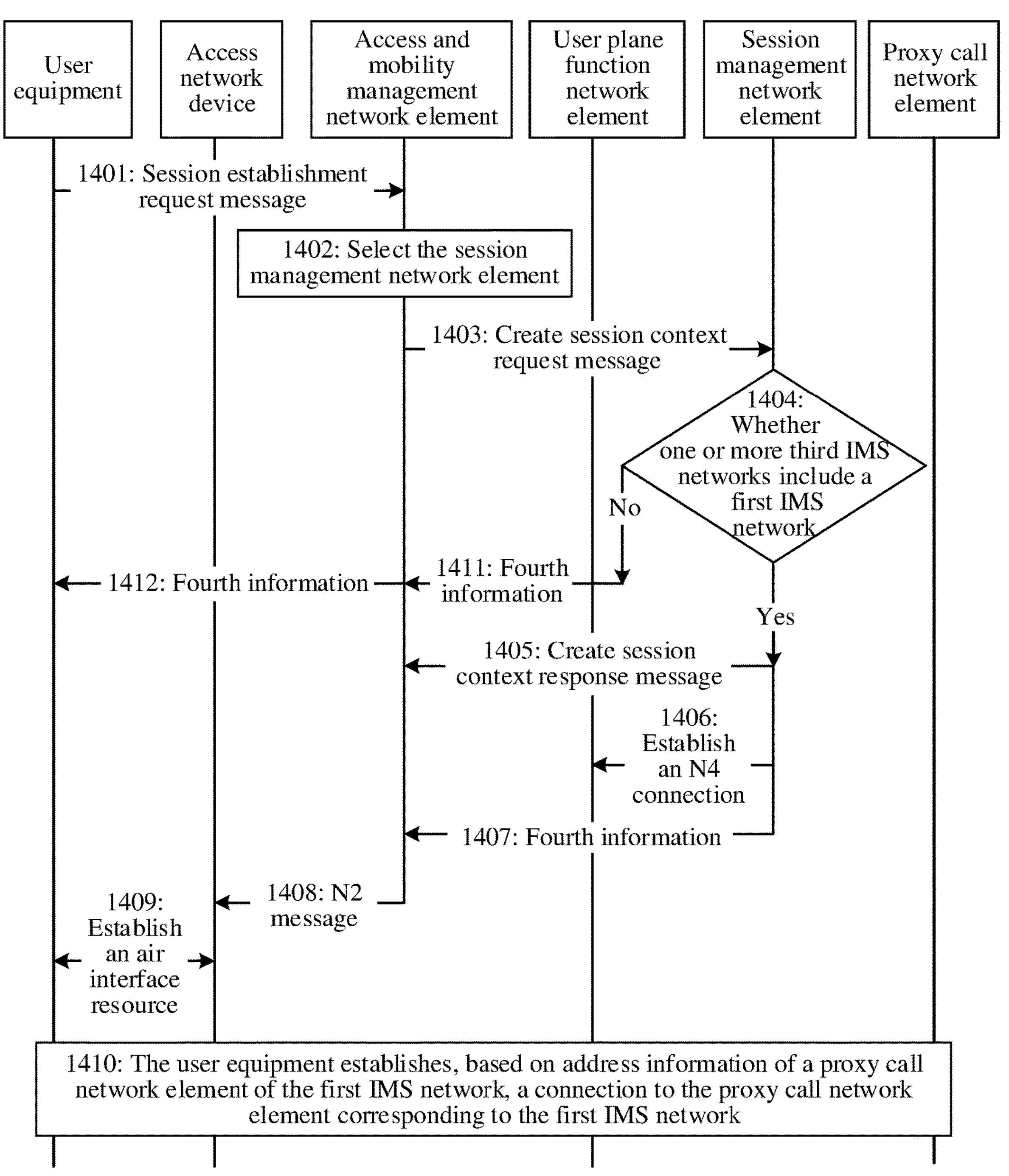
FIG. 14 is a schematic flowchart of a fourth method for establishing a connection to an IMS network according to an example of this application.

FIG. 14 is a schematic flowchart of a fourth method for establishing a connection between user equipment and an IMS network. A core network device may be a session management network element, and the method may include the following steps:

Step 1401: The user equipment sends a session establishment request message to an access and mobility management network element.

The session establishment request message may include network information of a first IMS network to which the user equipment requests to connect. The network information of the first IMS network includes one or more of an identifier of a service provider of the first IMS network, a network identifier, a network domain name, a data network name, and address information of a proxy call network element. Optionally, the session establishment request message may further include a session identifier, slice information, and the like.

Step 1402: The access and mobility management network element selects a session management network element.

Step 1403: The access and mobility management network element sends a create session context request message to the session management network element. The create session context request message may further carry the network information of the first IMS network. Optionally, the create session context request message may carry a session identifier, slice information, and the like.

It may be understood that, the user equipment sends the network information of the first IMS network to the access and mobility management network element, or the user equipment sends the network information of the first IMS network to the session management network element (through the access and mobility management network element).

Step 1404: The session management network element determines, based on network information of one or more third IMS networks, whether the one or more third IMS networks include the first IMS network.

If the one or more third IMS networks include the first IMS network, step 1405 may be performed. If the one or more third IMS networks do not include the first IMS network, step 1411 may be performed.

Step 1405: The session management network element sends a create session context response message to the access and mobility management network element.

Step 1406: The session management network element establishes an N4 connection to the user plane function network element.

Step 1407: The session management network element sends fourth information to the access and mobility management network element.

For example, the session management network element sends an N1N2 message to the access and mobility management network element, where the N1N2 message may include the fourth information.

In a possible implementation, the fourth information may include session establishment accept information and/or the network information of the first IMS network.

In this application, the fourth information may indicate that the one or more third IMS networks include the first IMS network, or indicate that establishment of a connection between the user equipment and the first IMS network is supported. When the one or more third IMS networks include the first IMS network, the session management network element may send the fourth information to the user equipment.

For example, the fourth information may be indication information, and the indication information may indicate that establishment of a connection between the user equipment and the first IMS network is supported. For example, the indication information may be a single bit, a plurality of bits, or a character string. When the indication information is a single bit, when a value of the bit is 1, it indicates that establishment of a connection between the user equipment and the first IMS network is supported. Alternatively, when the indication information is a single bit, when a value of the bit is 0, it indicates that establishment of a connection between the user equipment and the first IMS network is supported. When the indication information is multi-bit, one type of multi-bit may indicate that establishment of a connection between the user equipment and the first IMS network is supported. When the indication information is a character string, one type of character string may indicate that establishment of a connection between the user equipment and the first IMS network is supported.

In a possible implementation, the N1N2 message may include an N1 SM container, where the N1 SM container information is forwarded by the session management network element to the user equipment through the access and mobility management network element.

In a possible implementation, the N1 SM container of the session management network element may include session establishment accept information, and the session establishment accept information may include message type information of a session establishment accept message and/or parameter information of the session establishment accept message. The N1 SM container may further include the network information of the first IMS network, and the network information of the first IMS network may be specifically address information of a proxy call network element of the first IMS network. In other words, in a possible implementation, the N1 SM container of the session management network element may include the fourth information.

Step 1408: The access and mobility management network element sends an N2 message to an access network device.

The N2 message includes information in the NAS message sent by the access and mobility management network element to the user equipment.

The NAS message may include information sent by the session management network element to the user equipment, that is, the NAS message may include the N1 SM container information. In other words, in a possible implementation, the NAS message may include the fourth information.

Step 1409: The access network device establishes an air interface resource with the user equipment.

The air interface resource is for transmitting user plane data of the user equipment. In a possible implementation, the user equipment may establish a connection to the call proxy network element of the first IMS network through the air interface resource.

For example, the NAS message may be forwarded by the access network device to the user equipment before the user equipment establishes the air interface resource with the access network device, while the user equipment is establishing the air interface resource with the access network device, or after the user equipment establishes the air interface resource with the access network device.

Step 1410: The user equipment establishes, based on the address information of the proxy call network element of the first IMS network, a connection to the proxy call network element corresponding to the first IMS network.

Step 1411: The session management network element sends fourth information to the access and mobility management network element.

For example, the session management network element sends an N1N2 message to the access and mobility management network element, where the N1N2 message may include the fourth information.

In this step, the fourth information may indicate that the one or more third IMS networks do not include the first IMS network, or indicate that establishment of a connection between the user equipment and the first IMS network is not supported. When the one or more third IMS networks do not include the first IMS network, the session management network element may send the fourth information to the user equipment.

It may be understood that the N1N2 message may include information sent by the session management network element to the user equipment, that is, the fourth information may be included in information sent by the session management network element to the user equipment.

In a possible implementation, the fourth information includes session establishment reject information. The session establishment reject information may include message type information of a session establishment reject message and/or parameter information of the session establishment reject message.

In a possible implementation, the fourth information may be indication information, and the indication information may indicate that establishment of a connection between the user equipment and the first IMS network is not supported. For example, the indication information may be a single bit, a plurality of bits, or a character string. When the indication information is a single bit, when a value of the bit is 0, it indicates that establishment of a connection between the user equipment and the first IMS network is not supported. Alternatively, when the indication information is a single bit, when a value of the bit is 1, it indicates that establishment of a connection between the user equipment and the first IMS network is not supported. When the indication information is multi-bit, one type of multi-bit may indicate that establishment of a connection between the user equipment and the first IMS network is not supported. When the indication information is a character string, one type of character string may indicate that establishment of a connection between the user equipment and the first IMS network is not supported.

Step 1412: The access and mobility management network element sends fourth information to the user equipment.

For example, the access and mobility management network element receives the fourth information from the session management network element, and sends a NAS message to the user equipment, where the NAS message includes the fourth information.

In other words, the fourth information is sent by the session management network element to the user equipment through the access and mobility management network element.

It should be supplemented that, in this embodiment of this application, the network information of the one or more third IMS networks may alternatively be preconfigured in the access and mobility management network element. After step 1401, the access and mobility management network element may determine, based on the network information of the first IMS network in the session establishment request message, whether the one or more third IMS networks include the first IMS network. If yes, the access and mobility management network element may further select the session management network element (in this case, step 1404 does not need to be performed); otherwise, step 1412 may be performed, and the access and mobility management network element sends the session establishment reject information to the user equipment.

In the session request process, the user equipment sends the network information of the first IMS requested by the user equipment to the core network device. The core network device may determine, based on the network information of the first IMS, whether the one or more IMS networks connected to the non-public network accessed by the user equipment include the first IMS network. This is equivalent to that the core network device determines whether an IMS network that can provide an IMS service for the user equipment exists in the one or more IMS networks connected to the non-public network accessed by the user equipment. If yes, the core network device may indicate that the user equipment may request to establish a connection to the proxy call network element corresponding to the first IMS network. In this manner, when an IMS network that can provide an IMS service for the user equipment exists in the one or more IMS networks connected to the non-public network accessed by the user equipment, the user equipment requests to establish a connection to the proxy call network element corresponding to the first IMS network. This helps reduce signaling overheads and network resource occupation.

It should be supplemented that in this embodiment of this application, the network information of the first IMS network, the second IMS network, or the third IMS network may include one or more of an identifier of a service provider, a network identifier, a network domain name, a data network name, and address information of a proxy call network element. The data network name may be a data network name including one or more of an identifier of a service provider, a network identifier, a network domain name, and address information of a proxy call network element. To be specific, in a possible manner, the network information of the first IMS network, the second IMS network, or the third IMS network may include the data network name.

Embodiments described in this specification may be independent solutions, or may be combined based on internal logic. These solutions all fall within the protection scope of this application.

In the foregoing embodiments provided in this application, the methods provided in embodiments of this application are separately described from a perspective of interaction between devices/network elements. To implement functions in the method provided in the foregoing embodiments of this application, each device/network element may include a hardware structure and/or a software module, and implement the foregoing functions in a form of the hardware structure, the software module, or a combination of the hardware structure and the software module. Whether a specific function in the foregoing functions is performed through the hardware structure, the software module, or the combination of the hardware structure and the software module depends on a specific application and a design constraint of the technical solutions.

In embodiments of this application, module division is an example, and is merely a logical function division, and may be another division during actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 15:
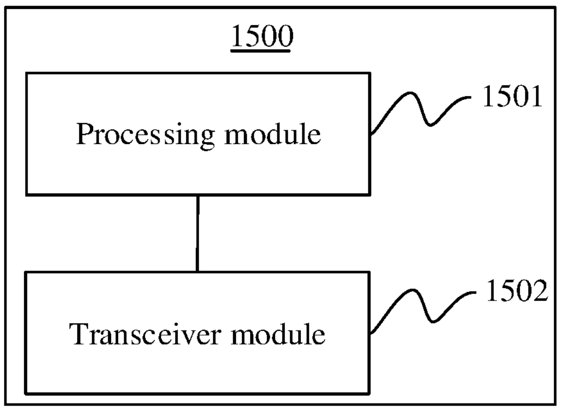
FIG. 15 is a schematic diagram of a structure of a communication apparatus according to this application.

Based on the foregoing content and a same concept, FIG. 15 is a schematic diagram of a possible structure of a communication apparatus according to this application. The communication apparatus may be configured to implement functions of the session management network element, the user equipment, the policy control network element, or the target proxy call network element of the method embodiments shown in FIG. 6 to FIG. 10, and therefore can also achieve beneficial effects of the method embodiments shown in FIG. 6 to FIG. 10.

In this application, the communication apparatus may be the session management network element, the user equipment, the policy control network element, or the target proxy call network element shown in FIG. 1, or may be a component (for example, a chip or a circuit) applied to the session management network element, the user equipment, the policy control network element, or the target proxy call network element.

As shown in FIG. 15, the communication apparatus 1500 includes a processing module 1501 and a transceiver module 1502.

When the communication apparatus 1500 is configured to implement the functions of the session management network element of the method embodiments shown in FIG. 6 to FIG. 10, the processing module 1501 is configured to control the transceiver module 1502 to receive first information from user equipment, where the apparatus and the user equipment are located in a non-public network, the non-public network is connected to a plurality of IMS networks, the first information indicates a target IMS network to which the user equipment requests to connect, the target IMS network is one of the plurality of IMS networks, and the target IMS network is provided by a target service provider; the processing module 1501 is further configured to determine first call information based on the first information, where the first call information indicates a target proxy call network element, and the first call information is for establishing a connection between the user equipment and the target IMS network; and the processing module 1501 is further configured to control the transceiver module 1502 to send the first call information to the user equipment.

In a possible implementation, the first information includes identification information of the target service provider and/or the first call information.

In a possible implementation, the first information is data network name information, and the data network name information includes identification information of the target service provider.

In a possible implementation, the target proxy call network element is located in the non-public network, and the processing module 1501 is further configured to control the transceiver module 1502 to send second information to the target proxy call network element or a policy control network element, where the second information includes identification information of the user equipment and the identification information of the target service provider, and the second information indicates the target proxy call network element to send an IMS message from the user equipment to a target interrogation call network element of the target IMS network.

In a possible implementation, the second information further includes second call information indicating the target interrogation call network element.

In a possible implementation, the target proxy call network element is located in the non-public network, and the processing module 1501 is further configured to determine second call information corresponding to the target service provider based on a correspondence between a service provider and interrogation call information; and determine a target association, where the target association includes an association between identification information of the user equipment and the second call information, or the target association includes an association between identification information of the user equipment, the second call information, and the identification information of the target service provider; and the processing module 1501 is further configured to control the transceiver module 1502 to send the target association to the target proxy call network element or a policy control network element.

When the communication apparatus 1500 is configured to implement the functions of the user equipment of the method embodiments shown in FIG. 6 to FIG. 10, the processing module 1501 is configured to control the transceiver module 1502 to send first information to a session management network element, where the apparatus and the session management network element are located in a non-public network, the non-public network is connected to a plurality of IMS networks, the first information indicates a target IMS network to which the apparatus requests to connect, the target IMS network is one of the plurality of IMS networks, and the target IMS network is provided by a target service provider; and the processing module 1501 is further configured to control the transceiver module 1502 to receive first call information from the session management network element, where the first call information indicates a target proxy call network element, and the first call information is for establishing a connection between the apparatus and the target IMS network.

In a possible implementation, the first information includes identification information of the target service provider and/or the first call information.

In a possible implementation, the first information is data network name information, and the data network name information includes identification information of the target service provider.

In a possible implementation, the data network name information is obtained by the processing module 1501 by controlling the transceiver module 1502 from an access and mobility management network element, the session management network element, or an access network device.

In a possible implementation, the first information includes the first call information, and before controlling the transceiver module 1502 to send the first information to the session management network element, the processing module 1501 is further configured to control the transceiver module 1502 to receive third information from the access network device, where the third information includes the first service provider and proxy call information corresponding to the first service provider, and the proxy call information corresponding to the first service provider is the first call information.

In a possible implementation, the first information includes the first call information, and before controlling the transceiver module 1502 to send the first information to the session management network element, the processing module 1501 is further configured to: control the transceiver module 1502 to send a query request to a domain name system server; and receive a query response from the domain name system server, where the query request includes identification information of the non-public network, the query response includes the first call information, and the target proxy call network element is located in the target IMS network and connected to the non-public network.

When the communication apparatus 1500 is configured to implement the functions of the policy control network element of the method embodiments shown in FIG. 6 to FIG. 10, the processing module 1501 is configured to control the transceiver module 1502 to receive second information from a session management network element, where the second information includes identification information of the user equipment and identification information of the target service provider; the processing module 1501 is further configured to determine a target association based on a correspondence between a service provider and interrogation call information and the second information, where the target association includes an association between the identification information of the user equipment and second call information, or the target association includes an association between the identification information of the user equipment, second call information, and the identification information of the target service provider, the second call information indicates a target interrogation call network element, the target interrogation call network element is located in a target IMS network, and the target interrogation call network element is connected to a target proxy call network element in a non-public network; and the processing module 1501 is further configured to control the transceiver module 1502 to send the target association to the target proxy call network element.

When the communication apparatus 1500 is configured to implement the functions of the target proxy call network element of the method embodiments shown in FIG. 6 to FIG. 10, the processing module 1501 is configured to control the transceiver module 1502 to receive IMS information from user equipment, where the IMS information includes identification information of the user equipment, and the target proxy call network element and the user equipment are located in a non-public network; the processing module 1501 is further configured to determine second call information based on a target association and the identification information of the user equipment, where the target association includes an association between the identification information of the user equipment and the second call information; and the processing module 1501 is further configured to control the transceiver module 1502 to send the IMS information to a target interrogation call network element indicated by the second call information, where the target interrogation call network element is located in a target IMS network.

In a possible implementation, before controlling the transceiver module 1502 to receive the IMS information from the user equipment, the processing module 1501 is further configured to control the transceiver module 1502 to receive the target association from a policy control network element or a session management network element.

In a possible implementation, before controlling the transceiver module 1502 to receive the IMS information from the user equipment, the processing module 1501 is further configured to: control the transceiver module 1502 to receive the identification information of the user equipment and identification information of the target service provider from a policy control network element or a session management network element; and determine the target association based on a correspondence between a service provider and interrogation call information.

In a possible implementation, the target association further includes the identification information of the target service provider.

Based on the foregoing content and a same concept, the possible communication apparatus provided in FIG. 15 may be further configured to implement functions of the communication apparatus or the core network device in the method embodiments shown in FIG. 11 to FIG. 14, and therefore can also achieve beneficial effects of the method embodiments shown in FIG. 11 to FIG. 14.

In this application, the communication apparatus may be the communication apparatus, the session management network element, or the access and mobility management network element shown in FIG. 1, or may be a component (for example, a chip or a circuit) applied to the communication apparatus, the session management network element, or the access and mobility management network element.

When the communication apparatus 1500 is configured to implement the functions of the communication apparatus 1500 of the method embodiments shown in FIG. 12 or FIG. 14, in a possible implementation, the processing module 1501 is configured to control the transceiver module 1502 to send network information of a first IMS network supported by the communication apparatus 1500 to a core network device; and the processing module 1501 is further configured to control the transceiver module 1502 to receive fourth information from the core network device, where the fourth information indicates whether establishment of a connection between the communication apparatus 1500 and the first IMS network is supported.

In a possible implementation, the communication apparatus 1500 sends the network information of the first IMS network to the core network device in a registration procedure, where the fourth information indicates that establishment of a connection between the communication apparatus 1500 and the first IMS network is supported; and the processing module 1501 is further configured to: control the transceiver module 1502 to send session establishment request information to the core network device, where the session establishment request message is for establishing a connection between the communication apparatus 1500 and the first IMS network.

In a possible implementation, the communication apparatus 1500 sends the network information of the first IMS network to the core network device in a session establishment procedure, where the fourth information indicates that establishment of a connection between the communication apparatus 1500 and the first IMS network is supported; and the processing module 1501 is further configured to: obtain address information of a proxy call network element corresponding to the first IMS network; and establish a connection to the proxy call network element based on the address information.

In a possible implementation, the communication apparatus 1500 sends the network information of the first IMS network to the core network device in a session establishment procedure, where the fourth information indicates that establishment of a connection between the communication apparatus 1500 and the first IMS network is not supported, and the fourth information includes session establishment reject information.

In a possible implementation, the network information includes one or more of an identifier of a service provider, a network identifier, a network domain name, a data network name, and address information of a proxy call network element.

In a possible implementation, the fourth information includes one or more of session establishment accept information, session establishment reject information, an identifier of a service provider, a network identifier, a network domain name, the address information of the proxy call network element, and data network name information.

When the communication apparatus 1500 is configured to implement the functions of the core network device of the method embodiments shown in FIG. 12 or FIG. 14, in a possible implementation, the processing module 1501 is configured to control the transceiver module 1502 to obtain network information of a first IMS network, where the first IMS network is an IMS network supported by user equipment; and the processing module 1501 is configured to control the transceiver module 1502 to send fourth information to the user equipment, where the fourth information indicates whether establishment of a connection between the user equipment and the first IMS network is supported.

In a possible implementation, the processing module 1501 is specifically configured to: control the transceiver module 1502 to receive the network information of the first IMS network from the user equipment in a registration procedure, where the fourth information indicates that establishment of a connection between the user equipment and the first IMS network is supported; and the processing module 1501 is further configured to: control the transceiver module 1502 to receive a session establishment request message from the user equipment.

In a possible implementation, the processing module 1501 is specifically configured to: control the transceiver module 1502 to receive the network information of the first IMS network from the user equipment in a session establishment procedure, where the fourth information indicates that establishment of a connection between the user equipment and the first IMS network is supported, and the fourth information includes session establishment accept information and/or address information of a proxy call network element corresponding to the first IMS network.

In a possible implementation, the processing module 1501 is specifically configured to: control the transceiver module 1502 to receive the network information of the first IMS network from the user equipment in a session establishment procedure, where the fourth information indicates that establishment of a connection between the user equipment and the first IMS network is not supported, and the fourth information includes session establishment reject information.

In a possible implementation, the network information includes one or more of an identifier of a service provider, a network identifier, a network domain name, the address information of the proxy call network element, and a data network name.

In a possible implementation, the fourth information includes one or more of session establishment accept information, session establishment reject information, an identifier of a service provider, a network identifier, a network domain name, the address information of the proxy call network element, and a data network name.

When the communication apparatus 1500 is configured to implement the functions of the user equipment of the method embodiments shown in FIG. 11 or FIG. 13, in a possible implementation, the processing module 1501 is configured to control the transceiver module 1502 to obtain network information of one or more IMS networks, where the one or more IMS networks are connected to a non-public network accessed by the communication apparatus 1500; and the processing module 1501 is further configured to: determine that the one or more IMS networks include a first IMS network to which the communication apparatus 1500 requests to connect; and establish a connection to the first IMS network based on network information of the first IMS network.

In a possible implementation, the processing module 1501 is further configured to: control the transceiver module 1502 to send IMS capability information to a core network device, where the IMS capability information indicates that the communication apparatus 1500 supports establishment of a connection to an IMS network.

In a possible implementation, the processing module 1501 is specifically configured to control the transceiver module 1502 to send the IMS capability information to the core network device in a registration procedure or a session establishment procedure.

In a possible implementation, the IMS capability information includes the network information of the first IMS network.

In a possible implementation, the processing module 1501 is specifically configured to: control the transceiver module 1502 to obtain the network information of the one or more IMS networks from the core network device in the session establishment procedure; control the transceiver module 1502 to obtain address information of a proxy call network element corresponding to the first IMS network; and establish a connection to the proxy call network element based on the address information.

In a possible implementation, the processing module 1501 is specifically configured to: control the transceiver module 1502 to obtain the network information of the one or more IMS networks from the core network device in the registration procedure; and control the transceiver module 1502 to send session establishment request information to the core network device based on the network information of the first IMS network, where the session establishment request information is for establishing a connection between the communication apparatus 1500 and the first IMS network.

In a possible implementation, the network information of the one or more IMS networks is included in a broadcast message of an access network device.

In a possible implementation, the network information includes one or more of an identifier of a service provider, a network identifier, a network domain name, a data network name, and address information of a proxy call network element.

When the communication apparatus 1500 is configured to implement the functions of the core network device of the method embodiments shown in FIG. 11 or FIG. 13, in a possible implementation, the processing module 1501 is configured to control the transceiver module 1502 to obtain network information of one or more IMS networks, where the one or more IMS networks are connected to a non-public network accessed by user equipment; and the processing module 1501 is further configured to control the transceiver module 1502 to send the network information of the one or more IMS networks to the user equipment.

In a possible implementation, the processing module 1501 is further configured to: control the transceiver module 1502 to receive IMS capability information of the user equipment from the user equipment, where the IMS capability information indicates that the user equipment supports establishment of a connection to an IMS network.

In a possible implementation, the processing module 1501 is specifically configured to: control the transceiver module 1502 to receive the IMS capability information of the user equipment from the user equipment in a registration procedure or a session establishment procedure.

In a possible implementation, the IMS capability information includes network information of a first IMS network, and the first IMS network is an IMS network to which the user equipment requests to connect.

In a possible implementation, the processing module 1501 is specifically configured to: control the transceiver module 1502 to send the network information of the one or more IMS networks to the user equipment in the registration procedure; and control the transceiver module 1502 to receive a session establishment request message from the user equipment, where the session establishment request message is for establishing a connection between the user equipment and the first IMS network.

In a possible implementation, the network information includes one or more of an identifier of a service provider, a network identifier, a network domain name, a data network name, and address information of a proxy call network element.

Figure 16:
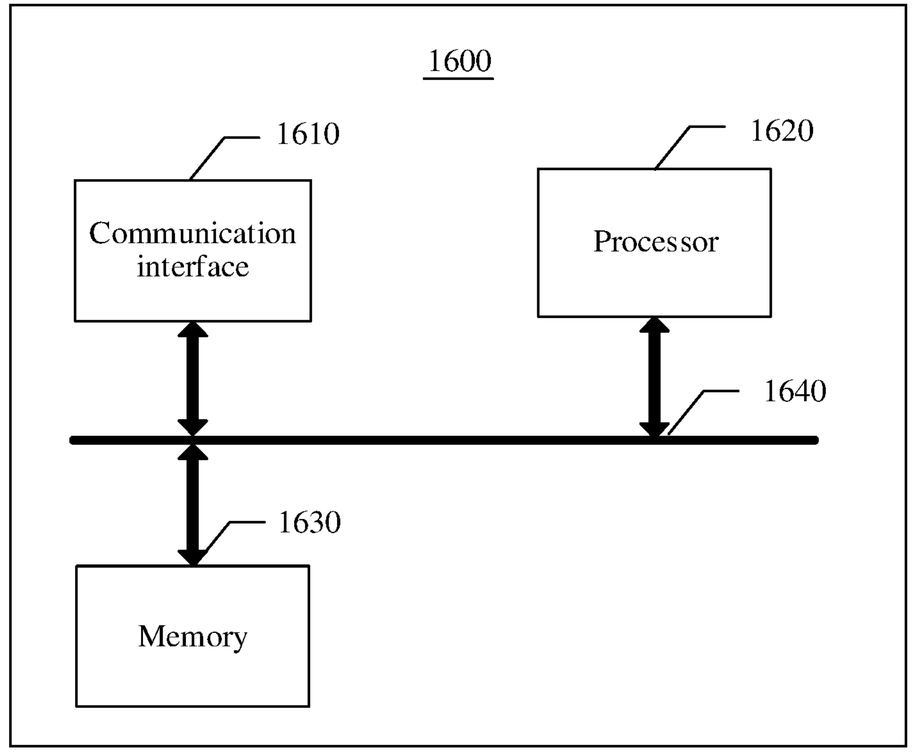
FIG. 16 is a schematic diagram of a structure of another communication apparatus according to this application.

FIG. 16 shows an apparatus 1600 according to an embodiment of this application. The apparatus shown in FIG. 16 may be an implementation of a hardware circuit of the apparatus shown in FIG. 11.

The communication apparatus may be applied to the flowcharts shown above, and perform functions of the session management network element, the user equipment, the policy control network element, or the target proxy call network element of the method embodiments shown in FIG. 6 to FIG. 10.

The communication apparatus may be further applied to the flowcharts shown above, and perform the user equipment, the session management network element, or the access and mobility management network element of the method embodiments shown in FIG. 11 to FIG. 14.

For ease of description, FIG. 16 shows only main components of the communication apparatus.

The apparatus 1600 may further include at least one memory 1630, configured to store program instructions and/or data. The memory 1630 is coupled to the processor 1620. Couplings in this embodiment of this application are indirect couplings or communication connections between apparatuses, units, or modules, may be electrical, mechanical, or in another form, and are used for information exchange between the apparatuses, the units, or the modules. The processor 1620 may cooperate with the memory 1630. The processor 1620 may execute the program instructions stored in the memory 1630. At least one of the at least one memory may be included in the processor.

The apparatus 1600 shown in FIG. 16 includes at least one processor 1620 and a communication interface 1610. The processor 1620 is configured to execute instructions or a program stored in the memory 1630. When the instructions or the program stored in the memory 1630 is executed, the processor 1620 is configured to perform an operation performed by the processing module 1501 in the foregoing embodiments, and the communication interface 1610 is configured to perform an operation performed by the transceiver module 1502 in the foregoing embodiments.

In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver or a communication interface integrated with sending and receiving functions.

The apparatus 1600 may further include a communication line 1640. The communication interface 1610, the processor 1620, and the memory 1630 may be connected to each other through the communication line 1640. The communication line 1640 may be a peripheral component interconnect (peripheral component interconnect, PCI for short) bus, an extended industry standard architecture (extended industry standard architecture, EISA for short) bus, or the like. The communication line 1640 may be classified into an address bus, a data bus, a control bus, and the like. For ease of representation, only one thick line is for representing the bus in FIG. 16, but this does not mean that there is only one bus or only one type of bus.

Based on the foregoing content and a same concept, an embodiment of this application provides a chip system, including a processor. The processor is coupled to a memory. The memory is configured to store a program or instructions. When the program or the instructions are executed by the processor, the chip system is enabled to implement functions of the session management network element, the user equipment, the policy control network element, or the target proxy call network element of the method embodiments shown in FIG. 6 to FIG. 10. Alternatively, the chip system is enabled to implement functions of the user equipment, the session management network element, or the access and mobility management network element of the method embodiments shown in FIG. 11 to FIG. 14.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by hardware, the processor may be a logic circuit, an integrated circuit, or the like. When the processor is implemented by software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory ROM. The memory and the processor may be integrated on a same chip, or may be separately disposed on different chips.

Based on the foregoing content and a same concept, an embodiment of this application provides a computer-readable storage medium. The computer-readable storage medium stores a computer program or instructions. When the computer program or the instructions are executed, a computer is enabled to perform functions of the session management network element, the user equipment, the policy control network element, or the target proxy call network element of the method embodiments shown in FIG. 6 to FIG. 10. Alternatively, the computer is enabled to perform functions of the user equipment, the session management network element, or the access and mobility management network element of the method embodiments shown in FIG. 11 to FIG. 14.

Based on the foregoing content and a same concept, an embodiment of this application provides a computer program product. When a computer reads and executes the computer program product, the computer is enabled to perform functions of the session management network element, the user equipment, the policy control network element, or the target proxy call network element of the method embodiments shown in FIG. 6 to FIG. 10. Alternatively, the computer is enabled to perform functions of the user equipment, the session management network element, or the access and mobility management network element of the method embodiments shown in FIG. 11 to FIG. 14.

Based on the foregoing content and a same concept, an embodiment of this application provides a communication system. The communication system includes one or more of the session management network element, the user equipment, the policy control network element, or the target proxy call network element of the method embodiments shown in FIG. 6 to FIG. 10.

Based on the foregoing content and a same concept, an embodiment of this application provides a communication system. The communication system includes one or more of the session management network element, the user equipment, and the access and mobility management network element of the method embodiments shown in FIG. 11 to FIG. 14.

In this application, at least one means one or more, and a plurality of means two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. "And/or" describes an association between associated objects, and indicates that three relationships may exist. For example, A and/or B may indicate the following three cases: A exists alone, both A and B exist, and B exists alone, where A and B may be singular or plural. In the text descriptions of this application, the character "/" generally indicates an "or" relationship between the associated objects. In a formula in this application, the character "/" indicates a "division" relationship between the associated objects.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product based on this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Clearly, a person skilled in the art can make various modifications and variations to this application without departing from the scope of this application. This application is intended to cover these modifications and variations of this application provided that they fall within the scope of protection defined by the claims of this application and their equivalent technologies.

What is claimed is:

1. A communication method, comprising:

receiving, by a session management network element, identification information of a target service provider from user equipment, wherein the session management network element and the user equipment are located in a first network connected to a plurality of IP multimedia subsystem (IMS) networks, the identification information of the target service provider indicates a target IMS network to which the user equipment requests to connect, the target IMS network is one of the plurality of IMS networks, and the target IMS network is provided by the target service provider;

determining, by the session management network element, address information of a target proxy call network element based on the identification information of the target service provider, wherein the address information of the target proxy call network element is for establishing a connection between the user equipment and the target IMS network; and sending, by the session management network element, the address information of the target proxy call network element to the user equipment.

2. The method according to claim 1, wherein the identification information of the target service provider is comprised in data network name information.

3. The method according to claim 1, wherein the target proxy call network element is located in the first network, and the method further comprises:

sending, by the session management network element, second information to the target proxy call network element or a policy control network element, wherein the second information comprises identification information of the user equipment and identification information of the target service provider, and the second information indicates the target proxy call network element to send an IMS message from the user equipment to a target interrogation call network element of the target IMS network.

4. The method according to claim 3, wherein the second information further comprises second call information indicating the target interrogation call network element.

5. The method according to claim 1, wherein the target proxy call network element is located in the first network, and the method further comprises:

determining, by the session management network element, second call information corresponding to the target service provider based on a correspondence between a service provider and interrogation call information;

determining, by the session management network element, a target association, wherein the target association comprises an association between identification information of the user equipment and the second call information, or the target association comprises an association between identification information of the user equipment, the second call information, and identification information of the target service provider; and sending, by the session management network element, the target association to the target proxy call network element or a policy control network element.

6. The method according to claim 1, wherein the determining the address information of the target proxy call network element is further based on a first correspondence, wherein the first correspondence comprises identification information of a service provider corresponding to each IMS network in the plurality of IMS networks and address information of a proxy call network element of the each IMS network.

7. A communication method, comprising:

sending, by a communication apparatus, identification information of a target service provider to a session management network element, wherein user equipment and the session management network element are located in a first network connected to a plurality of IP multimedia subsystem (IMS) networks, the identification information of the target service provider indicates a target IMS network to which the user equipment requests to connect, the target IMS network is one of the plurality of IMS networks, and the target IMS network is provided by the target service provider, wherein the communication apparatus is user equipment or a component in the user equipment; and receiving, by the communication apparatus, address information of a target proxy call network element from the session management network element, wherein the address information of the target proxy call network element is for establishing a connection between the user equipment and the target IMS network, wherein the address information of the target proxy call network element is based on the identification information of the target service provider.

8. The method according to claim 7, wherein the identification information of the target service provider is comprised in data network name information.

9. The method according to claim 8, wherein the data network name information is obtained by the communication apparatus from an access and mobility management network element, the session management network element, or an access network device.

10. The method according to claim 7, wherein the method further comprises:

receiving, by the communication apparatus, third information from an access network device, wherein the third information comprises identification information of the target service provider and proxy call information corresponding to the target service provider, and the proxy call information corresponding to the target service provider is the address information of the target proxy call network element; and sending, by the communication apparatus, the address information of the target proxy call network element to the session management network element.

11. The method according to claim 7, wherein the method further comprises:

sending, by the communication apparatus, a query request to a domain name system server, wherein the query request comprises identification information of the first network;

receiving, by the communication apparatus, a query response from the domain name system server, wherein the query response comprises the address information of the target proxy call network element, and the target proxy call network element indicated by the address information of the target proxy call network element is located in the target IMS network and connected to the first network; and sending, by the communication apparatus, the address information of the target proxy call network element to the session management network element.

12. A communication apparatus, comprising:

at least one processor; and one or more memories coupled to the at least one processor and storing programming instructions for execution by the at least one processor to perform operations comprising:

sending identification information of a target service provider to a session management network element, wherein the communication apparatus and the session management network element are located in a first network connected to a plurality of IP multimedia subsystem (IMS) networks, the identification information of the target service provider indicates a target IMS network to which the communication apparatus requests to connect, the target IMS network is one of the plurality of IMS networks, and the target IMS network is provided by the target service provider; and receiving address information of a target proxy call network element from the session management network element, wherein the address information of the target proxy call network element is for establishing a connection between user equipment and the target IMS network, wherein the address information of the target proxy call network element is based on the identification information of the target service provider.

13. The communication apparatus according to claim 12, wherein the identification information of the target service provider is comprised in data network name information.

14. The communication apparatus according to claim 13, wherein the data network name information is obtained by the user equipment from an access and mobility management network element, the session management network element, or an access network device.

15. The communication apparatus according to claim 12, wherein the operations comprise:

receiving third information from an access network device, wherein the third information comprises identification information of the target service provider and proxy call information corresponding to the target service provider, and the proxy call information corresponding to the target service provider is the address information of the target proxy call network element; and sending the address information of the target proxy call network element to the session management network element.

16. The communication apparatus according to claim 12, wherein the operations comprise:

sending a query request to a domain name system server, wherein the query request comprises identification information of the first network;

receiving a query response from the domain name system server, wherein the query response comprises the address information of the target proxy call network element, and the target proxy call network element indicated by the address information of the target proxy call network element is located in the target IMS network and connected to the first network; and sending the address information of the target proxy call network element to the session management network element.

17. The communication apparatus according to claim 12, wherein the communication apparatus is the user equipment or a component in the user equipment.

* * * * *